(12) United States Patent
Yui et al.

(10) Patent No.: US 7,183,894 B2
(45) Date of Patent: Feb. 27, 2007

(54) COMMUNICATION SYSTEM FOR ACCESSING SHARED ENTRANCE OF MULTIPLE DWELLING HOUSE

(75) Inventors: Yasuji Yui, Kanagawa (JP); Hiroyuki Matsumura, Kanagawa (JP); Akira Yaegashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 10/491,311

(22) PCT Filed: Jul. 31, 2003

(86) PCT No.: PCT/JP03/09756

§ 371 (c)(1),
(2), (4) Date: Mar. 29, 2004

(87) PCT Pub. No.: WO2004/011747
PCT Pub. Date: Feb. 5, 2004

(65) Prior Publication Data

US 2004/0243812 A1    Dec. 2, 2004

(30) Foreign Application Priority Data

Jul. 31, 2002   (JP)  ............................ P2002-223700
Nov. 15, 2002  (JP)  ............................ P2002-332936
Nov. 28, 2002  (JP)  ............................ P2002-346163

(51) Int. Cl.
*G05B 19/00* (2006.01)

(52) U.S. Cl. ...................... 340/5.7; 340/5.22

(58) Field of Classification Search ............ 340/5.7, 340/2, 5.61, 5.27, 5.28, 5.26, 83, 539.25, 340/545.1; 348/156; 379/102.06; 709/224; 707/200; 726/20; 713/186, 155, 161; 382/118, 382/181; 235/382

See application file for complete search history.

(56) References Cited

U.S. PATENT DOCUMENTS

| | | | | |
|---|---|---|---|---|
| 5,095,196 A | * | 3/1992 | Miyata | ...................... 235/382 |
| 6,374,356 B1 | * | 4/2002 | Daigneault et al. | ........... 726/20 |
| 6,990,588 B1 | * | 1/2006 | Yasukura | ..................... 713/186 |
| 7,006,672 B2 | * | 2/2006 | Sato et al. | ................... 382/118 |

FOREIGN PATENT DOCUMENTS

| | | |
|---|---|---|
| JP | 57-179794 | 11/1982 |
| JP | 2-51998 | 2/1990 |
| JP | 5-122385 | 5/1993 |
| JP | 9-32376 | 2/1997 |
| JP | 10-246043 | 9/1998 |
| JP | 2000-092221 | 3/2000 |
| JP | 2000-320211 | 11/2000 |
| JP | 2001-146863 | 5/2001 |
| JP | 2002-64641 | 2/2002 |

* cited by examiner

*Primary Examiner*—Wendy P. Garber
*Assistant Examiner*—William Bangachon
(74) *Attorney, Agent, or Firm*—Finnegan, Henderson, Farabow, Garrett & Dunner L.L.P.

(57) ABSTRACT

Apparatus for sharing entrance of a multiple dwelling house. The apparatus controls the visit and/or calling of a door-to-door sales agent. The apparatus automatically receives delivery of goods addressed to one of the dwelling units regardless of the presence or absence of a resident. Registered agents, such as residents and agents granted access, use an IC card that carries identification information to gain access of a shared entrance. For each dwelling unit, a registered agent likewise uses the IC card to send family identification information or agent identification information to a door phone apparatus, thereby unlocking the door lock of the entrance for a family member.

2 Claims, 45 Drawing Sheets

FIG. 3
OOAKKK0001
| MANUFACTURER NO. | CATEGORY CODE | SERIAL NO. |
FIG. 4A
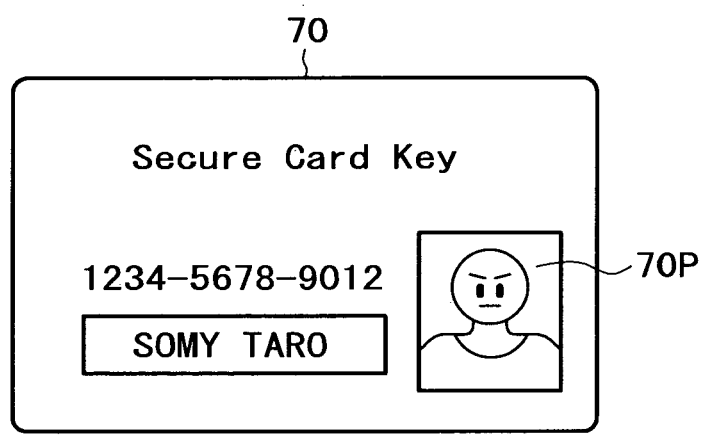
FIG. 4B
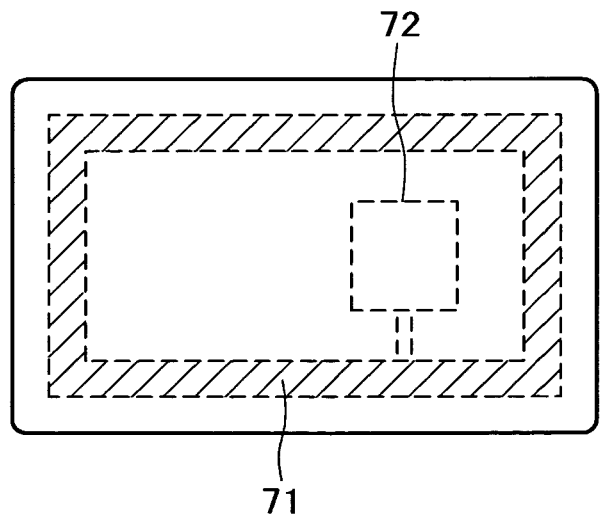

(SHARED ENTRANCE 1)

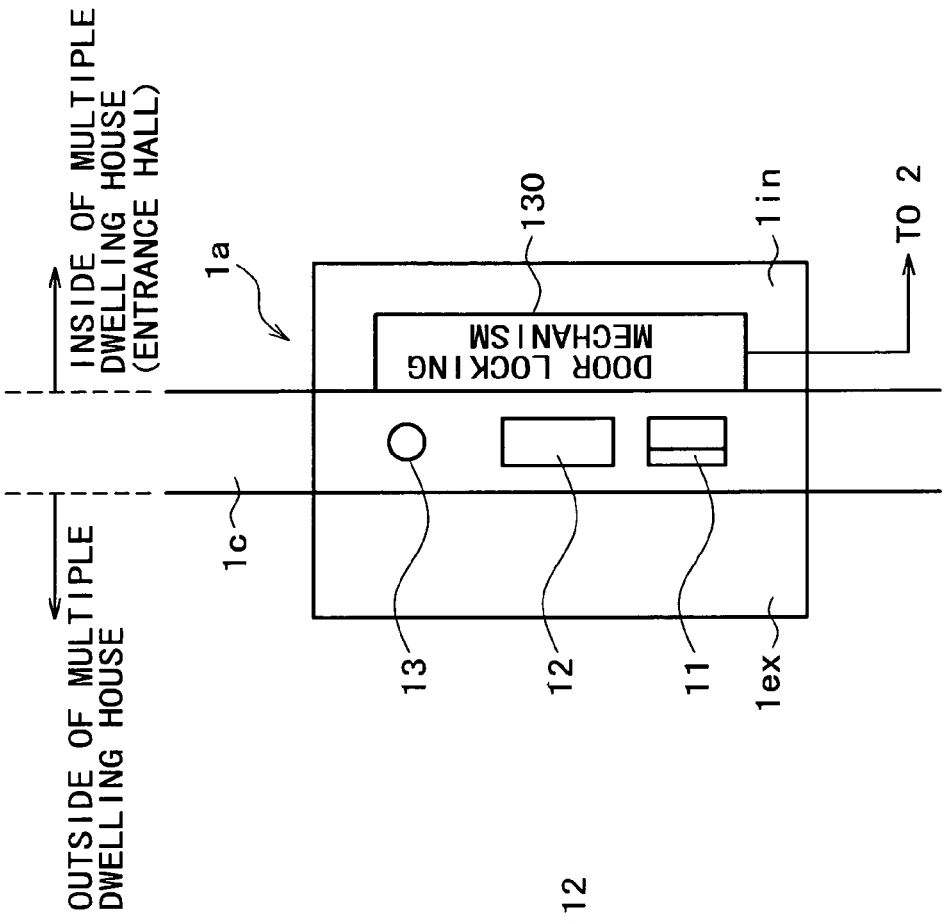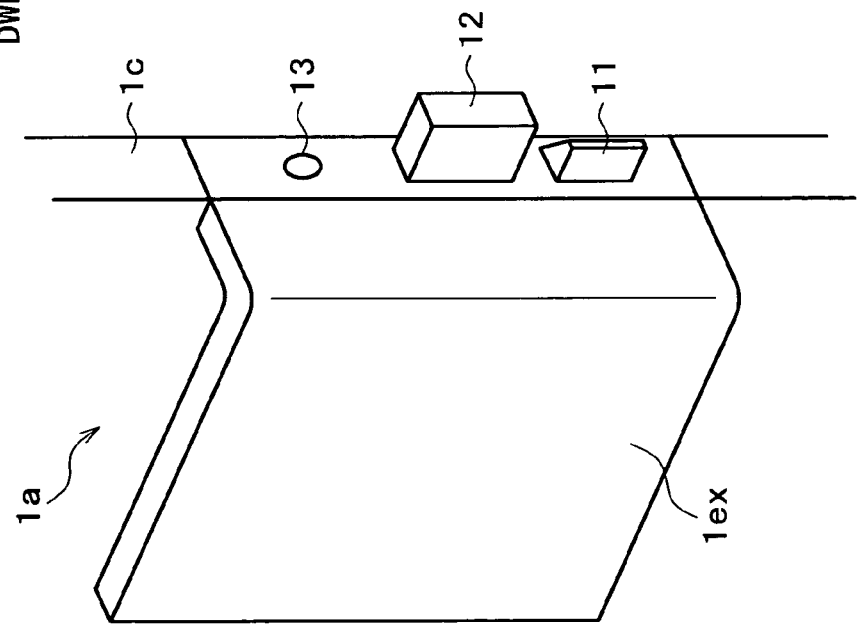

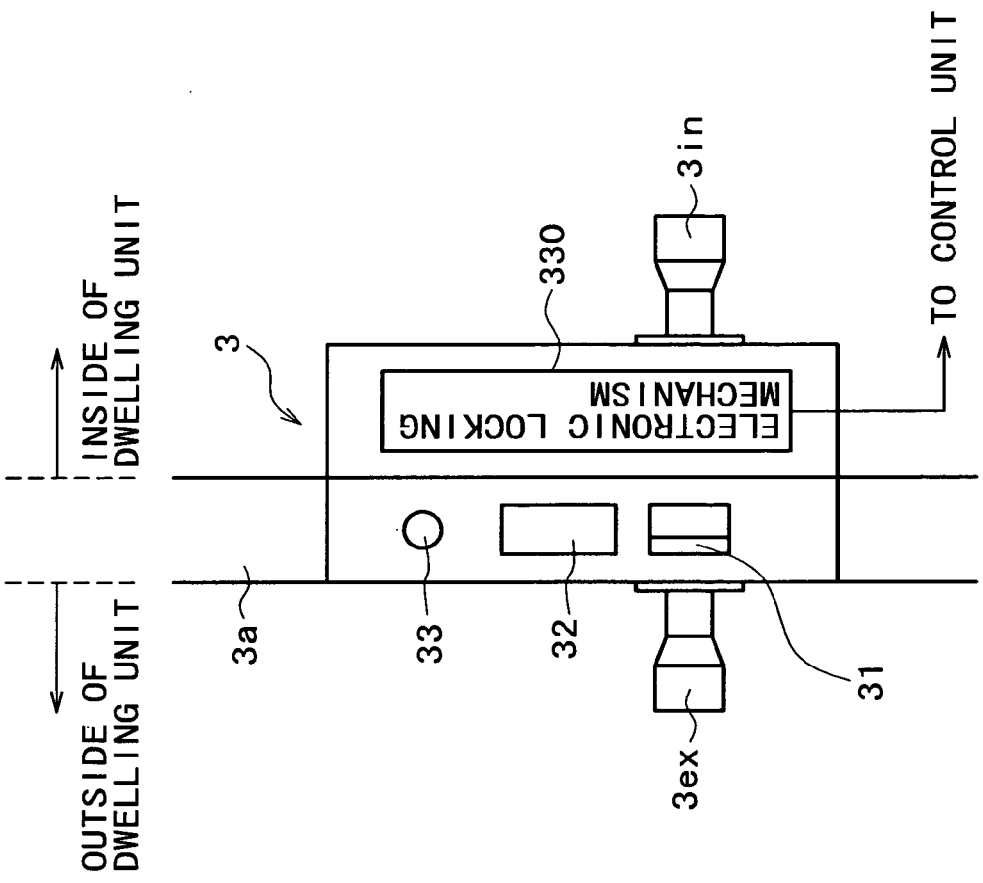
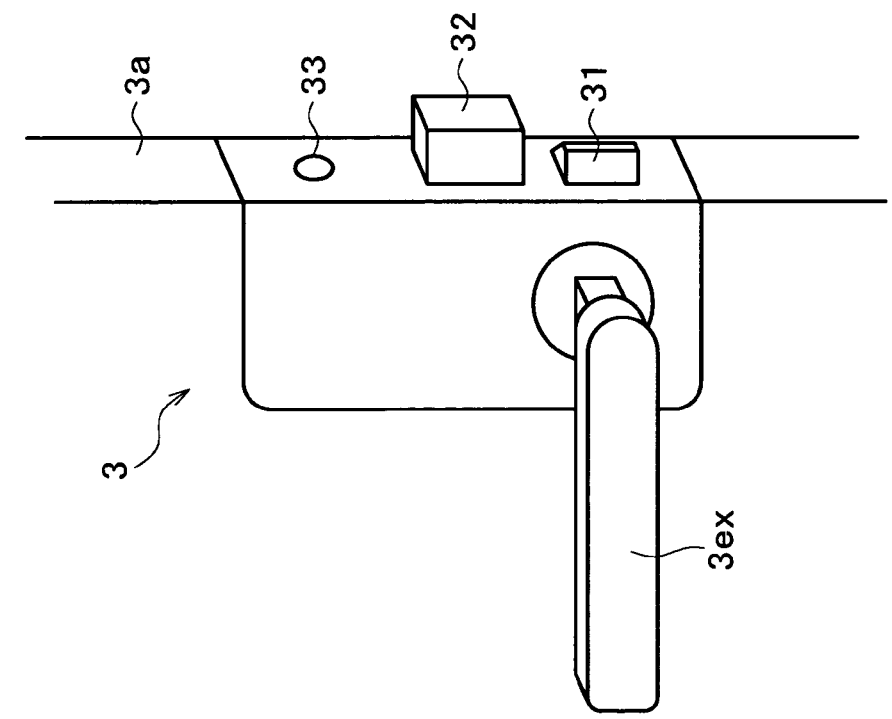

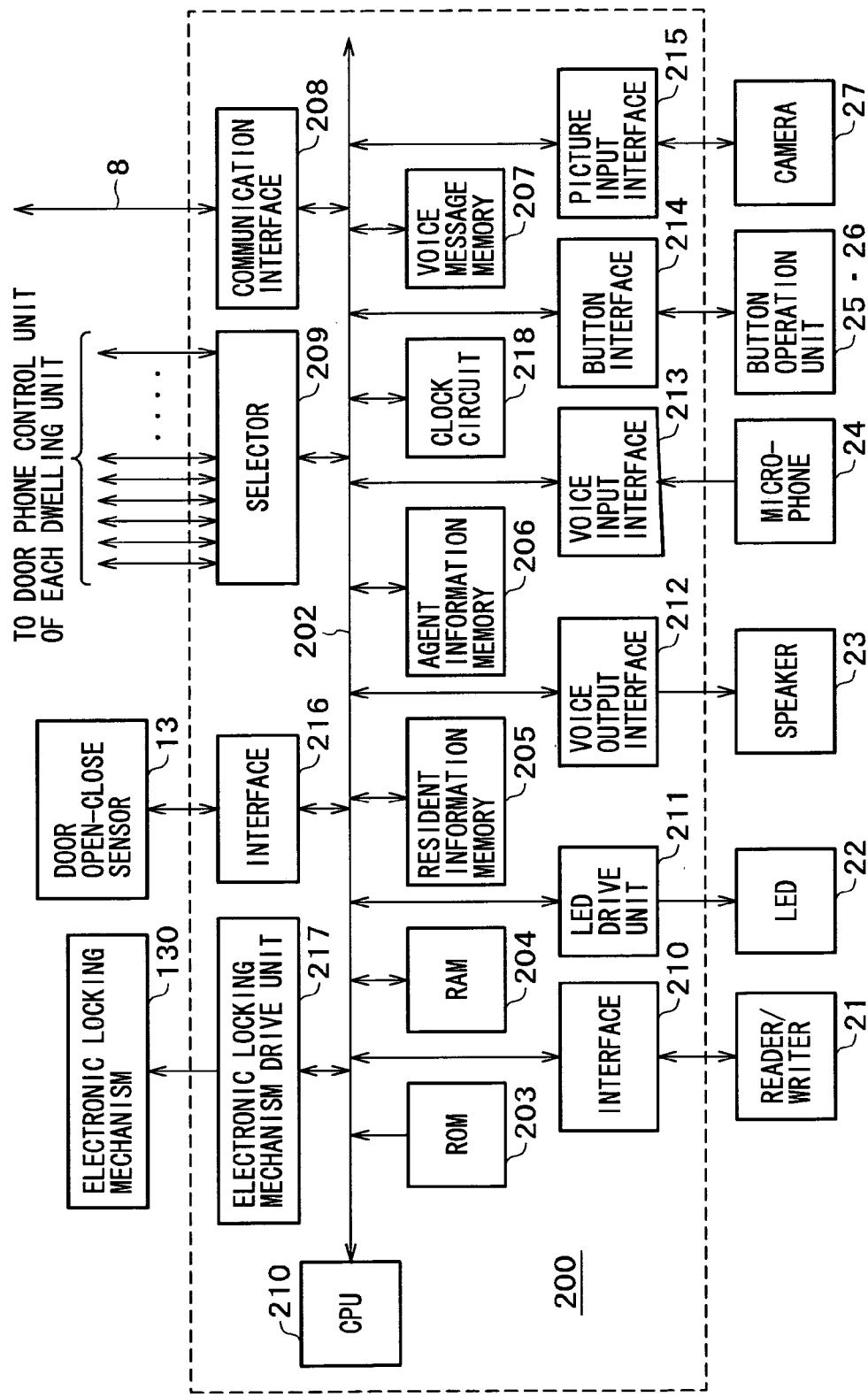

FIG. 15

| | | |
|---|---|---|
| | INDENTIFICATION INFORMATION<br>• MAIN KEY INFORMATION<br>• BACKUP KEY INFORMATION | PERSONAL IDENTIFICATION INFORMATION |
| | PASSWORD INFORMATION | |
| | NAME | |
| | ADDRESS | |
| | ROOM NO. | |
| | DATE OF BIRTH | |
| | AGE | |
| | RELATIONSHIP | |
| | DATE OF REGISTRATION | |
| | BANK ACCOUNT NO. | PERSONAL INFORMATION |
| | TELEPHONE NO. | |
| | IP ADDRESS | |
| | INFORMATION ABOUT TASTES AND PREFERENCES<br>• PREFERRED TV PROGRAMS: DRAMAS<br>• PREFERRED MUSIC: JAZZ<br>• PREFERRED MOVIES: SF | |
| | HISTORY INFORMATION ABOUT COMINGS AND GOINGS | |
| | ELECTRONIC KEY REGISTRATION/MISSING HISTORY INFORMATION | |
| | CARD TYPE (ELECTRONIC KEY APPARATUS) | |

FIG. 16

| | |
|---|---|
| AGENT IDENTIFICATION INFORMATION | ⎫ |
| PASSWORD INFORMATION | |
| BUSINESS CATEGORY | |
| COMPANY NAME (SHOP NAME) | |
| ADDRESS | |
| INFORMATION ABOUT PERSON IN CHARGE<br>• NAME<br>• SEX<br>• AGE<br>• FACE PHOTO INFORMATION (PICTURE INFORMATION) | ⎬ DETAILED AGENT INFORMATION |
| PICKUP PERMISSION FLAG | |
| DELIVERY PERMISSION FLAG | |
| DATE OF REGISTRATION | |
| BANK ACCOUNT NO. | |
| TELEPHONE NO. | |
| E-MAIL ADDRESS | |
| VISIT HISTORY INFORMATION | ⎭ |
| CARD TYPE (AGENT INFORMATION COMMUNICATION APPARATUS) | |

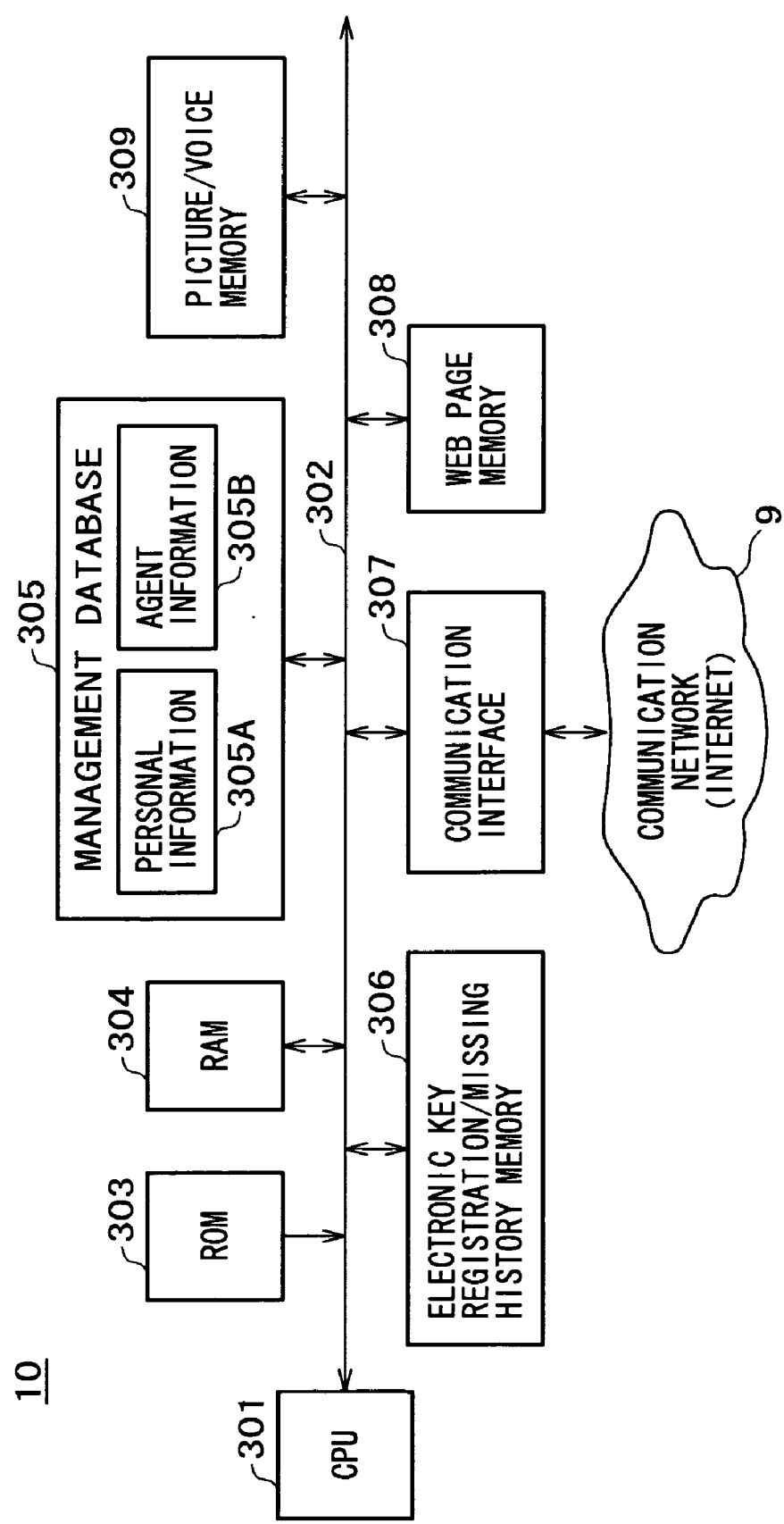

F I G. 3 8 A

|  | PICKUP FLAG | USE FLAG | PICKUP AGENT IDENTIFICATION INFORMATION | DELIVERY AGENT IDENTIFICATION INFORMATION | PICKUP TIME | DELIVERY TIME | OTHERS |
|---|---|---|---|---|---|---|---|
| STORAGE BOX 5a | 1 | 1 | | | | | |
| STORAGE BOX 5b | 0 | 0 | | | | | |

F I G. 3 8 B

|  | PICKUP FLAG | USE FLAG | PICKUP AGENT IDENTIFICATION INFORMATION | DELIVERY AGENT IDENTIFICATION INFORMATION | PICKUP TIME | DELIVERY TIME | OTHERS |
|---|---|---|---|---|---|---|---|
| STORAGE BOX 5a | 0 | 0 | XXXX LAUNDRY | | 14:10, NOV. 30 | | |
| STORAGE BOX 5b | 0 | 1 | | XXX DELIVERY SERVICE | | 10:45, NOV. 30 | RECEIPT PRINTED |

F I G. 4 0
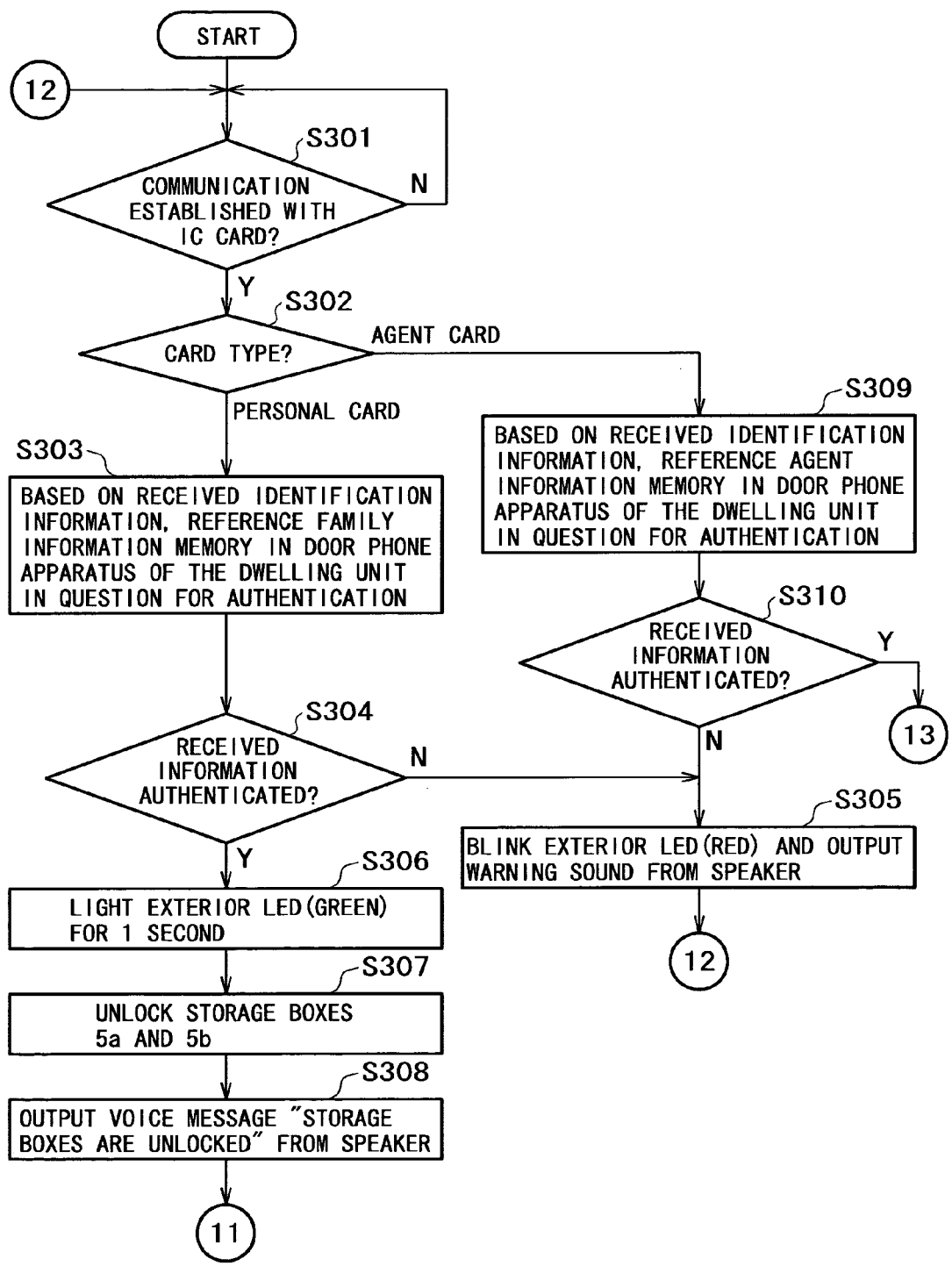

COMMUNICATION SYSTEM FOR ACCESSING SHARED ENTRANCE OF MULTIPLE DWELLING HOUSE

TECHNICAL FIELD

The present invention relates to: a shared entrance apparatus installed at a shared entrance of a multiple dwelling house such as an apartment building for the purpose of restricting the access of visitors to the house; a dwelling unit apparatus installed at the individual entrance of each welling unit in the multiple dwelling house; and a dwelling unit storage box management apparatus for managing storage boxes that automatically take care of delivery and pickup of goods to and from callers on behalf of dwelling unit residents regardless of their being at home or absent.

BACKGROUND ART

Conventional apparatuses are typically made up of an exterior unit and an interior unit each. The exterior unit is set up outdoors and constituted by a microphone, a speaker and a door phone button, while the interior unit is installed indoors and composed of calling sound generating means a microphone and a speaker. When a visitor pushes a door phone button of the exterior unit, the calling sound generating means included in the interior unit typically generates a calling sound like that of a chime.

The calling sound informs the resident that someone is paying a visit. A conversation takes place between the visitor and the resident using microphones and speakers of the exterior and interior units respectively. The resident is then able to know the purpose of the visit without opening the door.

Some of today's door phone apparatuses have their exterior unit furnished with an image pickup device and their interior unit with a display screen. The image pickup device takes a picture of the visitor and causes the display screen to display the visitor's image for the resident to determine the visitor's identity (as disclosed illustratively in Japanese Published Unexamined Patent Application No. 2000-092221). The imaging setup allows the resident to know who the visitor is before starting a conversation with him or her so that on the basis of the visitor's apparent identity, the resident may even pretend not to be at home.

The door phone apparatus above is also used in the multiple dwelling house such as an apartment building. Illustratively, the multiple dwelling house has its shared entrance furnished with a shared entrance apparatus including a locking mechanism-equipped door along with numeric keys by which to enter a room number, a calling key for triggering a calling sound, a microphone, and a speaker. Each of the dwelling units constituting the multiple dwelling house is provided with a door phone apparatus for audibly communicating with the shared entrance apparatus installed at the shared entrance.

A visitor at the entrance of the house operates numeric keys of the shared entrance apparatus to enter a desired room number and pushes the calling key, causing the desired dwelling unit's door phone apparatus to generate a calling sound alerting the resident inside. The resident answers the call through the door phone apparatus. If it is judged appropriate to let the visitor in, the resident pushes an unlock key of the apparatus to unlock the door of the shared entrance, thereby allowing the visitor to come into (to enter) the building.

Later, the visitor again alerts the resident through the door phone apparatus at the entrance of the dwelling unit of interest. The resident then responds and receives the visitor.

As described, the multiple dwelling house such as an apartment building is regarded as a single house, which is then furnished with the shared entrance having the locking mechanism-equipped door controlled by residents of the dwelling units making up the house. Each of the dwelling units is equipped individually with the door phone apparatus in order to constitute what may be called a dual check door phone system.

Residents of the multiple dwelling house furnished with such a door phone system may each possess a shared entry key, use a secret number, or resort to other suitable means to unlock the entrance door. This is how the residents control their comings and goings through the shared entrance of the house.

The multiple dwelling house furnished with the door phone system above is supposed to have the advantage of crime prevention by effectively restricting the access of visitors to the house. This advantage, however, sometimes works against the interests of the residents of the house.

For example, each and every one of caterers, delivery services, inspectors of utilities, repairmen, or other people who are expected frequently to visit the multiple dwelling house need to be answered twice through the door phone apparatus by the resident involved: once at the shared entrance, and again at the dwelling unit entrance. This can be a considerable nuisance to the residents.

When calling at a dwelling unit whose resident is absent, delivery services typically leave a message saying that they have goods to deliver and ask the resident to tell them the convenient time for a second visit when the resident comes home. For the residents, having to call up the delivery service upon coming home is also a nuisance. For the delivery services, having to call at the same address a number of times is something they want to avoid in view of additional time and costs.

Attempts to bypass such troubles are being made by some of today's multiple dwelling houses using storage boxes shared by the residents for automatically taking delivery of goods during their absence. The shared storage box scheme works as follows: a plurality of storage boxes used on a shared basis by the residents are installed in a common space of the house (e.g., in the entrance hall) where anyone can come in. A deliveryman, having called from the hall a dwelling unit whose resident turns out absent, designates the dwelling unit in question to any empty storage box, places the goods therein, and locks the box in such a manner that only the designated resident can later unlock the box and collect what is placed inside. The scheme is supposed to have the goods securely delivered regardless of the recipients being at home or absent.

The scheme above has its share of disadvantages. Because the storage boxes are installed in the common space where not only delivery agents but also virtually anyone can come in, the boxes can soon be exhausted for diverse purposes. Then the goods to be delivered are left undelivered despite the presence of the boxes, which can frustrate the unattended recipients. Ultimately, there must be as many storage boxes as the number of the dwelling units constituting the multiple dwelling house.

The present invention has been made under the above circumstances and provides apparatuses which, installed in a multiple dwelling house, alleviate the burdens on its residents having to receive door-to-door salespeople and other unsolicited visitors by restricting their calls and visits and which allow the dwelling units of the house automatically to take care of delivery and pickup of goods by callers regardless of the residents being at home or absent.

DISCLOSURE OF INVENTION

In carrying out the invention and according to one aspect thereof, there is provided a shared entrance apparatus for a multiple dwelling house, the apparatus being installed at a shared entrance of the multiple dwelling house to manage access of people thereto, the apparatus including:

agent information storing means for storing at least agent identification information about a registered agent allowed to pay a visit;

communicating means for receiving at least the agent identification information from an agent information communication apparatus which at least stores the agent identification information and which is at least capable of outputting the agent identification information; and lock controlling means for unlocking a door lock of the shared entrance to let a visitor in upon determining that the visitor is the registered agent based on the information acquired through the communicating means and on the information stored in the agent information storing means.

Where the inventive shared entrance apparatus for the multiple dwelling house is in use, the lock controlling means is arranged to control the door locking mechanism of the shared entrance based on the information coming from the agent information communication apparatus through the communicating means as well as on the agent identification information held in the agent information storing means.

With the arrangement above in operation, the agents granted access beforehand to the multiple dwelling house and having their agent identification information registered in advance in the agent information storing means may pass through the shared entrance to visit the house using their agent information communication apparatus. The visit is made by the registered agent without having to call on any resident or the superintendent of the house for intervention.

Unlike in conventional setups, people other than the registered agents are not automatically granted access to the multiple dwelling house so that security of the house is not compromised. Because properly authorized agents are automatically allowed to visit the multiple dwelling house of interest, the residents of the house have appreciably less trouble dealing with visitors than before.

According to another aspect of the invention, there is provided a dwelling unit door phone apparatus for a multiple dwelling house, the dwelling unit door phone apparatus being installed at each of dwelling units constituting the multiple dwelling house and connected through a communication channel to a shared entrance apparatus of the multiple dwelling house, wherein the shared entrance apparatus is installed at a shared entrance of the multiple dwelling house and receives information input by a visitor calling at a dwelling unit of the house, the shared entrance apparatus letting the visitor in by unlocking a door of the shared entrance if the visitor is a previously registered agent, the shared entrance apparatus further informing the dwelling unit being called that there is a visitor if the visitor is not registered, the dwelling unit door phone apparatus including:

dwelling unit-authorized agent information storing means for storing at least agent identification information about a registered agent allowed to pay a visit to each of the dwelling units;

communicating means for receiving at least the agent identification information from an agent information communication apparatus which at least stores the agent identification information and which is at least capable of outputting the agent identification information; and calling sound controlling means for generating different calling sounds so as to distinguish the registered agent from other visitors based on the information acquired through the communicating means and on the information stored in the dwelling unit-authorized agent information storing means.

Where the inventive dwelling unit door phone apparatus for the multiple dwelling house is in use, the calling sound controlling means is arranged to control calling sounds in such a manner that the registered agents are distinguished from other visitors. The control is executed based on the agent identification information coming from the agent information communication apparatus of each authorized agent through the communicating means as well as on the agent identification information stored in the dwelling unit-authorized agent information storing means.

By varying calling sounds or by suppressing the sound outright, the arrangement above distinguishes the registered agents from those who may be granted access to the multiple dwelling house in question but who are yet to have their agent identification information registered in the dwelling unit-authorized agent information storing means or have had their registration annulled with regard to specific dwelling units.

The inventive dwelling unit door phone apparatus thus makes it possible to restrict the access of people not only to the multiple dwelling house as a whole but also to individual dwelling units of the house. The residents of the house need not respond to each and every visitor calling at their dwelling units, whereby the residents have significantly less trouble dealing with their visitors than before.

According to a further aspect of the invention, there is provided a dwelling unit storage box management apparatus for controlling a locking mechanism of a storage box attached either to each of dwelling units constituting a multiple dwelling house or to a stand-alone house, the dwelling unit storage box management apparatus including:

agent information storing means for storing at least agent identification information about a registered agent allowed to use the storage box;

communicating means for receiving at least the agent identification information from an agent information communication apparatus which at least stores the agent identification information and which is at least capable of outputting the agent identification information; and controlling means for controlling the locking mechanism of the storage box based on the information acquired through the communicating means and on the information stored in the agent information storing means.

Where the inventive dwelling unit storage box management apparatus is in use, a locking mechanism-equipped storage box is provided to each dwelling unit. The controlling means of the apparatus is arranged to control the locking mechanism of the storage box at each dwelling unit based on the agent identification information acquired from the agent information communication apparatus of the registered agent through the communicating means as well as on the agent identification information stored in the agent information storing means.

The arrangement above allows only those agents whose agent identification information is registered with the agent information storing means to use the storage box attached to the dwelling unit of interest. Because only the authorized agents are allowed to use the storage box, the resident of each dwelling unit need not be at home to securely and automatically hand over or receive goods to or from the visiting agent.

For example, laundrymen collecting their laundry from their clients or delivery services delivering goods to the receivers are all taken care of by the dwelling unit storage box management apparatus. The residents need not be at home to receive the callers for delivery or pickup, so that the residents have considerably less trouble dealing with their callers than before.

BRIEF DESCRIPTION OF DRAWINGS

FIG. 3 is a schematic view showing typical identification information for use with the embodiments of the invention;

FIGS. 4A and 4B are schematic views of an electronic key apparatus and an agent information communication apparatus according to the invention, the apparatuses being used in conjunction with the embodiments;

FIGS. 8A and 8B are explanatory views picturing the shared entrance apparatus of the invention;

FIGS. 12A and 12B are explanatory views indicating a typical structure of a door lock control mechanism in the door phone apparatus of the invention;

FIG. 13 is a block diagram of key components making up the shared entrance apparatus of the invention;

FIG. 15 is a schematic view listing typical personal profile information;

FIG. 16 is a schematic view listing typical agent information;

FIG. 17 is a block diagram indicating a typical structure of a management server;

FIGS. 38A and 38B are explanatory views of dwelling unit storage box management data managed by the dwelling unit storage box management apparatus;

FIG. 40 is a flowchart of steps performed by the dwelling unit storage box management apparatus;

BEST MODE FOR CARRYING OUT THE INVENTION

Figure 1:
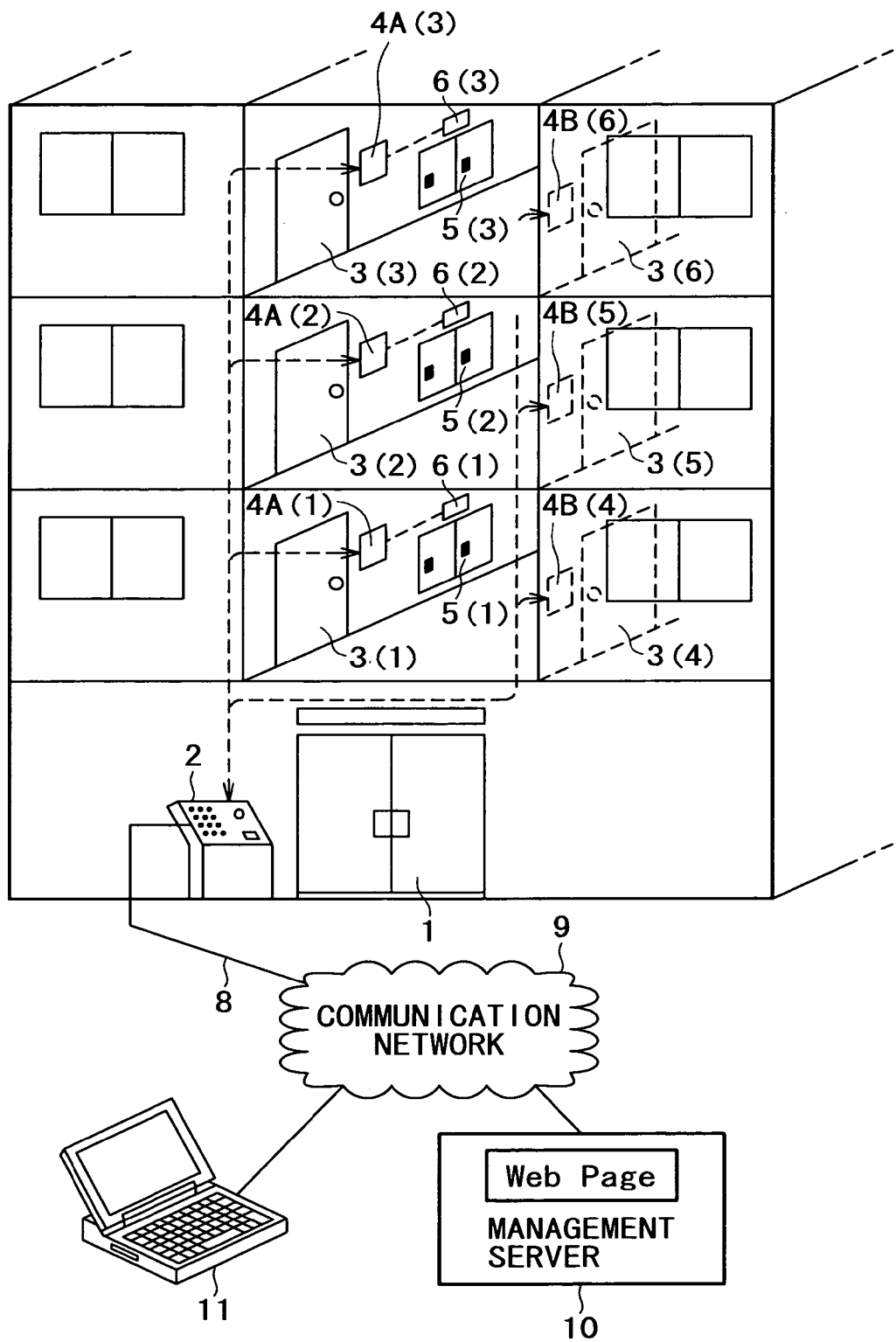
FIG. 1 is an explanatory view giving an outline of a communication system according to the invention.

Preferred embodiments of this invention will now be described with reference to the accompanying drawings.

In one such embodiment, a shared entrance apparatus for multiple dwelling house (simply called the shared entrance apparatus hereunder) is set up outside a locking mechanism-equipped shared entrance door of a multiple dwelling house such as an apartment building. As will be discussed later, the shared entrance apparatus includes a memory and communicating means. The memory contains previously registered information about agents who are authorized to visit (i.e., enter past the entrance door of) the multiple dwelling house. The communicating means communicates with an agent information communication apparatus that contains information about the registered agents.

When the communicating means receives agent identification information from a visitor's agent information communication apparatus, the shared entrance apparatus compares the received agent identification information with the agent identification information held in the memory so as to determine whether the visitor is a registered agent. If the visitor is found to be a registered agent, the shared entrance apparatus unlocks the locking mechanism of the shared entrance door to let the visitor in the multiple dwelling house. Following the visitor's entry into the house, the shared entrance door is typically closed automatically and locked again.

The shared entrance apparatus is connected through a wired or wireless communication channel to a dwelling unit door phone apparatus (simply called the door phone apparatus hereunder) installed near the entrance of each dwelling unit of the multiple dwelling house. It is assumed that the shared entrance apparatus is furnished with numeric keys by which to enter a room number, a calling key, a speaker, and a microphone.

The door phone apparatus is made up of an exterior unit set up outside each dwelling unit, and an interior unit installed inside the dwelling unit as a door phone control unit. The exterior unit includes a calling key, a speaker and a microphone, while the interior unit includes a response key, a shared entrance door unlocking key, a speaker, and a microphone.

An agent not in possession of an agent information communication apparatus typically inputs the room number of the target resident by operating the numeric keys of the shared entrance apparatus, before pushing the calling key to trigger a calling sound through the door phone apparatus of the resident's dwelling unit. Alerted to the coming of a visitor, the resident may unlock the shared entrance door.

The door phone apparatus of each dwelling unit, as will be described later, also includes a memory and communicating means. The memory contains previously registered information about agents who are authorized to visit the dwelling unit in question. The communicating means communicates with the agent information communication apparatus that contains information about the registered agents.

When the communicating means of the door phone apparatus in a dwelling unit receives agent identification information from a visitor's agent information communication apparatus, the door phone apparatus of the dwelling unit in question compares the received agent identification information with the agent identification information held in the memory in order to determine whether the visitor is a registered agent. Depending on whether or not the visitor is a registered agent, the door phone apparatus suitably controls the calling sound of the door phone.

Illustratively, calling sound control is carried out in such a manner that the calling sound may be varied or suppressed outright depending on whether or not the caller is a registered agent. Variation of the calling sound may take diverse forms, e.g., using different tones, different rhythms, or different melodies.

In this embodiment, the door phone apparatus of each dwelling unit is arranged to have its communicating means communicate electronic key information with an electronic key apparatus whereby a door lock control mechanism for locking and unlocking the entrance door of the dwelling unit is controlled.

Each of the dwelling units constituting the multiple dwelling house is furnished with a dwelling unit storage box having a locking mechanism. The dwelling unit storage box is provided with a dwelling unit storage box management apparatus for controlling the locking mechanism of the corresponding storage box. The dwelling unit storage box management apparatus includes communicating means capable of referencing a memory containing previously registered information about the agents authorized to use the storage box in question. The communicating means further communicates with the agent information communication apparatus containing information about the registered agents.

When the communicating means of the dwelling unit storage box management apparatus in a dwelling unit communicates with a visitor's agent information communication apparatus and receives agent identification information therefrom, the dwelling unit storage box management apparatus compares the received agent identification information with the agent identification information held in its memory in order to determine whether the visitor is a registered agent authorized to use the storage box of the dwelling unit in question. If the visitor is found to be an authorized agent, the storage box management apparatus controls the locking mechanism of the dwelling unit storage box to let the agent use the box.

Obviously, the residents of each dwelling unit can utilize their own electronic key apparatus to lock and unlock their own storage box as desired. That is, the storage box at each dwelling unit can be used by both the residents of the dwelling unit in question and by the agents authorized to use the box.

In this embodiment of the invention, the agent information communication apparatus and electronic key apparatus have the same structure including a control IC (integrated circuit) and communicating means. These apparatuses may be implemented in diverse forms. Illustratively, each apparatus may be practiced as an IC card, a mobile phone terminal, or a PDA (personal digital assistant) terminal.

The control IC incorporated in the agent information communication apparatus and electronic key apparatus includes an agent information memory or an electronic key information memory. The memory at least contains agent information including at least agent identification information, or personal information including at least electronic key information.

The agent identification information and electronic key information are managed in such a unified manner that each of the items making up the information is unique. In this example, an IC chip production number is used as an item of identification information. While agent identification information could be assigned to each agent, this embodiment envisages granting agent identification information to each person in charge of a visit from each agent.

Figure 2:
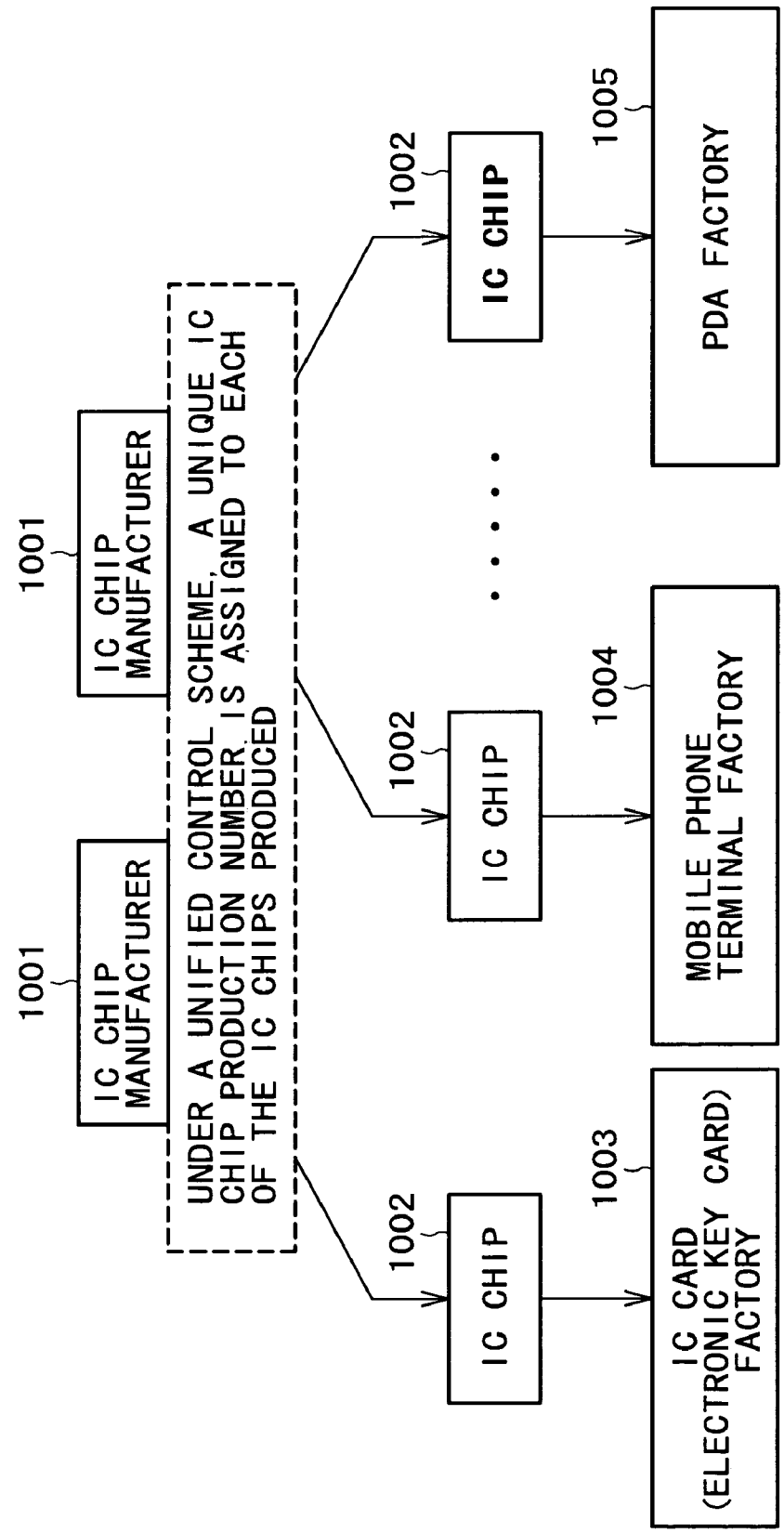
FIG. 2 is an explanatory view showing how identification information is typically used by embodiments of this invention.

For example, as shown in FIG. 2, one or a plurality of IC chip manufacturers 1001 allocate under a unified control scheme a unique IC chip production number to each of the control IC chips 1002 they produce. The unified control scheme works in such a manner that where there are multiple IC chip manufacturers 1001, each manufacturer is assigned beforehand production numbers that are to be allocated uniquely to the control IC chips 1002 it will produce. A memory in each of the control IC chips 1002 thus manufactured contains a unique IC chip production number as identification information.

The control IC chips 1002 are supplied to an IC card factory (or manufacture) 1003, a mobile phone terminal factory (or manufacturer) 1004, and a PDA terminal factory (or manufacturer) 1005. These factories manufacture IC cards, mobile phone terminals, and PDA terminals each carrying one such control IC chip furnished with communicating means.

FIG. 3 shows a typical IC chip production number for use with this embodiment of the invention.

The IC chip production number of this example is made up of 10 digits (including symbols): a manufacturer number in 3 digits, a category code in 3 digits, and a serial number in 4 digits.

The identification information is not limited to IC chip production numbers. As long as each of the items constituting the information is kept unique under a unified control scheme, any type of information can be used. Where identification information other than IC chip production numbers is adopted, the information may be stored in an IC memory distinct from an IC chip production number.

The communicating means included in the agent information communication apparatus, electronic key apparatus, or door phone apparatus is a noncontact type communicating means using illustratively electromagnetic induction, radio waves, light emission, or ultrasonic waves for communication purposes. With this embodiment, the communicating means need only have a modest communication capability covering short distances ranging from, say, several millimeters to dozens of centimeters.

With this embodiment, as mentioned above, locking mechanisms are provided to the shared entrance door of the multiple dwelling house, to the entrance door of each dwelling unit of the house, and to each dwelling unit storage box.

The shared entrance apparatus at the shared entrance door of the multiple dwelling house communicates agent identification information or electronic key information with the registered agent's agent information communication apparatus or with the electronic key apparatus of each resident of the house. Depending on the result of the communication, the shared entrance apparatus causes the locking mechanism of the shared entrance door to lock or unlock the shared entrance door.

The door phone apparatus at the entrance door of each dwelling unit communicates electronic key information with the electronic key apparatus of the resident of the dwelling unit in question. Depending on the result of the communication, the door phone apparatus causes the locking mechanism of the entrance door to lock or unlock the entrance door of the dwelling unit. Furthermore, the door phone apparatus of each dwelling unit can communicate with a visitor's agent information communication apparatus. Depending on the agent identification information acquired from the visitor's apparatus, the door phone apparatus may control its calling sound in a predetermined manner.

The dwelling unit storage box management apparatus at the door of the storage box of each dwelling unit communicates agent identification information or electronic key information with the registered agent's agent information communication apparatus or with the electronic key apparatus of the resident of the dwelling unit in question. Depending on the result of the communication, the dwelling unit storage box management apparatus causes the door locking mechanism of the dwelling unit storage box to lock or unlock the storage box.

With this embodiment, the shared entrance door of the multiple dwelling house, the entrance door of each dwelling unit, and the door of each dwelling unit storage box are each equipped with an automatic locking function. Where any one of these doors has been unlocked, opened and closed, or if the door remains closed after being unlocked, the door in question is automatically locked by its locking function.

In examples to be described below, noncontact communication using electromagnetic induction takes place between the agent information communication apparatus or the electronic key apparatus on the one hand, and the shared entrance apparatus, door phone apparatus, or dwelling unit storage box management apparatus on the other hand. As will be discussed later, the communication is taken care of by a reader/writer attached to each of the shared entrance apparatus, door phone apparatus, and dwelling unit storage box management apparatus.

With this embodiment, the electronic key information for controlling the locking and unlocking of the doors is made of identification information constituted by the above-mentioned IC chip production number. More specifically, unique identification information under a unified control scheme is written in an internal memory of each electronic key apparatus. The same identification information is registered as electronic key information with a management server. Under this scheme, each member of the family possesses his or her own electronic key apparatus.

With this embodiment, the management server transfers the electronic key information about each registered family member both to the shared entrance apparatus of the multiple dwelling house in question and to an electronic key information storage unit of the door phone apparatus at each dwelling unit for registration purposes. The information transfer and registration will be discussed later in more detail. The shared entrance apparatus and the door phone apparatus of each dwelling unit compare for verification the registered electronic key information with the electronic key information received from an electronic key apparatus. Depending on the result of the comparison, the apparatuses lock or unlock the corresponding doors.

With this embodiment, each family member can register main key information and backup key information as his or her own electronic key information with the management server. Since the electronic key information differs from one electronic key apparatus to another, registering main key information and backup key information is equivalent to registering a main key apparatus and a backup key apparatus.

In the ensuing example, the main key apparatus to be furnished to each family member is an IC card provided by a company that operates a system including the shared entrance apparatus and door phone apparatuses. The identification information held in each IC card as the main key apparatus is registered in advance with the management server as the electronic key information for the owner of the IC card in question.

For this embodiment, the system-operating company above offers as many IC cards as the number of family members for each dwelling unit. All identification information held in these IC cards is registered with the management server as the electronic key information for controlling the installed door locks.

Furthermore, the management server collects personal information about each of the members of the family from each dwelling unit equipped with the door phone apparatus. In correspondence with such personal information, the identification information in the IC card (i.e., electronic key apparatus) owned by each family member is registered with the management server as the electronic key information.

In this embodiment, the personal information about each family member is downloaded from the management server both to the shared entrance apparatus and to the door phone apparatus of the dwelling unit in question. The downloaded information is stored into the respective memories of the apparatuses. It should be noted that the personal information about each family member is downloaded from the management server to the door phone apparatus of the dwelling unit by way of the shared entrance apparatus.

The shared entrance apparatus or the door phone apparatus searches its memory for personal information using as a keyword the electronic key information acquired through communication from the electronic key apparatus. The personal information thus retrieved is used as a basis for determining who owns the electronic key information. That is, in the communication system of this example, the electronic key information can be used as personal identification information about each family member.

With a door lock control system installed in the dwelling unit of interest, the main key information about each family member registered with the management server is stored into a storage unit of the door locking mechanism in response to an initial registration request submitted by a system-installing agent or by a user to the management server. The main key information thus stored is used for verification of electronic key information.

With this embodiment, as mentioned above, the identification information used as electronic key information may also be used as personal identification information. This feature can be utilized in managing the comings and goings of the residents of each dwelling unit through the shared entrance door or through the entrance door of the dwelling unit in question.

With this embodiment, the identification information composed of the above-mentioned IC chip production number is used as agent identification information for identifying each person in charge of a visit from each agent, the identification information being included in the agent information. This agent identification information is issued by a management company operating the management server, as follows:

An agent who wants to visit a dwelling unit or units of the multiple dwelling house first applies to the management company that runs the management server for permission to register as an authorized agent. Upon receipt of the application, the management company examines the agent on the qualifications for making an authorized visit. If the agent is found to be qualified, the management company assigns agent identification information to that agent. In correspondence with the agent identification information, the management company stores into the management server memory such agent information as the agent's name (e.g., shop name or company name), the name of a person actually in charge of a visit, and photo information about that person.

When registration of the qualified agent is completed as described above (that agent is called the registered agent hereunder), the management company issues an agent information communication apparatus with its memory containing the agent information including the agent identification information with regard to each person in charge of the visit. In this embodiment, as mentioned above, the agent information communication apparatus is an IC card equivalent to an electronic key apparatus, and the IC chip production number under the unified control scheme is used as the agent identification information. If there are a plurality of persons in charge of the visit from the agent that applied for and obtained authorization, each person is granted agent identification information. That is, each person in charge is furnished with an IC card.

The agent information registered with the management server is downloaded both to the shared entrance apparatus and to the door phone apparatus. The downloaded information is stored in the respective memories of the apparatuses for registration.

When paying a visit to a dwelling unit of a multiple dwelling house under contract with the management company, the person in charge of the visit from the registered agent has his or her IC card (i.e., agent information communication apparatus) communicating with the communicating means of the shared entrance apparatus set up at the shared entrance of the multiple dwelling house in question. At this point, the agent information including the agent identification information held in the IC card is transferred to the shared entrance apparatus.

In turn, the shared entrance apparatus compares the agent identification information in the received agent information with the agent identification information stored as part of the agent information in the memory so as to determine whether the visitor is a registered person dispatched from a registered agent. If the visitor is found to be a registered person visiting on behalf of a registered agent, the shared entrance apparatus controls the locking mechanism of the shared entrance door to let the person into the multiple dwelling house.

Once inside the multiple dwelling house, the registered person again has his or her IC card communicating with the communicating means of the door phone apparatus attached to the target dwelling unit. This causes the door phone apparatus to receive from the IC card (i.e., agent information communication apparatus) the agent information including the agent identification information. In turn, the door phone apparatus compares the agent identification information in the received agent information with the agent identification information held as part of the agent information in the memory, to determine whether the visitor is a registered person dispatched from a registered agent. Depending on the result of the comparison, the door phone apparatus controls the calling sound of the door phone in such a manner that the resident inside will know if the visitor is from a registered agent or someone else.

The agent identification information registered in the memory of the shared entrance apparatus is what may be called common agent information. The agent identification information registered in the memory of each dwelling unit is used as individual agent information specific to the dwelling unit in question. With this embodiment, as described, the agent information is furnished to the memory of the door phone apparatus at each dwelling unit by way of the shared entrance apparatus. It follows that the same agent information is initially registered with both the shared entrance apparatus and the door phone apparatuses.

The agent information in the door phone apparatus of each dwelling unit can be maintained by the dwelling unit users (i.e., residents). It might happen that an agent authorized to visit the multiple dwelling house is regarded as undesirable by the residents of some dwelling units of the house. In that case, the residents may set a delete flag to the agent identification information about the applicable agent in the door phone apparatuses of their dwelling units, whereby the agent information registered with the dwelling units is maintained as desired by their residents.

The dwelling unit storage box for each dwelling unit is installed illustratively near the entrance of the dwelling unit. That means any agent allowed to use the storage box must be someone authorized to visit the multiple dwelling house including the dwelling unit in question. With this embodiment, the dwelling unit storage box management apparatus references the agent information in the memory of the door phone apparatus at the same dwelling unit so as to determine whether the visitor is an agent authorized to use the storage box of the dwelling unit.

Those who are allowed to use the dwelling unit storage boxes make up a relatively limited group of agents, such as delivery services and laundrymen. Such agents may be registered by the residents of dwelling units directly with their door phone apparatuses or with their dwelling unit storage box management apparatuses.

Described below are more detailed structures and the typical workings of the shared entrance apparatus, door phone apparatus, and dwelling unit storage box management apparatus embodying the invention, as well as a communication system including these apparatuses.

[Outline of the System Including the Shared Entrance Apparatus, Door Phone Apparatus, and Dwelling Unit Storage Box Management Apparatus Embodying the Invention]

FIG. 1 is an explanatory view giving an outline of the communication system according to the invention. The system includes the shared entrance apparatus, door phone apparatuses, and dwelling unit storage box management apparatuses.

Outside the multiple dwelling house and near its shared entrance door 1 is a shared entrance apparatus 2 equipped with communicating means for communicating with an agent information communication apparatus or an electronic key apparatus implemented typically in the form of an IC card. The shared entrance apparatus 2 is furnished with numeric keys by which to enter a room number, a calling key, a microphone, a speaker, and a camera, as will be discussed later.

On the outer wall near the entrance doors 3(1), 3(2), 3(3), etc., of dwelling units making up the multiple dwelling house are exterior units 4A(1), 4A(2), 4A(3), etc., of door phone apparatuses 4(1), 4(2), 4(3), etc., each exterior unit having communicating means for communicating with the agent information communication apparatus or electronic key apparatus practiced as an IC card. Inside the dwelling units are door phone control units (i.e., interior units) 4B(1), 4B(2), 4B(3), etc., of the door phone apparatuses 4(1), 4(2), 4(3), etc.

Each of the exterior units 4A(1), 4A(2), 4A(3), etc., is provided with a calling key, a microphone, and a speaker. The door phone control units 4B(1), 4B(2), 4B(3), etc., are each furnished with a door unlocking key by which to control the locking mechanism of the shared entrance door 1 to unlock the door, along with a microphone, a speaker, and an LCD (liquid crystal display).

The exterior units 4A(1), 4A(2), 4A(3), etc., of the dwelling units are connected in wired or wireless fashion to the corresponding door phone control units 4B(1), 4B(2), 4B(3), etc., of the dwelling units. The connection allows the exterior and interior units of each dwelling unit to communicate voice signals as well as picture signals constituting a picture taken of a visitor by the camera of the exterior unit.

As mentioned above, the door phone apparatuses 4(1), 4(2), 4(3), etc., each made up of the exterior unit 4A and the door phone control unit 4B, are connected to the shared entrance apparatus 2 in wired or wireless fashion. The connection allows each door phone apparatus 4 and the shared entrance apparatus 2 to communicate voice signals, picture signals constituting a picture of a visitor taken by the camera of the shared entrance apparatus 2, and a release control signal issued by the door phone apparatus 4 toward the locking mechanism of the shared entrance door.

In this example, each of the door phone control units 4B(1), 4B(2), 4B(3), etc., set up indoors is also equipped with communicating means for communicating with the electronic key apparatus in the form of the IC card. Using the communicating means, the door phone control unit manages the comings and goings of the family members at each dwelling unit.

Although not shown in FIG. 1, the shared entrance door 1 of the multiple dwelling house and the entrance doors 3(1), 3(2), 3(3), etc., of the dwelling units are each furnished with a locking mechanism. The locking mechanism of the shared entrance door 1 is under control of the shared entrance apparatus 2. The residents of the multiple dwelling house each possessing an electronic key apparatus (IC card) and registered agents each carrying an agent information communication apparatus (IC card) manually hold the electronic key apparatus or agent information communication apparatus over the communicating means of the shared entrance apparatus 2. The shared entrance apparatus 2 using the resident information or the agent identification information registered therein checks the apparatus held over it for verification. If the resident or the agent holding the electronic key apparatus or agent information communication apparatus is verified as a registered resident or a registered agent, the shared entrance apparatus 2 unlocks the shared entrance door to let the person into the multiple dwelling house.

The locking mechanisms of the entrance doors 3(1), 3(2), 3(3), etc., of the dwelling units are controlled by the door phone apparatuses 4(1), 4(2), 4(3), etc., respectively. The residents of the multiple dwelling house each hold their electronic key apparatus (IC card) manually over the exterior units 4A(1), 4A(2), 4A(3), etc., of their door phone apparatuses. Each door phone apparatus using the resident information registered therein checks the apparatus held over it for verification. If the resident holding the electronic key apparatus is verified as a registered resident, the door phone apparatus unlocks the entrance door to let the person into the dwelling unit in question.

When an agent carrying an agent information communication apparatus (IC card) authorized to visit the multiple dwelling house manually holds the apparatus over the exterior units 4A(1), 4A(2), 4A(3), etc., of the target dwelling units, the calling sound of the corresponding door phone apparatuses 4(1), 4(2), 4(3), etc., may be varied to inform the residents inside whether the visitor is a registered agent or someone else.

The dwelling units constituting the multiple dwelling house are furnished with dwelling unit storage boxes 5(1), 5(2), 5(3), etc., each equipped with a door locking mechanism. Near the dwelling unit storage boxes 5(1), 5(2), 5(3), etc., are dwelling unit storage box management apparatuses 6(1), 6(2), 6(3), etc., set up to control the door locking mechanisms of the storage boxes.

In this setup, the dwelling unit storage box management apparatuses 6(1), 6(2), 6(3), etc., are connected to the corresponding door phone apparatuses 4(1), 4(2), 4(3), etc. The connection allows each dwelling unit storage box management apparatus to reference the resident information or agent information stored in the door phone apparatus of each dwelling unit.

The resident of each dwelling unit holds his or her electronic key apparatus manually over the communicating means of the storage box management apparatus for the dwelling unit in question. This allows the resident to unlock the storage box door to put things into the box or to collect goods from the box.

Of the agents carrying the agent information communication apparatuses (IC cards) allowed to visit the multiple dwelling house, those who are authorized to use the storage boxes of particular dwelling units may each hold their electronic key apparatus or agent information communication apparatus over the communicating means of the dwelling unit storage box management apparatuses 6(1), 6(2), 6(3), etc. This allows the authorized agents to unlock the storage box doors to deposit goods into the boxes or to collect things from the boxes.

As described, the doors of the dwelling unit storage boxes 5(1), 5(2), 5(3), etc., are equipped with locking mechanisms under control of the dwelling unit storage box management apparatuses 6(1), 6(2), 6(3), etc. The residents of the dwelling units or the agents authorized to use the dwelling unit storage boxes may unlock the doors so that the authorized agents may collect things from the boxes or deliver goods to particular dwelling unit residents using the boxes even in the absence of the residents.

The shared entrance apparatus 2 is connected via a telephone line 8 and a communication network 9 to a management server 10 operated by a management company. The management server 10 of the management company also receives the electronic key information and agent identification information from the shared entrance apparatus 2 or from other sources. Upon receipt of such information, the management server 10 checks the received information for verification.

The communication network 9 may be a public communication network such as a public telephone switching network or a mobile phone network or may be constituted by some other suitable network such as the Internet. A personal computer 11 is disposed so as to gain access to the management server 10 over the Internet. Mobile phone terminals may also be used to access the management server 10.

As described above, the management company is requested to issue IC cards used as electronic key apparatuses or agent information communication apparatuses. The requesting process allows the management server 10 to accumulate resident information and agent information. Items of such information are transferred from the management server 10 to the shared entrance apparatus 2 of the multiple dwelling house over the communication network 9 and telephone line 8 as well as to the door phone apparatuses 4 of the dwelling units by way of the shared entrance apparatus 2. The information thus transferred is registered in the memories of the respective apparatuses.

In FIG. 1 and in the description above dealing with what is included in that figure, reference numerals are suffixed (e.g., exterior units 4A(1), 4A(2), 4A(3), etc.) to indicate distinctly that the dwelling unit entrance doors, door phone apparatuses, dwelling unit storage boxes, and dwelling unit storage box management apparatuses are set up individually near the entrances of the corresponding dwelling units constituting the multiple dwelling house. However, since these dwelling unit entrance doors, door phone apparatuses, dwelling unit storage boxes, and dwelling unit storage box management apparatuses are virtually the same in structure in their respective categories, the apparatuses in each category may be designated generically hereunder by a single reference numeral indication without suffix (e.g., exterior unit 4A) unless it is specifically necessary to distinguish one apparatus from another.

What follows is a detailed description of how the shared entrance apparatus 2, door phone apparatus 4, and dwelling unit storage box management apparatus 6 are each typically structured and operated; and how the electronic key, agent information communication apparatus, and door locking mechanisms are typically structured.

[Typical Structure of the IC Card Practiced as the Electronic Key Apparatus or Agent Information Communication Apparatus]

As discussed above, the electronic key apparatus and agent information communication apparatus may each be implemented not only in the form of an IC card but also as a mobile phone terminal or as a PDA terminal. In any case, the electronic key apparatus and agent information communication apparatus each contain a control IC chip and a suitable communicating means. Where the electronic key apparatus and agent information communication apparatus are practiced as IC cards, each card is typically structured as described below.

FIG. 4A shows a surface of a typical IC card 70 inscribed with a card owner's name and an ID number and bearing a photo 70P of the card owner's face. The card owner is a family member if the IC card is an electronic key apparatus, or a person in charge of visits from an agent registered with the management server 10 if the IC card is an agent information communication apparatus.

FIG. 4B depicts a typical internal structure of the IC card 70. The IC card 70 incorporates a control IC 72 and an electromagnetic induction antenna 71 for communicating with a reader/writer of the door phone apparatus, to be described later.

Figure 5:
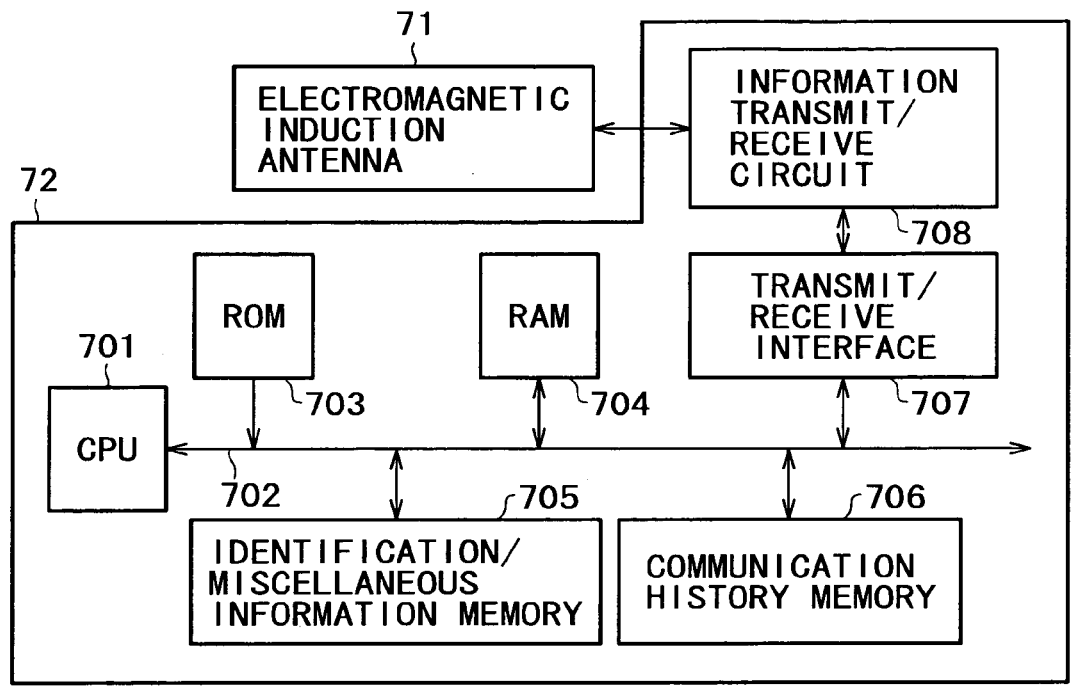
FIG. 5 is a block diagram depicting a typical structure of the electronic key apparatus and agent information communication apparatus of the invention for use with the embodiments.

FIG. 5 shows an internal block structure of the same IC card 70. Inside the IC card 70, a CPU (central processing unit) 701 is connected via a system bus 702 to a ROM (read only memory) 703, a work area RAM (random access memory) 704, an identification/miscellaneous information memory 705, a communication history memory 706, and a transmit/receive interface 707. The ROM 703 holds programs and data. The identification/miscellaneous information memory 705 stores personal information including identification information serving as electronic key information, or agent information including agent identification information.

The identification/miscellaneous information memory 705 also accommodates card type information indicating whether this IC card is an electronic key apparatus offering electronic key information, or an agent information communication apparatus carrying agent information. The reader/writer of the door phone apparatus checks the card type information included in the information received from an IC card in order to determine whether the IC card in question is an electronic key apparatus or an agent information communication apparatus.

The identification/miscellaneous information memory 705 retains either personal information including personal identification information constituted by an IC chip production number, or agent identification information including agent identification information which identifies each person in charge of visits from a registered agent and which is made up of an IC chip production number, as mentioned above.

It is possible to write to the communication history memory 706 the times at which the owner of this IC card 70 communicated with the reader/writer (to be described later) of the door phone apparatus, a history of such communications (e.g., communications established with either the interior or the exterior reader/writer), and information about the comings and goings of the card owner through the entrance. Such log and history information may also be recorded in the memory of the door phone apparatus 4 to manage the comings and goings of the family members through the entrance.

The transmit/receive interface 707 is connected to an information transmit/receive circuit 708. In turn, the information transmit/receive circuit 708 is connected to the electromagnetic induction antenna 71.

The CPU 701 acquires information that is received by the electromagnetic induction antenna 71 and forwarded through the information transmit/receive circuit 708 and transmit/receive interface 707 to the unit. The information thus acquired is written to the communication history memory 706 by the CPU 701.

[Structure of the Shared Entrance Apparatus]

Figure 6:
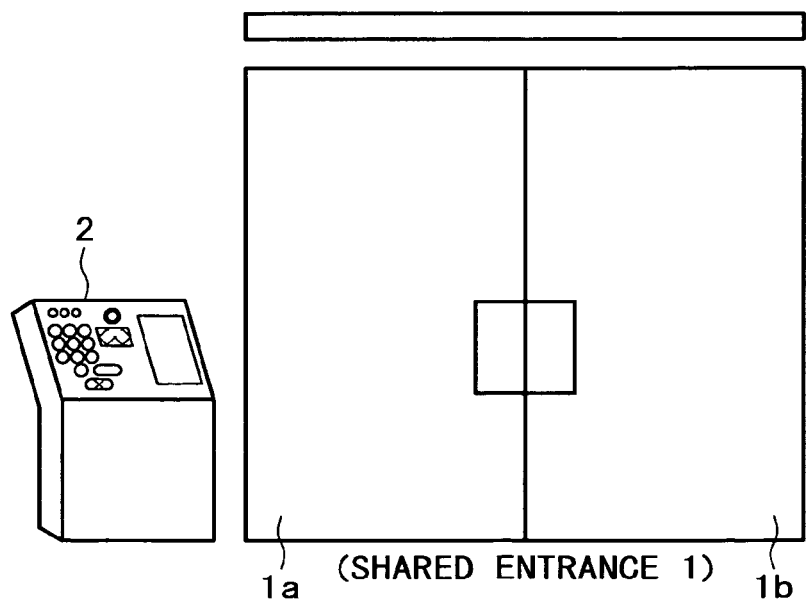
FIG. 6 is an explanatory view indicating a typical structure of a shared entrance apparatus according to the invention.
Figure 7:
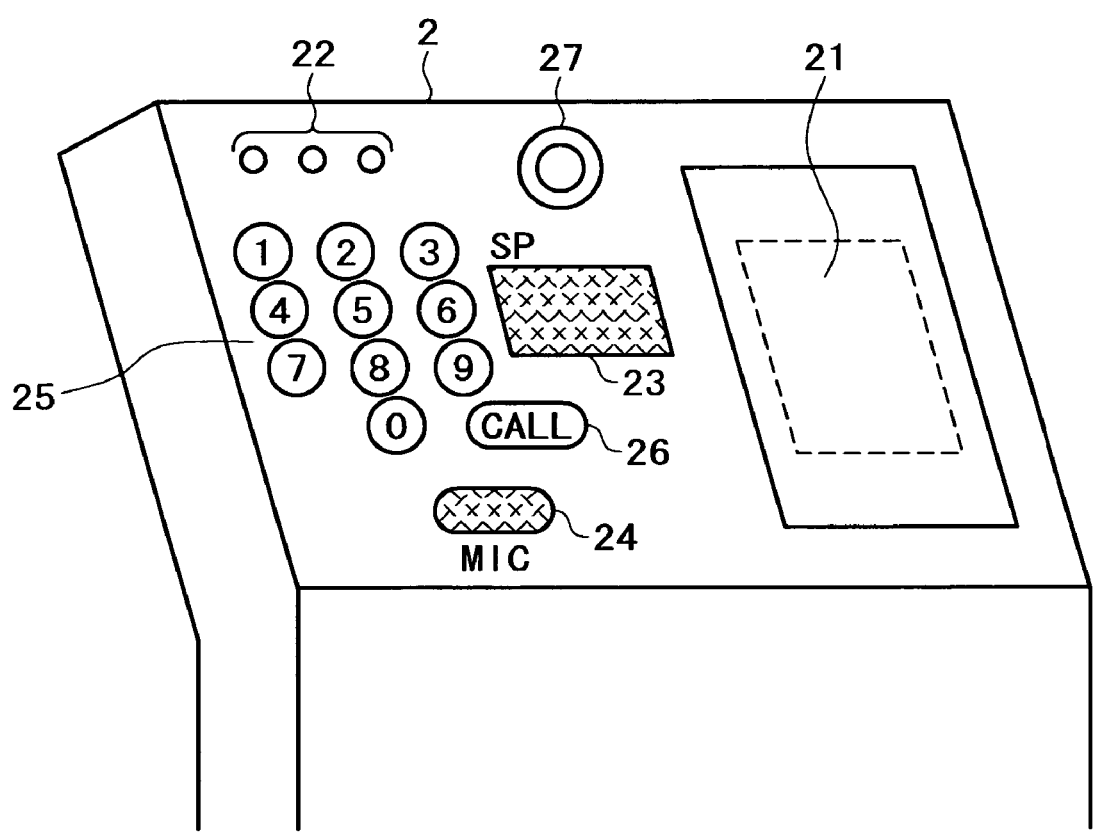
FIG. 7 is another explanatory view sketching the shared entrance apparatus of the invention.

As shown in FIG. 6, the shared entrance apparatus 2 is set up outside the multiple dwelling house by the side of the shared entrance door 1. FIG. 7 shows an external view of the shared entrance apparatus 2. The shared entrance apparatus includes a reader/writer 21 for communicating with an IC card embodying the electronic key apparatus or agent information communication apparatus, and exterior LED's (light emitting diodes) 22 as indicators for visually indicating the result of verification of electronic key information or agent identification information, as well as a locked or unlocked state of the shared entrance door 1.

The shared entrance apparatus 2 also includes a speaker 23 for audibly announcing the result of verification of electronic key information or agent identification information and a locked or unlocked state of the shared entrance door 1, a microphone 24, numeric keys (a ten-key pad) 25 by which to input a room number, a calling button 26, and a camera 27 for taking a picture of a visitor. The image pickup device of the camera 27 is illustratively a CCD (charge-coupled device).

A door lock control mechanism (door locking mechanism) attached to the shared entrance door 1 is structured as shown in FIGS. 8A and 8B. In this embodiment, the shared entrance door 1 has two shared entrance door elements 1a and 1b. Normally, only the shared entrance door element 1a is opened and closed; the other shared entrance door element 1b is opened specifically by a superintendent from the company managing the multiple dwelling house using a special key, so as to let illustratively a large object be carried into the house.

FIGS. 8A and 8B are explanatory views showing a typical structure of the door lock control mechanism of the shared entrance door 1. FIG. 8A depicts how the door lock control mechanism is typically furnished to the shared entrance door element 1a, as seen from outside the multiple dwelling house. FIG. 8B shows how the door lock control mechanism is typically mounted on the shared entrance door element 1a as seen from an edge of the door element 1a.

For this door lock control mechanism, the shared entrance door element 1a includes a shared entrance door latch 14, a locking part 12, and a door open-close sensor 13. Inside the shared entrance door element 1a is an electronic locking mechanism 130 controlled by an electronic locking mechanism drive unit included in the shared entrance apparatus 2.

The shared entrance door latch 14 slides perpendicularly to an edge 1c of the shared entrance door element 1a in response to a manual operation on an exterior door handle 1ex or an interior door handle 1in. Whether or not the shared entrance door element 1a is locked, the door latch 14 keeps the door element 1a latched by engaging with a concave part of an edge of the other shared entrance door element 1b opposite to the edge 1c of the door element 1a.

The locking part 12 is a component of the door lock control mechanism. When the electronic locking mechanism 130 is driven by the electronic locking mechanism drive unit (not shown in FIGS. 8A and 8B), the locking part 12 slides perpendicularly to the edge 1c of the shared entrance door. The locking part 12 is secured in a projected position from the edge 1c of the shared entrance door element 1a when the shared entrance door element 1a is locked, as shown in FIGS. 8A and 8B, and is set in a flush position when the shared entrance door element 1a is unlocked.

Although not shown, the edge of the other shared entrance door element 1b opposite to the edge 1c of the door element 1a has a concave portion that engages with the locking part 12 in the projected position. While the locking part 12 is being inserted in the concave portion, the shared entrance door remains locked. When the locking part 12 is retracted into the shared entrance door element 1a away from the concave portion, the door is unlocked.

The shared entrance door open-close sensor 13 is formed illustratively by an optical sensor. When the shared entrance door element 1a is opened, the sensor 13 senses the opening of the door by detecting exterior light; when the shared entrance door element 1a is closed, the sensor 13 senses the closing of the entrance door element 1a by detecting the absence of exterior light with the edge 1c of the door element 1a coming opposite to the edge of the other shared entrance door element 1b.

[Structure of the Door Phone Apparatus]

What follows is a description of the door phone apparatus 4 embodying the invention and furnished to each dwelling unit of the multiple dwelling house. As mentioned above, this door phone apparatus 4 is made up of the exterior unit 4A and the door phone control unit (interior unit) 4B, both shown in FIG. 1.

Figure 9A:
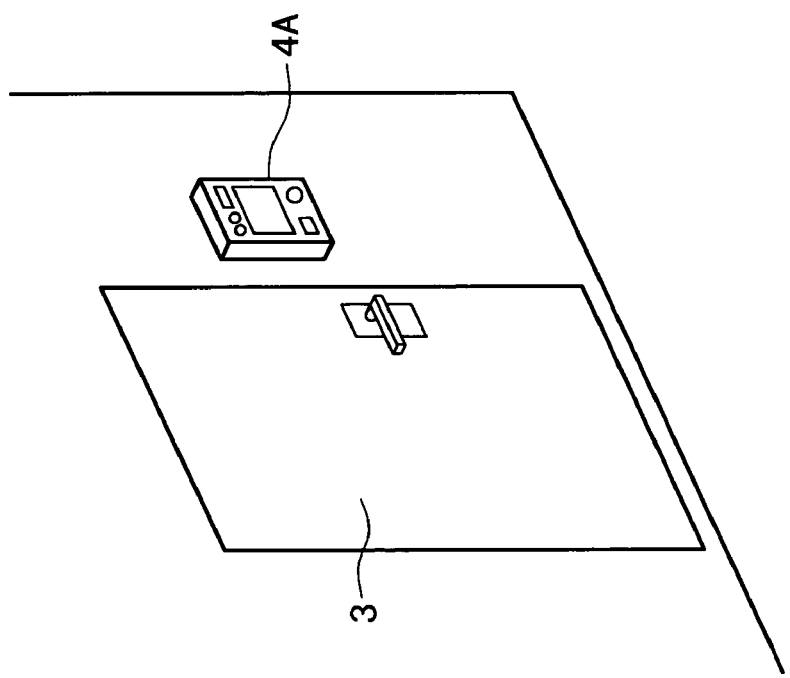
FIGS. 9A and 9B are explanatory views showing a typical structure of a door phone apparatus according to the invention.
Figure 10:
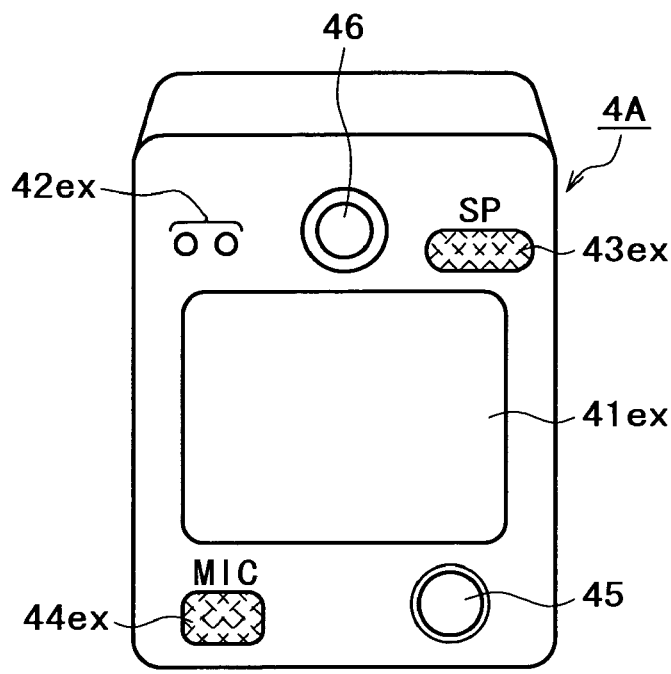
FIG. 10 is an explanatory view sketching the door phone apparatus of the invention.

The exterior unit 4A is mounted on the outer wall by the side of a dwelling unit entrance door 3 of each dwelling unit, as illustrated in FIG. 9A. FIG. 10 shows an external view of the exterior unit 4A. This exterior unit 4A includes: an exterior reader/writer 41ex for communicating with the IC card 70 embodying the electronic key apparatus or agent information communication apparatus; exterior LED's (light emitting diodes) 42ex as indicators for visually indicating the result of verification of electronic key information or agent identification information, and the locked or unlocked state of the entrance door 1; an exterior speaker 43ex for audibly announcing the result of verification of electronic key information or agent identification information, and the locked or unlocked state of the dwelling unit entrance door 3; a microphone 44ex; a door phone button 45; and a camera 46 for taking a picture of a visitor. The image pickup device of the camera 46 is illustratively a CCD.

Figure 9B:
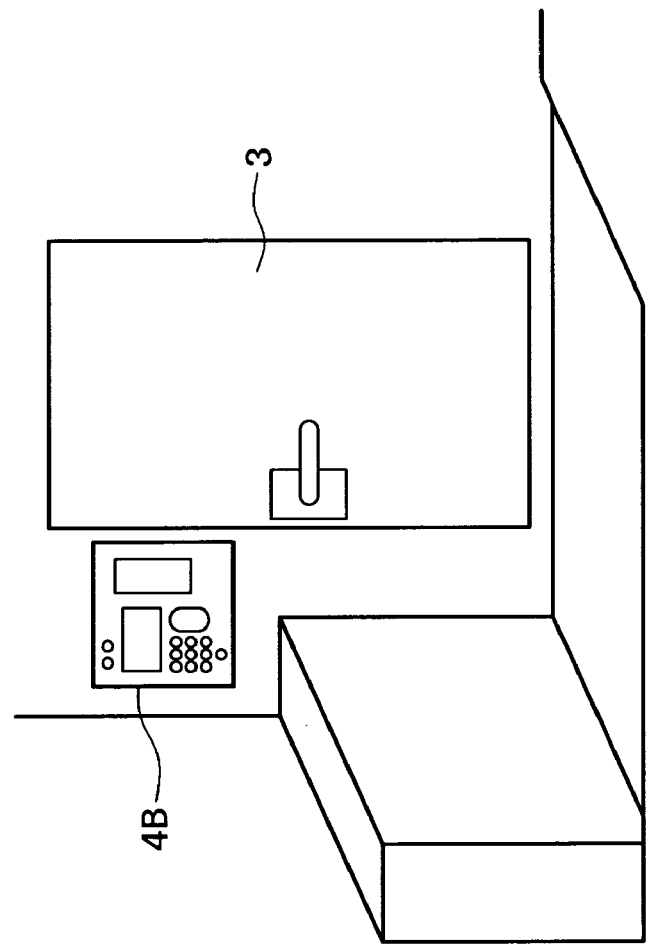
Figure 11:
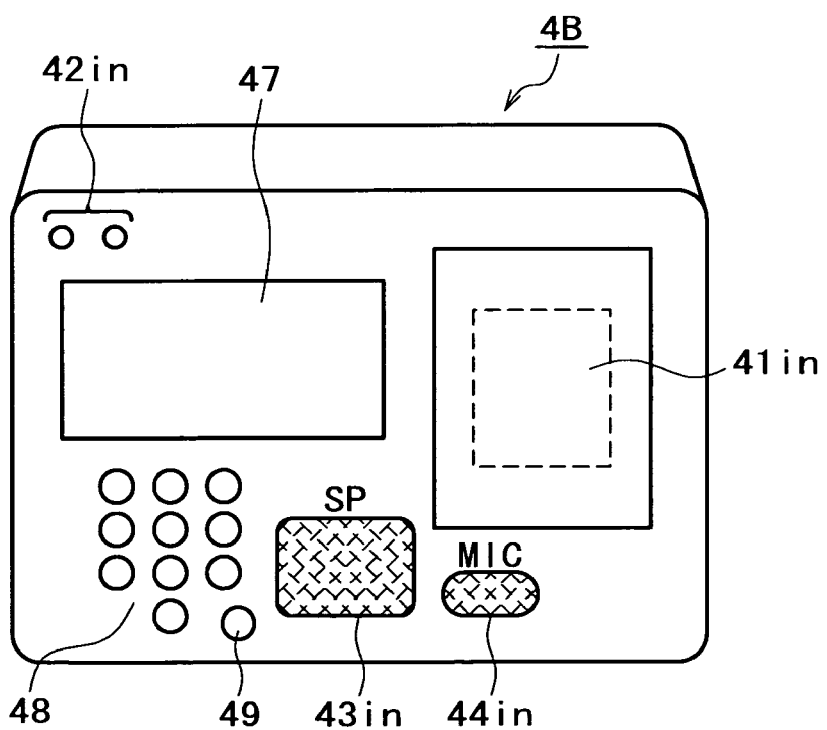
FIG. 11 is another explanatory view picturing the door phone apparatus of the invention.

The door phone control unit 4B is mounted on the inner wall by the side of the entrance door 3 of each dwelling unit, as shown in FIG. 9B. FIG. 11 gives an external view of the door phone control unit 4B. The interior unit 4B includes: an interior reader/writer 41in for communicating with the IC card 70 embodying the electronic key apparatus; interior LED's 42in as indicators for visually indicating the result of verification of electronic key information, and the locked or unlocked state of the entrance door 3; an interior speaker 43in for audibly announcing the result of verification of electronic key information, and the locked or unlocked state of the shared entrance door 1; and a microphone 44in.

The door phone control unit 4B further includes: an LCD 47 for displaying pictures taken by the camera 27 of the shared entrance apparatus 2 or by the camera 46 of the exterior unit 4A of this dwelling unit, as well as menus and guidance indications; a group of operation keys 48 by which to input items of information; and a shared entrance unlocking key 49 for unlocking the locking mechanism of the shared entrance door 1. Inside the door phone control unit 4B is a controller 400 that incorporates a microcomputer, to be discussed later. The interior reader/writer 41in of this embodiment will not communicate with the IC card 70 implemented as the agent information communication apparatus.

The door lock control mechanism furnished in the dwelling unit entrance door 3 of each dwelling unit is substantially the same in structure as the above-described door lock control mechanism provided in the shared entrance door 1. The door lock control mechanism for each dwelling unit is contained in its entrance door 3 and structured as shown in FIGS. 12A and 12B.

FIGS. 12A and 12B are explanatory views sketching a typical structure of the door lock control mechanism for each dwelling unit. FIG. 12A indicates how the door lock control mechanism is typically furnished to the dwelling unit entrance door 3, as seen from outside the dwelling unit. FIG. 12B shows how the door lock control mechanism is typically mounted on the dwelling unit entrance door 3 as seen from an edge of the entrance door 3.

For this door lock control mechanism, the dwelling unit entrance door 3 includes an entrance door latch 31, a locking part 32, and a door open-close sensor 33. Inside the dwelling unit entrance door 3 is an electronic locking mechanism 330 controlled by an electronic locking mechanism drive unit included in the door phone control unit 4B of the door phone apparatus.

The entrance door latch 31 slides perpendicularly to an edge 3a of the entrance door 3 of each dwelling unit in response to a manual operation on an exterior door handle 3ex or an interior door handle 3in. Whether or not the dwelling unit entrance door 3 is locked, the entrance door latch 31 keeps the door 3 latched by engaging with a concave part of an edge of the wall opposite to the edge 3a of the entrance door 3.

The locking part 32 is a component of the door lock control mechanism. When the electronic locking mechanism 330 is driven by the electronic locking mechanism drive unit (not shown in FIGS. 12A and 12B), the locking part 32 slides perpendicularly to the edge 3a of the dwelling unit entrance door 3. The locking part 12 is secured in a projected position from the edge 3a of the dwelling unit entrance door 3 when the dwelling unit entrance door 3 is locked as shown in FIGS. 12A and 12B, and is set in a flush position when the entrance door 3 is unlocked.

Although not shown, the edge of the wall opposite to the edge 3a of the dwelling unit entrance door 3 has a concave portion that engages with the locking part 32 in the projected position. While the locking part 32 is being inserted in the concave portion, the entrance door remains locked. When the locking part 32 is retracted into the entrance door 3 away from the concave portion, the door is unlocked.

The entrance door open-close sensor 33 is formed illustratively by an optical sensor. When the dwelling unit entrance door 3 is opened, the sensor 33 senses the opening of the door by detecting exterior light; when the dwelling unit entrance door 3 is closed, the sensor 33 senses the closing of the entrance door 3 by detecting the absence of exterior light with the edge 3a of the door 3 coming opposite to the edge of the wall.

[Internal Structure of the Shared Entrance Apparatus 2]

The shared entrance apparatus 2 incorporates a controller 100 for controlling the verification of electronic key information and agent identification information, as well as the locking and unlocking of the shared entrance door 1. FIG. 13 depicts a typical structure of the controller 200 in the shared entrance apparatus 2 according to the invention. In the description that follows, the IC card 70 is assumed to be used as the electronic key apparatus and agent information communication apparatus.

The controller 200 in the shared entrance apparatus 2 is structured as a microcomputer with its CPU 201 connected via a system bus 202 to: a ROM 203 that stores programs and data; a work area RAM 204; a resident information memory 205 that holds personal information including identification information (e.g., IC production numbers) serving as electronic key information about the residents of each dwelling unit of this multiple dwelling house; an agent information memory 206 that contains agent information about registered agents; a voice message memory 207 that retains various voice messages; and a communication interface 208 for connecting to the management server 10 through a communication line.

The resident information memory 205 and agent information memory 206 are each constituted illustratively by an EEPROM (electrically erasable programmable ROM).

The resident information memory 205 holds electronic key information composed of main key information and backup key information about each family member of each dwelling unit and registered with the management server 10, as will be discussed later. The resident information memory 205 may further accommodate information for identifying individual family members such as names, ages, sexes, relationships and other personal information. Registration of electronic key information into the resident information memory 205 will be described later.

The agent information memory 206, as will be described later, retains agent identification information about each person in charge of visits from each agent registered with the management server 10, as well as company names, names of the persons in charge, business categories, and other information about the registered agents. Registration of agent information into the agent information memory 206 will be discussed later.

The system bus 202 is connected through a selector 209 to each of the door phone control units 4B(1), 4B(2), 4B(3), etc., installed in the dwelling units making up this multiple dwelling house. The system bus 202 is also connected to the reader/writer 21 through an interface 210, to the LED's 22 through an LED drive unit 211, to the speaker 23 through a voice output interface 212, and to the microphone 24 through a voice input interface 213.

The system bus 202 is further connected to a button operation unit (numeric keys 25 and calling key 26) through a button interface 115 and to the camera 27 through a picture input interface 215.

The system bus 202 is also connected to the door open-close sensor 13 through an interface 216, to the electronic locking mechanism 130 that slides the locking part 12 through an electronic locking mechanism drive unit 217, and to a clock circuit 218 that offers clock and calendar information.

The reader/writer 21 constitutes a communication unit that communicates with the IC card 70. In this example, the reader/writer 21 includes an electromagnetic induction antenna and an information transmit/receive circuit unit.

This shared entrance apparatus 2 has auto lock mode that serves as a door lock control mode with regard to the door lock control mechanism. The auto lock mode is a mode in which the electronic locking mechanism 130 under control of the shared entrance apparatus 2 unlocks the shared entrance door 1 and locks it again automatically upon elapse of a predetermined time based on the communication between the reader/writer 21 and the IC card 70 acting as the electronic key apparatus.

With this embodiment, the shared entrance door 1 may illustratively be unlocked manually from inside the multiple dwelling house without recourse to the IC card 70. Alternatively, it is possible to set up inside the multiple dwelling house another shared entrance apparatus that opens the shared entrance door 1 only if those leaving the house have their identify properly authenticated. This setup will ensure further security in controlling the traffic of people through the shared entrance door of the multiple dwelling house.

[Internal Structure of the Door Phone Apparatus 4]

Figure 14:
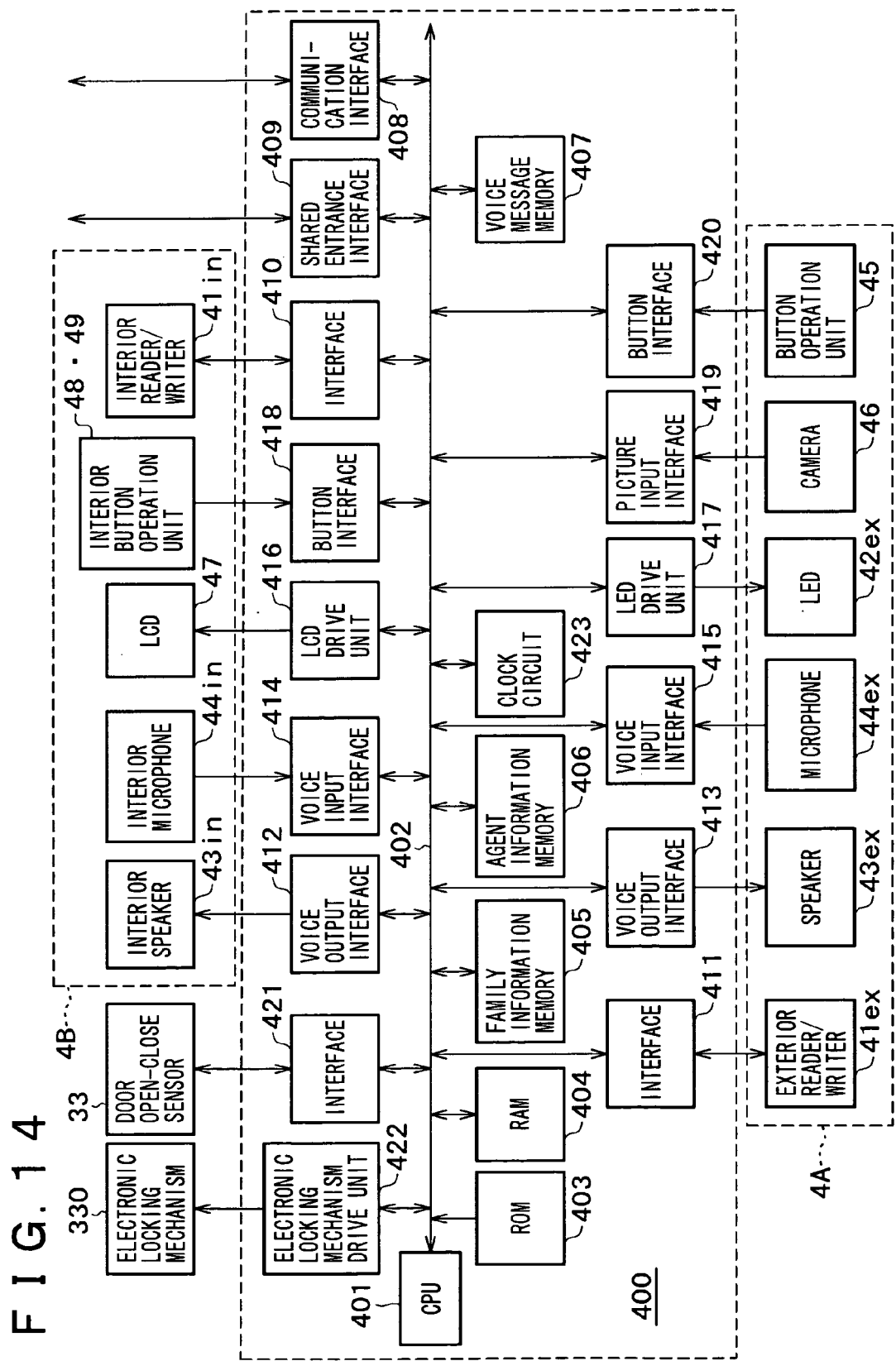
FIG. 14 is a block diagram of key components constituting the door phone apparatus of the invention.

What follows is a description of the door phone apparatus 4 installed mainly at the entrance of each dwelling unit. As discussed above, the door phone apparatus 4 is made up of two units: the exterior unit 4A positioned outside the entrance of the dwelling unit, and the door phone control unit 4B installed inside the dwelling unit. The door phone control unit 4B incorporates the controller 400 for controlling the verification of electronic key information and agent identification information, as well as the locking and unlocking of the entrance door. FIG. 14 illustrates a typical structure of the controller 400 in the door phone apparatus 4 according to the invention. In the description that follows, the IC card 70 is assumed to be used as the electronic key apparatus and agent information communication apparatus.

The controller 400 in the door phone control unit 4B is structured as a microcomputer with its CPU 401 connected via a system bus 402 to: a ROM 403 that stores programs and data; a work area RAM 404; a family information memory 405 that holds personal information including identification information (e.g., IC production numbers) serving as electronic key information about individual family members; an agent information memory 406 that contains agent information about registered agents; a voice message memory 407 that retains various voice messages; a communication interface 408 for communicating illustratively with a personal computer; and a shared entrance interface 409 for communicating with the shared entrance apparatus 2.

The family information memory 405 and agent information memory 406 are each constituted illustratively by an EEPROM. The family information memory 405 corresponds to the resident information memory 205 included in the shared entrance apparatus 2. Whereas the resident information memory 205 of the shared entrance apparatus 2 holds information about all residents of this multiple dwelling house, the family information memory 405 of the door phone apparatus 4 for each dwelling unit stores information only about the family members living in that dwelling unit.

The family information memory 405, as will be discussed later, contains electronic key information made up of main key information and backup key information about each family member and registered with the management server 10. The family information memory 405 may also accommodate information for identifying individual family members such as names, ages, sexes, relationships and other personal information. Registration of electronic key information into the family information memory 405 will be described later.

The agent information memory 406, as will be described later, retains agent identification information about each person in charge of visits from each agent registered with the management server 10, as well as company names, names of the persons in charge, business categories, and other information about the registered agents. Registration of agent information into the agent information memory 406 will be discussed later.

The system bus 402 is connected to the interior reader/writer 41in and exterior reader/writer 41ex through interface 410 and 411 respectively. The system bus 402 is also connected to the exterior LED's 42ex through an exterior LED drive unit 417, to the interior speaker 43in through a voice output interface 412, and to the external speaker 43ex through a voice output interface 413.

The system bus 402 is further connected to the interior microphone 44in through a voice input interface 414, to the exterior microphone 44ex through a voice input interface 415, to the camera 46 through a picture input interface 419, to an interior button operation unit (the group of operation keys 48 and shared entrance door unlocking key 49) through a button interface 418, and to an exterior button operation unit (door phone button 45) through a button interface 420. Although not shown in FIG. 14, the interior LED's 42in are also connected to the system bus 402 through an interior LED drive unit.

The system bus 402 is also connected to the door open-close sensor 33 through an interface 421, to the electronic locking mechanism 330 for sliding the locking part 32 through an electronic locking mechanism drive unit 422, and to a clock circuit 423 that offers clock and calendar information.

The exterior reader/writer 41ex and interior reader/writer 41in constitute a communication unit that communicates with the IC card 70. In this example, the exterior reader/writer 41ex and interior reader/writer 41in include an electromagnetic induction antenna and an information transmit/receive circuit unit each.

This door phone apparatus 4 has two control modes, i.e., auto lock mode and successive lock mode, with regard to the door lock control mechanism.

The auto lock mode is a mode in which the electronic locking mechanism under control of the door phone control unit unlocks the shared entrance door 1 and locks it again automatically upon elapse of a predetermined time based on the communication between the reader/writers 41ex and 41in on the one hand and the IC card 70 acting as the electronic key apparatus on the other hand. In the auto lock mode, it should be noted, both the exterior and the interior reader/writers 41ex and 41in are always used.

The successive lock mode is a mode in which the electronic locking mechanism under control of the door phone control unit locks the unlocked entrance door or unlocks the locked entrance door (i.e., reverses the current state of the door lock) based on the communication between at least the exterior reader/writer 41ex of the entrance door 1 on the one hand and the IC card 70 on the other hand. It is possible to use both the exterior and the interior reader/writers 41ex and 41in in the successive lock mode. Alternatively, where the entrance door is locked from inside using separate manual locking means, the entrance door may be locked and unlocked on the basis of the communication between only the exterior reader/writer 41ex and the IC card 70. This successive lock mode simulates the conventional method for locking and unlocking the door.

In this example, selective setting of the auto lock mode or successive lock mode as the door lock control mode is carried out illustratively on the door phone control unit 4B by a worker installing the door phone apparatus at the dwelling unit.

Information specifying which of the two control modes has been established is kept in a nonvolatile memory, not shown, inside the controller 400 of the door phone control unit. By referring to this information in its nonvolatile memory, the controller 400 recognizes either the auto lock mode or the successive lock mode as the door lock control mode being established for this door phone apparatus.

Alternatively, selective setting of the auto lock mode or successive lock mode as the door lock control mode may be performed on the door phone apparatus illustratively at the time of its shipment from the factory. As another alternative, the door phone control unit 4B of the door phone apparatus may include input operation means such as a DIP switch that may be operated by a worker installing the door phone apparatus at the dwelling unit. Upon installation of the apparatus, the worker may set an appropriate door lock control mode using the input operation means.

As mentioned above, it is the management server 10 that provides information to be placed into the resident information memory 205 and agent information memory 206 of the shared entrance apparatus 2, as well as into the family information memory 405 and agent information memory 406 of the door phone apparatus 4 for each dwelling unit.

Illustratively, the superintendent of the multiple dwelling house having adopted this embodiment of the invention gains access to the management server 10 through the personal computer 11 to request provision of resident information and agent information. In response to the request, the management server 10 provides the resident information and agent information it holds regarding the multiple dwelling house having issued the request, to the shared entrance apparatus 2 of that multiple dwelling house.

The resident information, as mentioned earlier, is information about all residents of the multiple dwelling house in question. On receiving the resident information, the shared entrance apparatus 2 places it into the resident information memory 205. In keeping with the personal identification information and room numbers included in the received resident information, the shared entrance apparatus 2 provides the door phone apparatus 4 of each dwelling unit with the information about the family members living in the dwelling unit in question. The door phone apparatus 4 of each dwelling unit receives the applicable family information out of the resident information held by the shared entrance apparatus 2, and places the received information into the family information memory 405 for subsequent use.

The resident information and family information are each made up of identification information and personal information about each of the residents or family members. In this specification, the information composed of the identification information and personal information is called personal profile information.

The agent information held by the shared entrance apparatus 2 is basically the same as what is to be stored in the door phone apparatus of each dwelling unit. For that reason, upon receiving the agent information from the management server 10, the shared entrance apparatus 2 places the received information into the agent information memory 206 and forwards the information to the door phone apparatus 4 of each dwelling unit. At each dwelling unit, the door phone apparatus 4 receives the agent information from the shared entrance apparatus 2 and places the received information into the agent information memory 406 for subsequent use.

The agent information delivered by the shared entrance apparatus 2 to each dwelling unit may be maintained by use of the door phone apparatus 4 of the dwelling unit in question. If a resident of a particular dwelling unit does not want to receive visits of a specific agent who is nevertheless authorized to visit this multiple dwelling house, that agent can be barred from visiting the dwelling unit in question by its resident taking suitable steps.

FIG. 15 shows typical personal profile information about one person to be stored in the IC card 70 serving as the electronic key apparatus, in the resident information memory 205, and in the family information memory 405. As shown in FIG. 15, the personal profile information is made up of personal identification information and personal information kept in correspondence with each other. In this example, as mentioned above, the personal identification information per person is composed of an IC chip production number. The personal identification information identifies a specific person when kept in correspondence with relevant personal information. The identification information serves as electronic key information as described above. The electronic key information may be registered in two parts, i.e., main key information and backup key information, as shown in FIG. 15. A plurality of items of backup key information may be registered per person.

In the example of FIG. 15, the personal information is constituted by the person's password information, name, address, room number, date of birth, age, relationship to other family members, date of registration, bank account number, telephone number (mobile phone number or other telephone number that can be reached for contact with the person), e-mail address, IP address, information about tastes and preferences, history information about comings and goings through the dwelling unit entrance, and electronic key registration/missing history information. These items of information are retained in the resident information memory 205 and family information memory 405.

The history information about comings and goings in the example of FIG. 15 is for use by the door phone apparatus 4 of each dwelling unit. The information includes the times of day at which the person in question left and returned to the dwelling unit, as well as an at-home/absent flag indicating whether the person is currently at home or absent.

The electronic key registration/missing history information contains records of the backup registration and erasure of electronic key information. More specifically, when the management server 10 issues requests for backup registration or erasure of electronic key information, the door phone apparatus 4 registers the electronic key information for backup or deletes the information accordingly. At such times, the dates and times of the backup registration and erasure are recorded along with the distinction between backup registration and erasure for each registering or deleting process performed.

The IC card 70 retaining the personal profile information of FIG. 15 also holds card type information (enclosed by broken lines in the figure) indicating that this card is an electronic key apparatus.

Although it has been explained that the same personal profile information is stored in the resident information memory 205 of the shared entrance apparatus 2 as well as in the family information memory 405 of the door phone apparatus 4 in each dwelling unit, this is not limitative of the information. Alternatively, the identification information alone about all residents of this multiple dwelling house may be placed into the resident information memory 205 because the shared entrance apparatus 2 is intended to ascertain each visitor to be a resident of the house or a registered agent; the personal information need not be held in the resident information memory 205.

FIG. 16 depicts typical agent information. As shown in FIG. 16, the agent information is made up of agent identification information and detailed agent information kept in correspondence with each other. In this example, as discussed above, the agent identification information per agent is formed by an IC chip production number. The agent identification information identifies a particular person in charge of visits from a specific agent when kept in correspondence with relevant detailed agent information. This agent information is stored in the IC card 70 serving as the agent information communication apparatus and in the agent information memories 206 and 406.

In the example of FIG. 16, the detailed agent information is constituted by the agent's password information, business category, company name (shop name), address, information about person in charge, date of registration, bank account number, telephone number, e-mail address, and visit history information. The business category is illustratively delivery service, mailing service, laundry, or insurance.

The information about person in charge includes a specific person's name, sex, age, and face photo information. The face photo information may be omitted upon storage of the agent information into the IC card 70. The visit history information of this example includes destinations of visits and the times of day at which the visits were made.

The IC card 70 retaining the agent information of FIG. 16 also holds card type information (enclosed by broken lines in the figure) indicating that this card is an agent information communication apparatus.

The agent information includes a pickup permission flag and a delivery permission flag. The pickup permission flag permits the use of the dwelling unit storage box 5 for pickup of goods inside only by the authorized agents such as a laundryman picking up the washing. The delivery permission flag allows the use of the dwelling unit storage box 5 for delivery of goods by the authorized agents such as delivery services.

[Structure of the Management Server 10]

FIG. 17 depicts a typical structure of the management server 10. The management server 10 is structured as a computer with its CPU 301 connected via a system bus 302 to: a ROM 303 that stores programs and data, a work area RAM 304, a management database 305, an electronic key registration/missing history memory 306, a communication interface 307 for communicating illustratively with the Internet, a web page memory 308, and a picture/voice memory 309.

The management database 305 includes a personal information memory unit 305A and an agent information memory unit 305B. The personal information memory unit 305A accommodates items of information necessary for the management of the shared entrance door lock and security of the multiple dwelling house by the shared entrance apparatus 2 of this embodiment. Illustratively, the memory unit 305A holds a serial number of the shared entrance apparatus 2 of the multiple dwelling house, along with the address, telephone number, IP address, and emergency contact telephone number of the multiple dwelling house where the shared entrance apparatus 2 is installed under contract with the management company. The telephone numbers and IP address of the multiple dwelling house constitute address information about the shared entrance apparatus 2 over the communication network 9.

The personal information memory unit 305A further contains items of information necessary for the management of the door lock and security of each dwelling unit by the door phone apparatus 4 of this embodiment. Illustratively, the memory unit 305A holds a serial number of the door phone apparatus 4 for each dwelling unit of the multiple dwelling house; the address, telephone number, and IP number of the dwelling unit in question where this door phone apparatus 4 is installed; names of the users of the door phone apparatus 4; and personal profile information associated with the registered electronic key information. The telephone number and IP address make up address information about the door phone apparatus 4 over the communication network 9.

Where each door phone apparatus 4 is assigned its own telephone number and IP address as described, the management server 10 can directly deal with the door phone apparatus 4 of each particular dwelling unit for family information maintenance and other purposes without the intervention of the shared entrance apparatus 2.

The agent information memory unit 305B accommodates agent information about the agents that applied to the management company for registration and successfully passed the company's scrutiny before being registered. The registration procedure will be discussed later.

The electronic key registration/missing history memory 306 holds a history of the registration of electronic key information and of any electronic key apparatuses that are missing. A history of the registration of agent information communication apparatuses and any missing apparatuses among them is also stored in this memory 306.

The web page memory 308 retains display information about the web pages held in this server. In accordance with instructions from the CPU 301, information necessary for displaying desired web pages is retrieved from the web page memory 308 and sent out through the communication interface 307 over the communication network.

The picture/voice memory 309 accommodates picture and voice information that may be sent in from the shared entrance apparatus 2 or from any particular door phone apparatus 4 illustratively when the apparatus in question is operated fraudulently. The management server 10 checks pictures and voices sent from the shared entrance apparatus 2 or door phone apparatuses 4, informs a security company of relevant information, and provides users with desired picture and voice information through the web pages upon request.

Diverse procedures and operations performed by the communication system of the above-described structure will now be described.

[Registration of Electronic Key Information and Agent Information]

Figure 18:
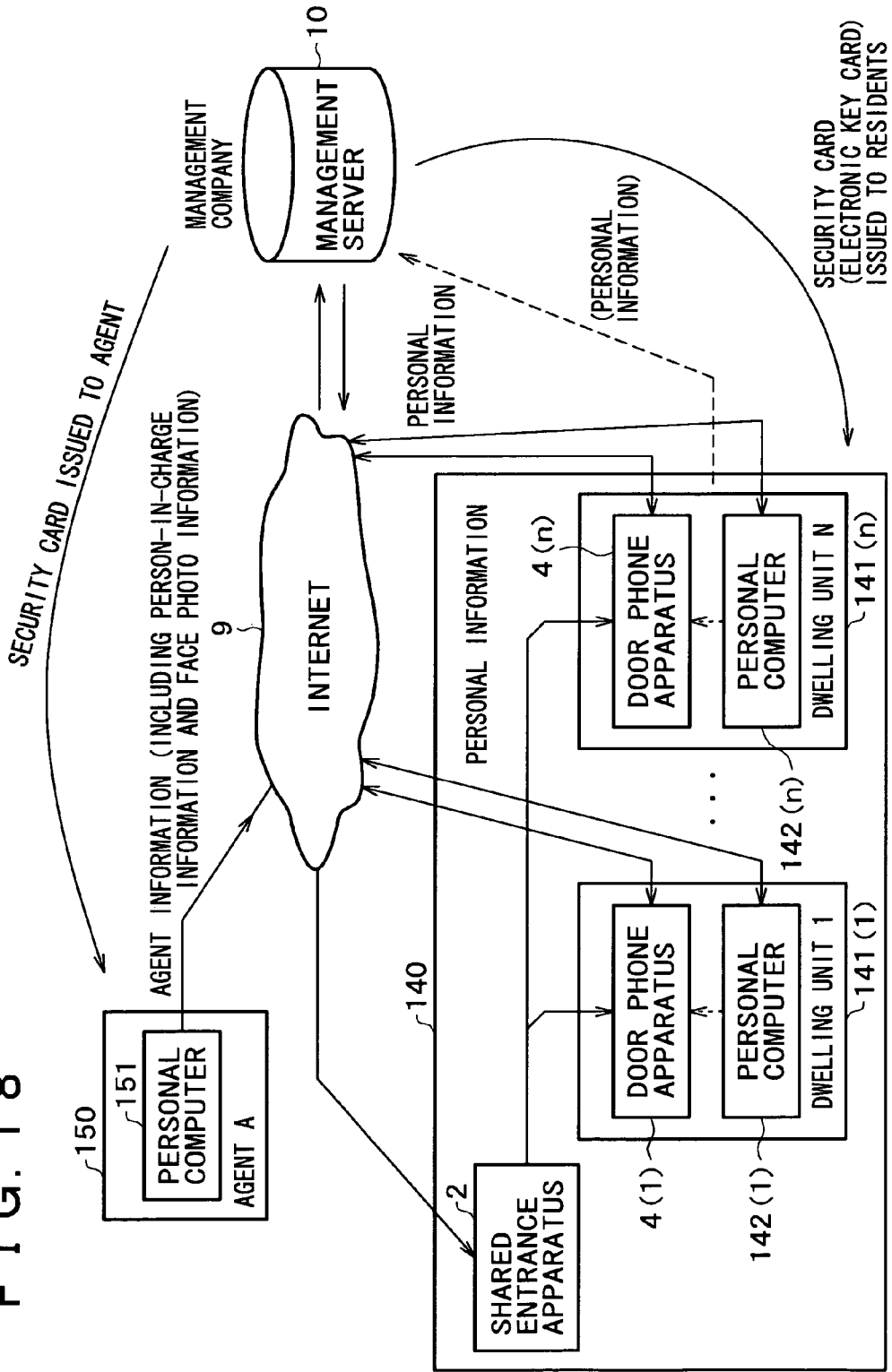
FIG. 18 is an explanatory view showing how electronic key information and agent information are illustratively registered.

FIG. 18 is an explanatory view showing how electronic key information and agent information are illustratively registered with the management server 10. How electronic key information is registered will be discussed first.

[Registration of Electronic Key Information]

When moving into the dwelling units constituting the multiple dwelling house, the residents sign a contract with the management company that maintains and manages the shared entrance apparatus 2 of the house and the door phone apparatus 4 of each dwelling unit. The electronic key information about each resident is registered (i.e., stored) in the management server 10 for management by the management company.

It is not desirable for identification information to be registered easily for use as electronic key information. For that reason, registration of identification information as electronic key information in this example involves steps that emphasize security. Illustratively, identification information is registered by the vendor of the shared entrance apparatus 2 and door phone apparatuses 4, by the agent entrusted with installation work of the apparatuses, by users of these apparatuses, or by the superintendent of the multiple dwelling house.

Main key information is registered in this example as follows. An IC card is used as the electronic key apparatus that stores identification information serving as initial main key information. This IC card is handed over to each of the residents moving in, from the vendor or installing agent of the shared entrance apparatus 4 and door phone apparatuses 2 or from the superintendent of the multiple dwelling house.

For this embodiment, personal information is collected on each of the family members before they move into the dwelling units of this multiple dwelling house. The personal information thus collected is stored in the management server 10. Personal information may be collected in a number of ways: by the residents filling out questionnaires on paper or gaining access to the management server 10 for a web page for personal information collection by using the residents' personal computers 142(1), . . . , 142(n), whereby the residents submit their personal information.

The management company collects the personal information about the family members of dwelling units 141(1), . . . , 141(n) as described above, places the collected information into the management server 10, and issues to each of the family members the IC card 70 containing the collected personal information and identification information serving as main key information. Personal profile information is constituted by the identification information as the main key information held in each IC card 70 and by the personal information collected above.

The personal information memory unit 305A of the management database 305 in the management server 10 accommodates in advance user information such as a product number (e.g., serial number) of each door phone apparatus 4, the address and telephone number of the dwelling unit where the door phone apparatus 4 in question is installed, and the names of the family members using the door phone apparatus 4, along with the above-mentioned personal profile information about each family member. That is, the main key information about each family member is registered beforehand with the management server 10 as part of the personal profile information about the family member in question.

The memory in the IC card 70 issued to each family member contains part or all of the personal information stored in the management server 10.

In this case, the management database 305 of the management server 10 has the personal profile information about the family members stored in correspondence with the address information about the door phone apparatus 4 over the communication network. In this example, the address information is made up of telephone numbers and IP addresses as discussed above.

An initial registration request is made to the management server 10 of the management company on one of two occasions: when the vendor or installing agent of the shared entrance apparatus 2 and door phone apparatuses 4 has finished installing the apparatuses, or when the superintendent of the multiple dwelling house requests the management server 10 for initial family information registration in a suitably timed manner after the residents to move into each dwelling unit of the house have been determined but are yet to move in. In response to that request, the main key information and personal profile information about the family members registered with the management server 10 are transferred from the server 10 to the shared entrance apparatus 2 and written to the resident information memory 205 of the shared entrance apparatus 2 for registration. The main key information and personal profile information are further transferred from the shared entrance apparatus 2 to the door phone apparatuses 4 of each applicable dwelling unit and written to the family information memory 405 of the door phone apparatus 4 for registration.

In the manner described, the information about the residents of the applicable dwelling units in the multiple dwelling house, the identification information placed in the IC cards handed over to the residents, and other necessary information are written to the resident information memory 205 of the shared entrance apparatus 2 of this multiple dwelling house, as well as to the family information memory 405 of the door phone apparatus 4 installed in each of the dwelling units involved. After registration of the information, it becomes possible to unlock the shared entrance door 1 and entrance door 3 of a particular dwelling unit from outside using the applicable IC card.

Although it has been explained that the family information and agent information are sent to the door phone apparatus 4 of each dwelling unit through the shared entrance apparatus 2 of the multiple dwelling house, this is not limitative of the invention. Alternatively, it is possible to arrange the door phone apparatus 4 of each dwelling unit to connect with the communication network so that the management server 10 may directly provide the door phone apparatus 4 in question with the applicable family information as well as the agent information about the agents authorized to visit the multiple dwelling house.

As another alternative, a personal computer 142 owned by a resident of each dwelling unit may be used to receive from the management server 10 the family information applicable to the dwelling unit in question along with the agent information about the agents authorized to visit the multiple dwelling house. The information thus acquired is sent from the personal computer 142 to the door phone apparatus 4 of the dwelling unit and written to the memory therein.

If there has been a change of families or family members at a particular dwelling unit, the door phone apparatus 4 or personal computer 142 of that dwelling unit may be used to access the management server 10 to report the change. Any information resulting from the change on the part of the management server 10 may then be returned from the server 10 to the door phone apparatus 4 or to the personal computer 142 of the dwelling unit in question. In such a case, the resulting information is sent from the management server 10 either directly to the shared entrance apparatus 2 of the multiple dwelling house or through the door phone apparatus 4 of the dwelling unit involved to the shared entrance apparatus 4 for registration.

[Registration of Agent Information with the Management Company]

An agent 150 desirous of visiting the dwelling units in the multiple dwelling house under contract with the management company applies to that company for agent registration, as shown in FIG. 18. The application for agent registration may be made by the agent 150 either in person at the management company or by using a personal computer 151 owned by the agent 150 to access the web page for agent registration application at the management server 10 via the communication network 9 such as the Internet.

Upon receipt of the agent registration application, the management company examines the candidate agent to determine whether or not to authorize the agent for visits to the house. When the agent has successfully passed the scrutiny, the management company collects the above-mentioned detailed agent information on the now-authorized agent. The detailed agent information thus collected is placed into the agent information memory unit 305B of the management database 305 in the management server 10 along with the agent identification information discussed above. The management company then issues to the registered agent an agent information communication apparatus (IC card 70 in this example) that holds agent information including the agent identification information about the agent.

An initial registration request is then made to the management server 10 of the management company on one of two occasions: when the vendor or installing agent of the door phone apparatuses 4 has finished installing the apparatuses, or when the superintendent of the multiple dwelling house requests the management server 10 for initial agent information registration in a suitably timed manner after the residents to move into each dwelling unit of the house have been determined but are yet to move in. In response to that request, the agent information including the agent identification information is transferred from the management server 10 to the shared entrance apparatus 2 and written to the agent information memory 206 of the shared entrance apparatus 2 for registration. The information is further transferred from the shared entrance apparatus 2 to the door phone apparatuses 4 of each dwelling unit and written to the agent information memory 406 of the door phone apparatus 4 for registration.

The management company is ready to receive agent registration applications at all times. Every time additional agent information is registered with the management server 10, the information is transferred from the server 10 to the shared entrance apparatus 2 of the multiple dwelling house under contract and from the shared entrance apparatus 2 on to the door phone apparatus 4 of each dwelling unit in the house for additional registration.

The management company is also ready to receive at all times requests for change of persons in charge of visits from registered agents. When registered persons in charge of visits from a registered agent are changed in the management server 10, the change-related information is transferred from the server 10 to the shared entrance apparatus 2 of the multiple dwelling house under contract and from the shared entrance apparatus 2 on to the door phone apparatus 4 of each dwelling unit in the house for person-in-charge update registration.

Figure 19:
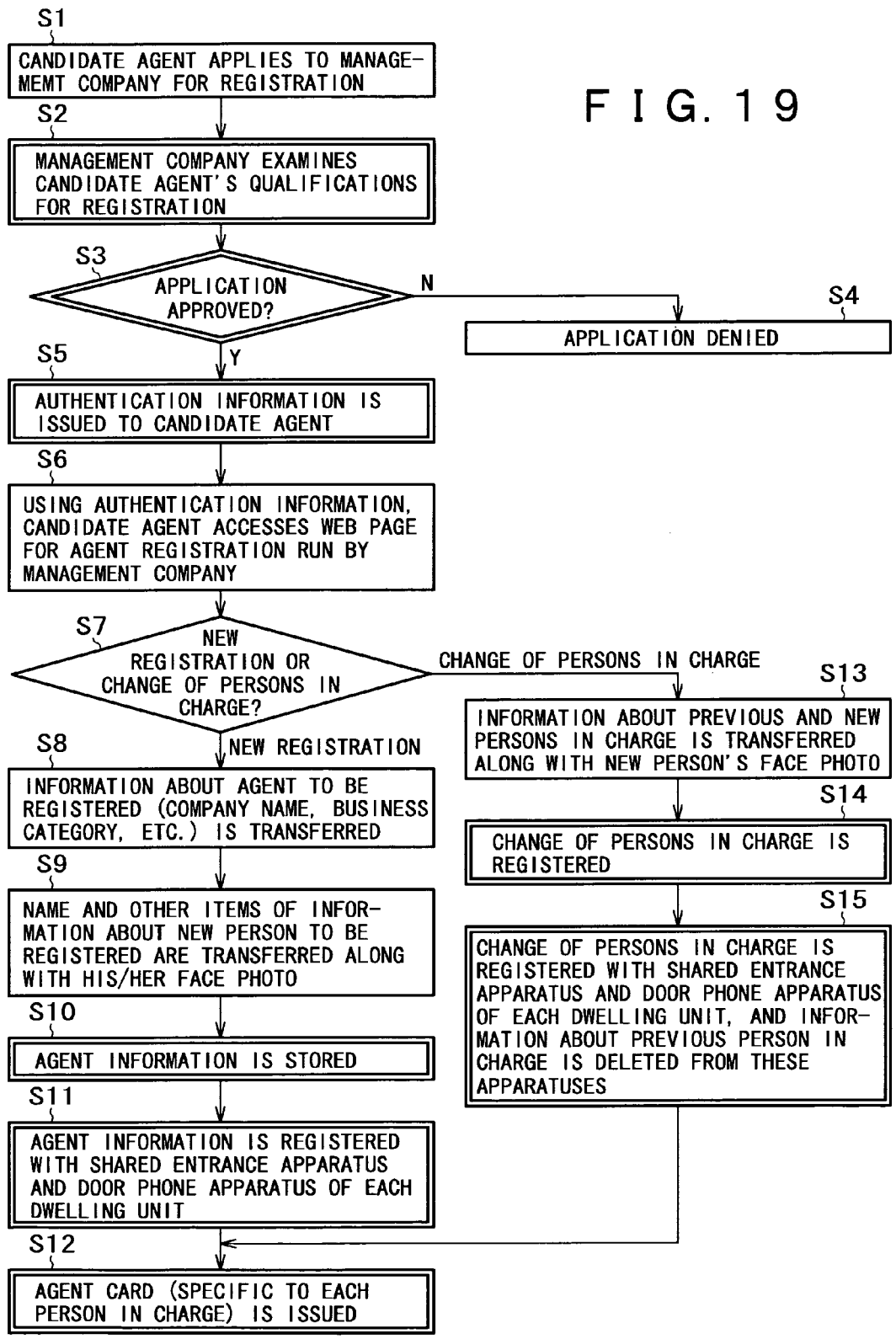
FIG. 19 is a schematic view outlining procedures for registering agents with a management company.

FIG. 19 is a flowchart of steps for registering agents with the management company. In FIG. 19, the steps enclosed by double lines are performed by the management server 10 and the other steps are carried out by the agent.

An agent desirous of making visits to the dwelling units in the multiple dwelling house under contract with the management company initially applies to the management company for registration (step S1). Upon receipt of the agent registration application, the management company examines the candidate agent (step S2) The management company then determines, based on the result of the determination, whether or not to authorize the agent for visits to the house (step S3).

If the candidate agent is found lacking in qualifications, and therefore cannot be approved for registration, the management company notifies the agent thereof and denies the application (step S4). If the candidate agent is found to be well-qualified and can be approved for registration, the management company issues a password constituting authentication information to the agent (step S5).

Given the password, the agent using the personal computer 151 gains access to the web page for agent registration at the management server 10 of the management company. That is, inputting the received password allows the agent to access the web page for registration (step S6).

The web page for agent registration permits new registration of an agent or change of persons in charge of visits from a registered agent (including addition of persons). After gaining access to the web page, the agent selects either new registration or change of persons in charge (step S7).

Where new registration is selected, the agent transfers its agent information such as the company name (shop name) and business category it operates in to the management server 10 (step S8). The agent further transfers the name, sex and other relevant information about the person in charge to be registered with the management server 10 together with face photo information about that person (step S9).

On receiving these items of information, the management server 10 stores into the agent information memory 305B of the management database 305 the agent information made up of the detailed agent information received in correspondence with agent identification information composed of an IC chip production number specific to the IC card 70 to be issued to the agent (step S10). The card issuing procedure will be discussed later in more detail.

The agent information thus stored is transferred from the management server 10 to the shared entrance apparatus 2 of the multiple dwelling house under contract and from that shared entrance apparatus 2 on to the door phone apparatus 4 of each dwelling unit in the multiple dwelling house for registration purposes (step S11).

On receiving a registration request from the management server 10, the shared entrance apparatus 3 additionally writes the received agent information to the agent information memory 206 for registration, as will be described later in more detail. After the registration, the shared entrance apparatus 2 transfers the added agent information to the door phone apparatus 4 of each dwelling unit for additional registration. In this manner, the newly added agent information is written to both the shared entrance apparatus 2 and the door phone apparatus 4 of each dwelling unit in the multiple dwelling house.

The management company then issues to the registered agent an IC card 70 containing the agent information including the agent identification information stored in the management database (step S12). This IC card 70 is issued to each person in charge of visits from the registered agent as mentioned above.

If what was selected in step S7 above is the change of persons in charge, then the agent in question sends to the management server 10 information about the previous and new persons in charge along with face photo information about the new person (step S13). On receiving the information about the change of persons in charge, the management server 10 updates the person-in-charge registration about the agent in question in the agent information memory unit 305B of the management database 305 (step S14). A new IC card 70 is reissued to the new person in charge, as will be described later. New agent information with its agent identification information composed of a new IC card chip production number is written to the agent information memory unit 305B for renewed registration.

The updated information about the new person in charge of visits from the registered agent is transferred from the management server 10 to the shared entrance apparatus 2 of the multiple dwelling house under contract and from that shared entrance apparatus 2 on to the door phone apparatus 4 of each dwelling unit in the house, whereby the agent registration is updated in the shared entrance apparatus 2 and dwelling unit door phone apparatuses 4 (step S15).

On receiving a request for change of persons in charge from the management server 10, the shared entrance apparatus 2 updates the person-in-charge information in the corresponding agent information held in the agent information memory 206, as will be described later. The update of the registration involves deleting the information about the previous person in charge and writing information about the new person in its place. After the update of the person-in-charge registration, the shared entrance apparatus 2 transfers the updated person-in-charge information to the door phone apparatus 4 of each dwelling unit, whereby the person-in-charge registration in the corresponding agent information is updated in the agent information memory 406.

The management company then issues to the newly registered person in charge an IC card 70 that contains the agent information along with the agent identification information having been written in the management database (step S12).

Figure 20:
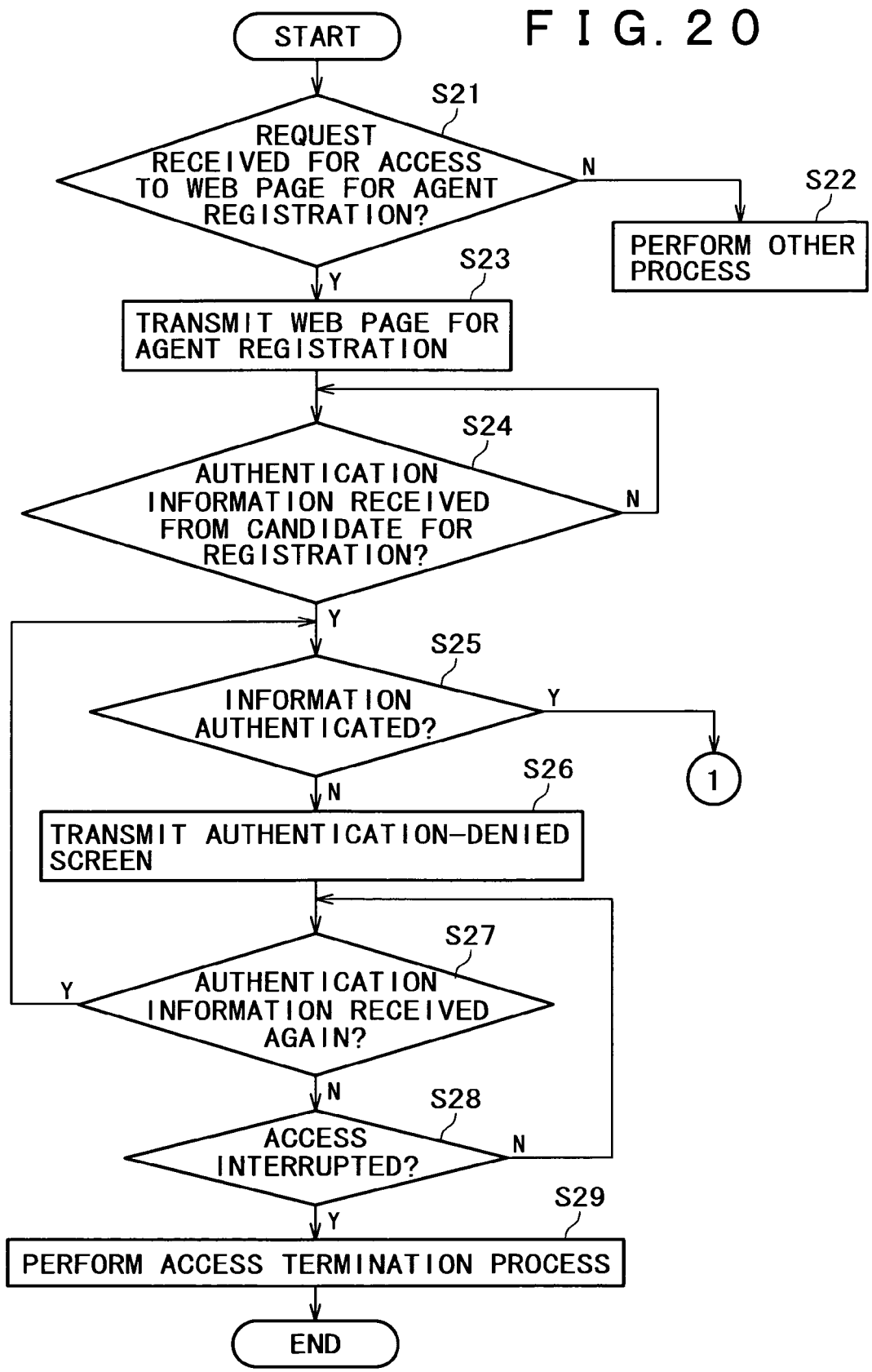
FIG. 20 is a flowchart of steps for registering agent information with the management company.

FIG. 20 is a flowchart of steps performed by the management server 10 for registering agent information as outlined in FIG. 19. Each of the steps in FIG. 20 is carried out by the CPU 301 of the management server 10 using programs in the ROM 303.

An agent using the personal computer 151 gains access through the Internet to the web page for agent registration at the management server 10.

The management server 10 checks continuously for such an attempt to access the web page for agent registration (step S21). While the web page is not being accessed, the management server 10 performs some other process (step S22). When the web page for agent registration is found to be accessed, the CPU 301 transmits information for displaying the web page for agent registration (step S23).

The web page for agent registration is displayed on a screen of the personal computer 151. The screen also displays a message prompting the agent to input authentication information, along with fields in which to input the information. Viewing the message, the agent inputs through the fields such authentication information as a predetermined password, the addresses and telephone numbers of the places where the shared entrance apparatus 2 and door phone apparatuses 4 are installed, and the company name of the agent requesting the registration. The authentication information thus input is transmitted to the management server 10.

The management server 10 determines whether the authentication information has been received (step S24). Upon receipt of the information, a check is made to see if the information is authenticated (step S25). If the received information is not authenticated (authentication denied), then an authentication-denied screen is transmitted to the personal computer 151 (step S26).

On the screen indicating the denial of authentication, the agent may either input the authentication information again or terminate the access. The agent chooses one of the two options.

The CPU 301 of the management server 10 determines whether the authentication information is again received (step S27). If the information is not received, a check is made to determine whether the access is terminated (step S28). If the access is not found to be terminated, step S27 is again reached. If the authentication information is found to be received again in step S27, the CPU 301 returns to step S25 and determines whether the received information is authenticated. If the access is found to be terminated in step S28, then the CPU 301 performs an access termination process (step S29).

Figure 21:
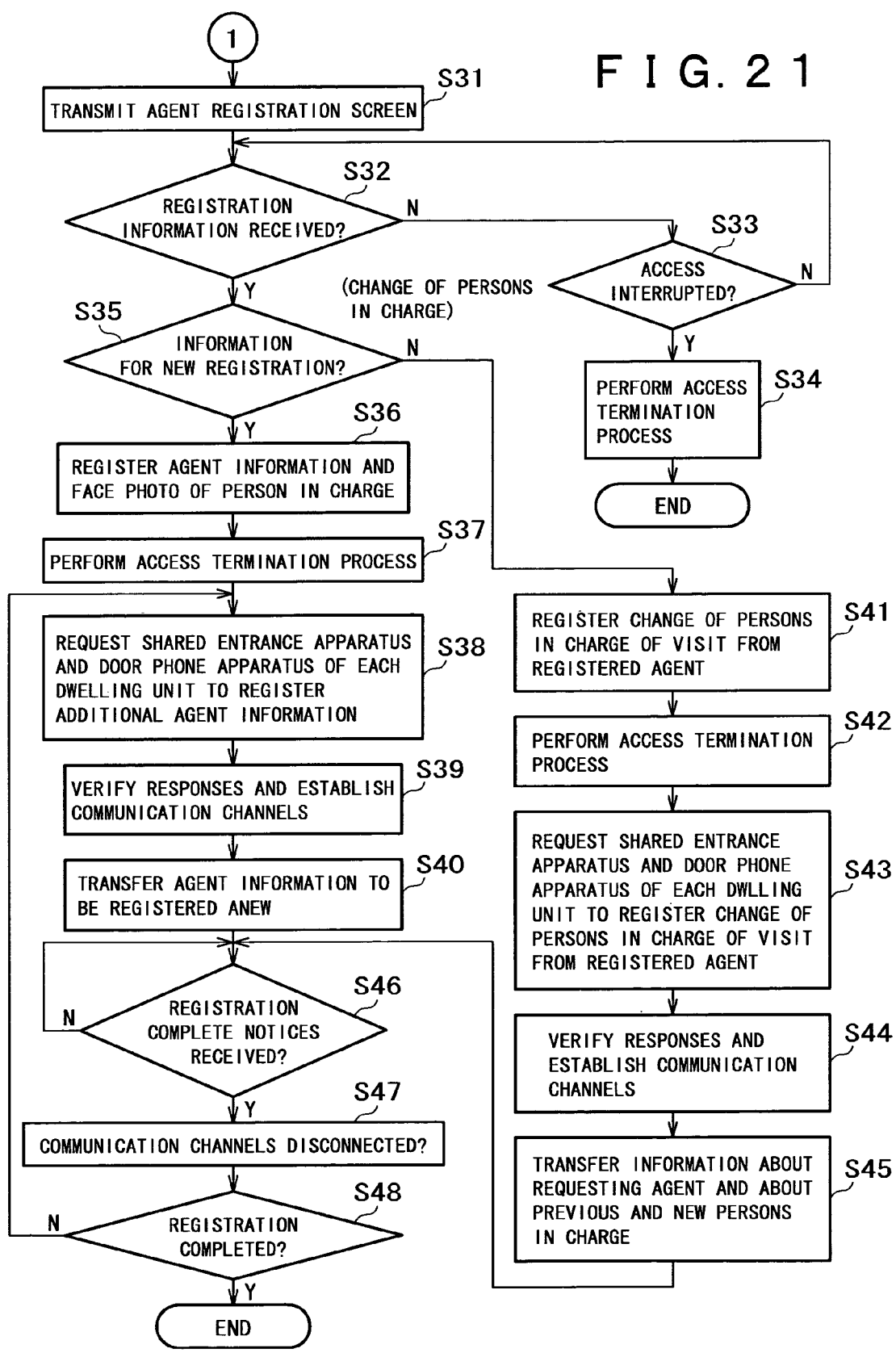
FIG. 21 is another flowchart of steps for registering agent information with the management company.

If in step S25 the received information is authenticated, then the CPU 301 transmits an agent registration screen (step S31 in FIG. 21). The agent registration screen includes a new registration button, a person-in-charge registration change button, and an access termination button. The agent selects one of the three buttons. For registration as a newly registered agent, the candidate agent clicks on the new registration button. For the change of persons in charge, the agent clicks on the person-in-charge registration change button.

If the new registration button is clicked on, the personal computer 151 transmits to the management server 10 detailed agent information about the agent desirous of being newly registered, in the manner described above. If the person-in-charge registration change button is clicked on, the personal computer 151 transmits information for changing persons in charge to the management server 10 as described.

Clicking on the access termination button terminates the process of agent registration.

The CPU 301 of the management server 10 determines whether registration information is received (step S32). If no information is found to be received, a check is made to determine whether the access is terminated (step S33). If the access is not found terminated, step S32 is reached again.

If in step S33 the access is found to be terminated, the CPU 301 performs an access termination process (step S34) and closes the web page for agent registration. If in step S32 the registration information is found to be received, the CPU 301 determines whether the information is for new registration or for change of persons in charge (step S35). If the received information is found to be for new registration, the CPU 301 writes agent information about the registration-requesting agent to the agent information memory unit 305B of the management database 305, the agent information being made up of the detailed agent information received and of the agent identification information composed of an IC chip production number specific to an IC card to be issued later (step S36). The agent information also includes face photo information about the person in charge of visits, as discussed above.

After the access is terminated (step S37), the CPU 301 issues a request for additional agent information registration to the shared entrance apparatus 2 of the multiple dwelling house under contract (step S38). The shared entrance apparatus 2 responds automatically to the additional agent information registration request, which causes the CPU 301 to establish a communication channel with the shared entrance apparatus 2 (step S39).

The CPU 301 then transmits the agent information to be registered anew to the shared entrance apparatus 2 (step S40). After transmitting all necessary information to the shared entrance apparatus 2, the CPU 301 waits for a registration complete notice to arrive from the shared entrance apparatus 2 (step S46). On receiving the registration complete notice, the CPU 301 disconnects the communication channel with the shared entrance apparatus 2 (step S47).

The CPU 301 determines whether the agent information has been transmitted to and registered with the shared entrance apparatuses 2 of all multiple dwelling houses under contract (step S48). If there exists the shared entrance apparatus 2 of any multiple dwelling house under contract where the registration has yet to be complete, step S38 is reached again. The CPU 301 then reissues the request for agent information registration to the shared entrance apparatus 2 in question and repeats the subsequent steps described above. If in step S48 the agent information is found to have been sent to and registered with the shared entrance apparatuses 2 of all multiple dwelling houses under contract, the CPU 301 terminates the agent registration processing routine.

From the shared entrance apparatus 2 of the multiple dwelling house, the agent information is transferred to the door phone apparatus 4 of each dwelling unit in the multiple dwelling house for registration with the agent information memory 406 as discussed above following the writing of the information received from the management server 10 to the agent information memory 206 of the apparatus 2.

If in step S35 the received information is found to be for change of persons in charge, the CPU 301 proceeds to change the person-in-charge registration of the registered agent in the manner described above (step S41).

After terminating the access (step S42), the CPU 301 transmits a request for changing person-in-charge registration in agent information to the shared entrance apparatus 2 of each multiple dwelling house under contract (step S43). The shared entrance apparatus 2 responds automatically to that request, which causes the CPU 301 to establish a communication channel with the apparatus 2 in question (step S44).

The CPU 301 then transmits to the shared entrance apparatus 2 the information about the changed person-in-charge registration including information on the previous and new persons in charge of visits (step S45). After transmitting all necessary information to the shared entrance apparatus 2, the CPU 301 waits for a registration complete notice to arrive from the shared entrance apparatus 2 (step S46). On receiving the registration complete notice, the CPU 301 disconnects the communication channel with the shared entrance apparatus 2 (step S47).

The CPU 301 determines whether the changed person-in-charge registration in the agent information has been transmitted to the shared entrance apparatuses 2 of all multiple dwelling houses under contract (step S48). If there exists the shared entrance apparatus 2 of any multiple dwelling house under contract where the registration has yet to be complete, step S38 is reached again. The CPU 301 then reissues the request for changed person-in-charge registration to the shared entrance apparatus 2 in question and repeats the subsequent steps described above. If in step S48 the changed person-in-charge registration is found to be complete with the shared entrance apparatuses 2 of all multiple dwelling houses under contract, the CPU 301 terminates the agent registration processing routine.

The steps shown in FIGS. 19, 20 and 21 apply where additional agent information is to be registered with the shared entrance apparatus 2 of the multiple dwelling house already under contract. Where any multiple dwelling house signs a contract anew with the management company, the shared entrance apparatus 2 of the multiple dwelling house and the door phone apparatus 4 of each dwelling unit in the multiple dwelling house receive and register all relevant agent information that has been stored so far in the agent information memory unit 305B of the management database 305 in the management server 10. The registration is carried out in the manner described above as soon as the apparatuses are installed.

Figure 22:
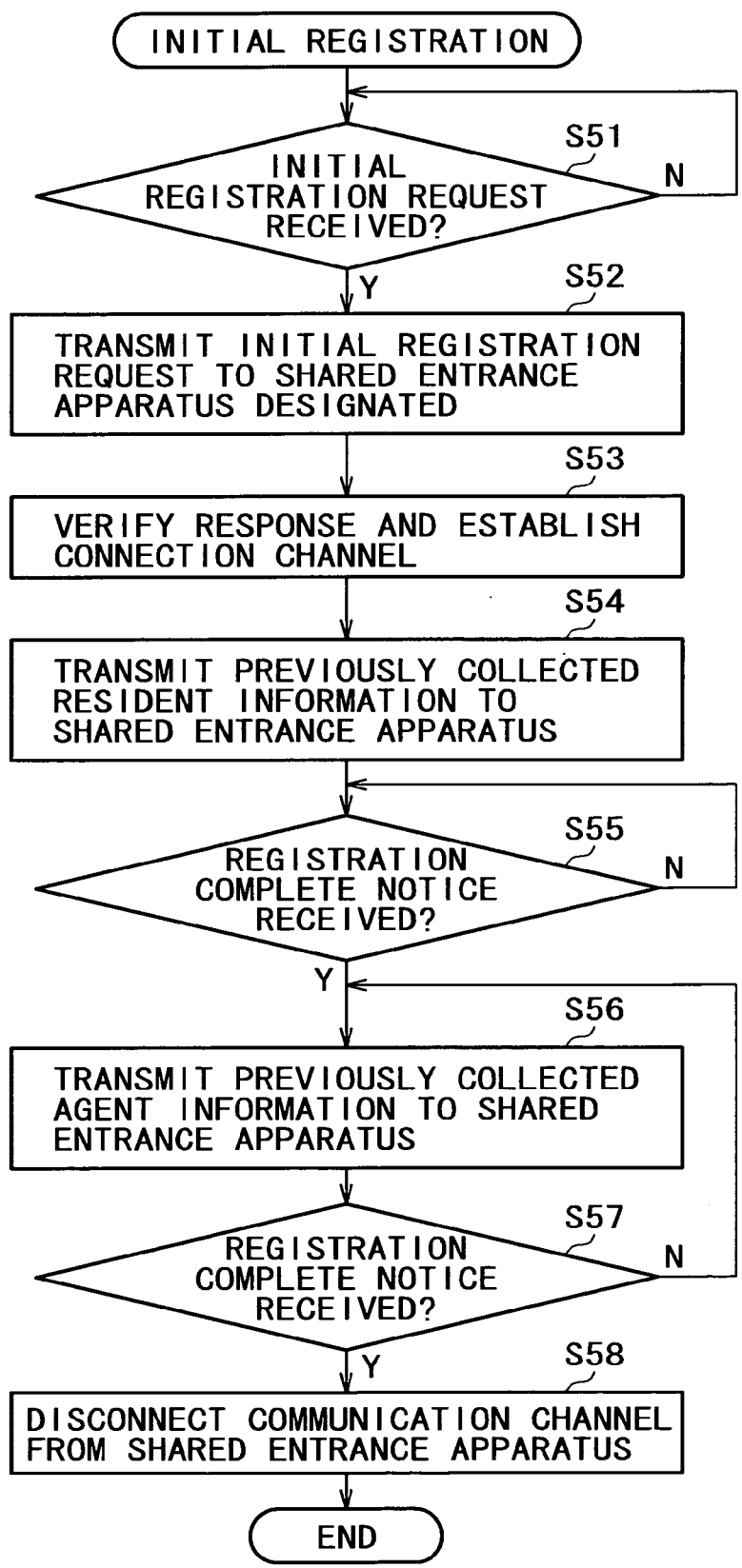
FIG. 22 is a flowchart of steps for initially registering personal profile information and agent information with the shared entrance apparatus following receipt of the information from the management server.

FIG. 22 is a flowchart of steps performed by the management server 10 at the time of initial registration. These steps in FIG. 22 are executed primarily by the CPU 301. The initial registration is started illustratively by the agent installing the shared entrance apparatus 2 and door phone apparatuses 4; the installing agent transmits an initial registration request to the management server 10 upon completion of apparatus installation.

More specifically, the installing agent having installed the shared entrance apparatus 2 and dwelling unit door phone apparatuses 4 transmits the initial registration request from a personal computer over the communication network 9 to the management server 10, together with apparatus identification information constituted illustratively by serial numbers of the installed apparatuses.

Alternatively, the installing agent having installed the shared entrance apparatus 2 and dwelling unit door phone apparatuses 4 may call an operator at the management company by phone to report the initial registration request. Given the request, the operator may proceed to take steps for the requested initial registration.

In response to the initial registration request, the management server 10 searches its management database for the address (or telephone number) of the shared entrance apparatus 2 of the multiple dwelling house which is under contract and which has originated the request. When the address of the shared entrance apparatus 2 is retrieved, the management server 10 gains access to that apparatus 2 using its address and carries out the following steps for initial registration:

The CPU 301 of the management server 10 first determines whether an initial registration request is received (step S51). On receiving the request, the CPU 301 searches the management database for the previously registered telephone number using the apparatus identification information as a keyword. With the telephone number retrieved, the CPU 301 originates a call including the initial registration request. That is, the CPU 301 originates the initial registration request to the shared entrance apparatus 2 of the multiple dwelling house having made the request (step S52).

The shared entrance apparatus 2 responds automatically to that request, which causes the CPU 301 to verify the response and establish a communication channel with the shared entrance apparatus 2 in question (step S53).

The CPU 301 then transmits to the shared entrance apparatus 2 the personal profile information including the main key information about all family members living in each dwelling unit of the multiple dwelling house; the information has been kept in the personal information memory 305A of the management database 305 in the management server 10 in correspondence with the door phone apparatus 4 of the dwelling unit in question (step S54).

After transmitting all necessary information to the shared entrance apparatus 2, the CPU 301 waits for a registration complete notice to arrive from the shared entrance apparatus 2 (step S55). On receiving the registration complete notice, the CPU 301 transmits the agent information about all agents that have been registered up to that point to the shared entrance apparatus 2; the agent information has been kept in the agent information memory unit 305B of the management database 305 in the management server 10 (step S56).

The CPU 301 determines whether all necessary information to be sent to the shared entrance apparatus 2 has been transmitted thereto and a registration complete notice is received therefrom (step S57). Upon receipt of the registration complete notice, the CPU 301 disconnects the communication channel with the shared entrance apparatus 2 (step S58), and terminates the initial registration processing routine.

Alternatively, the initial registration request may be transmitted automatically from the shared entrance apparatus 2 to the management server 10 over the communication network 9 when an operation designated specifically for the requesting purpose is performed on the shared entrance apparatus 2. In such a case, the shared entrance apparatus 2 establishes a communication channel over the communication network 9 with the management server 10. The initial registration request is then transmitted along with apparatus identification information such as a serial number of the shared entrance apparatus 2 to the management server 10 through the communication channel. In response, the management server 10 carries out step S54 and subsequent steps shown in FIG. 22.

Figure 23:
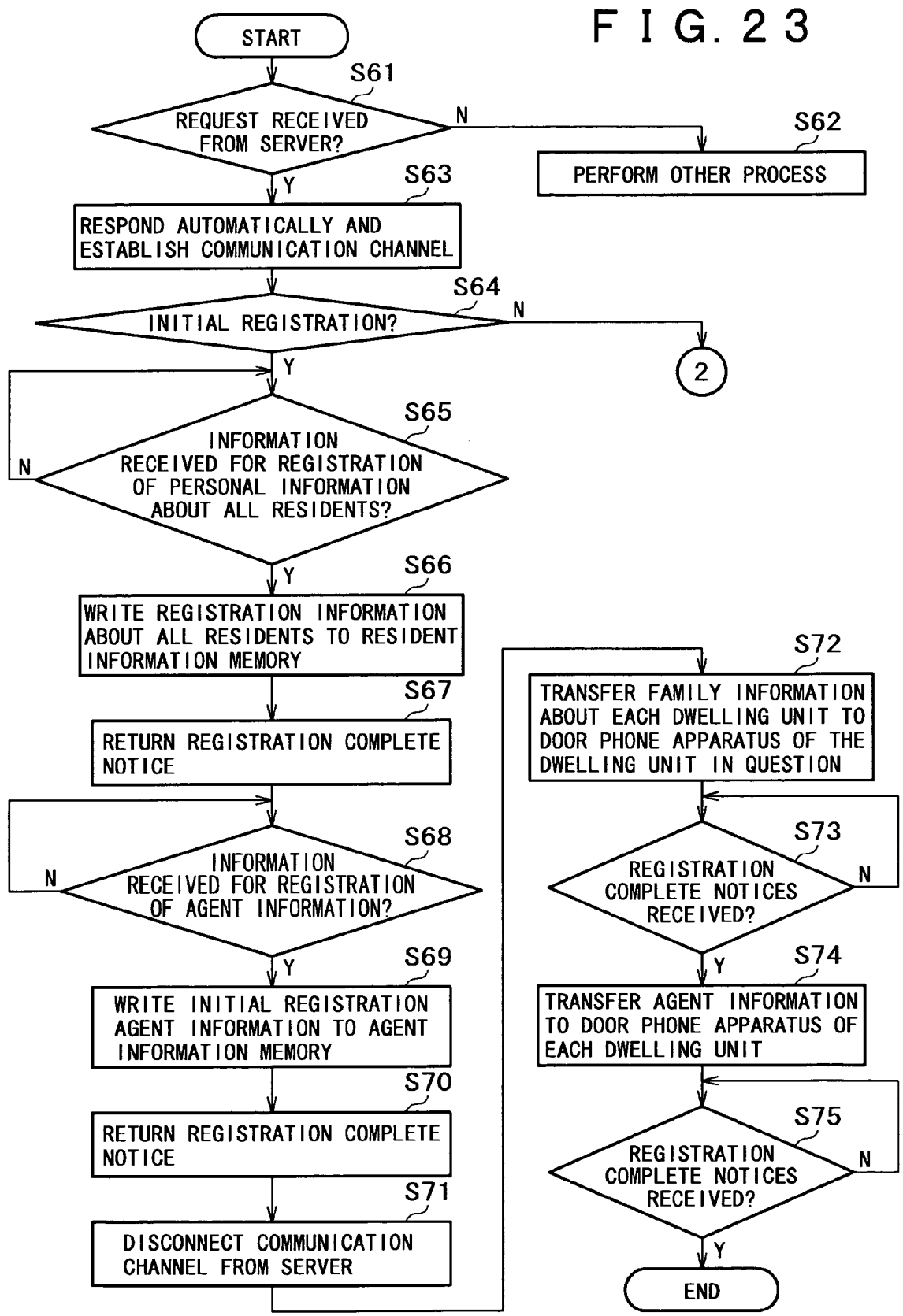
FIG. 23 is a flowchart of steps for registering more information with the shared entrance apparatus following receipt of the information from the management server.

What the shared entrance apparatus 2 of the multiple dwelling house does upon receiving an initial registration request, an additional agent registration request, or a person-in-charge registration change request will now be described with reference to the flowcharts of FIGS. 23 and 24.

The CPU 201 of the shared entrance apparatus 2 determines whether any request has been received from the management server 10 (step S61). If no request is found to be received from the management server 10, the CPU 201 performs some other process (step S62).

If a request is found to be received from the management server 10, the CPU 201 responds automatically to that request and establishes a communication channel with the server 10 (step S63). A check is made to see if the received request is an initial registration request (step S64). If the request is found to be an initial registration request, the CPU 201 waits for the arrival of information for registration of personal information about all residents yet to be registered from the management server 10. When the registration information is received (step S65), the CPU 201 writes the received information to the resident information memory 205 (step S66).

When the registration information about all residents to be registered has been written, the CPU 201 returns a registration complete notice to the management server 10 (step S67). The CPU 201 then waits for the arrival of information for registration of agent information (step S68). When the registration information about the agents is received, the CPU 206 writes the received information to the agent information memory 206 (step S69).

After writing the registration information about the agents, the CPU 201 returns a registration complete notice to the management server 10 (step S70). Thereafter, the CPU 201 disconnects the communication channel with the management server 10 (step S71).

Out of the personal profile information written in the resident information memory 205, the CPU 201 transfers at least the identification information (main key information) about each family member of a given dwelling unit to the controller 400 of the door phone apparatus 4 in that dwelling unit. On receiving the main key information, the controller 400 of the door phone apparatus 4 writes the received information to the family information memory 405. Needless to say, it is also possible to transfer any other necessary personal information about family members to the controller 400 of the door phone apparatus 4 in addition to the identification information used as the main key information.

The steps of information registration to the family information memory 405 by the controller 400 of the door phone apparatus 4 supplied with family information are the same as the above-described steps of information registration to the resident information memory 205 by the shared entrance apparatus 2. Upon completion of the registration, the controller 400 transmits a registration complete notice to the shared entrance apparatus 2.

The CPU 201 of the shared entrance apparatus 2 waits for a registration complete notice to arrive from the controller 400 (step S73). Upon receipt of the notice, the CPU 201 transfers the agent information from the agent information memory 206 to the controller 400 of the door phone apparatus 4 in each dwelling unit (step S74).

The controller 400 of the door phone apparatus 4 in each dwelling unit writes the received agent information to the agent information memory 406 for registration. Upon completion of the agent information registration, the controller 400 returns a registration complete notice to the shared entrance apparatus 2. The CPU 201 of the shared entrance apparatus 2 waits for a registration complete notice to arrive from the controller 400 (step S75). On receiving the registration complete notice, the CPU 201 terminates the initial registration processing routine.

Figure 24:
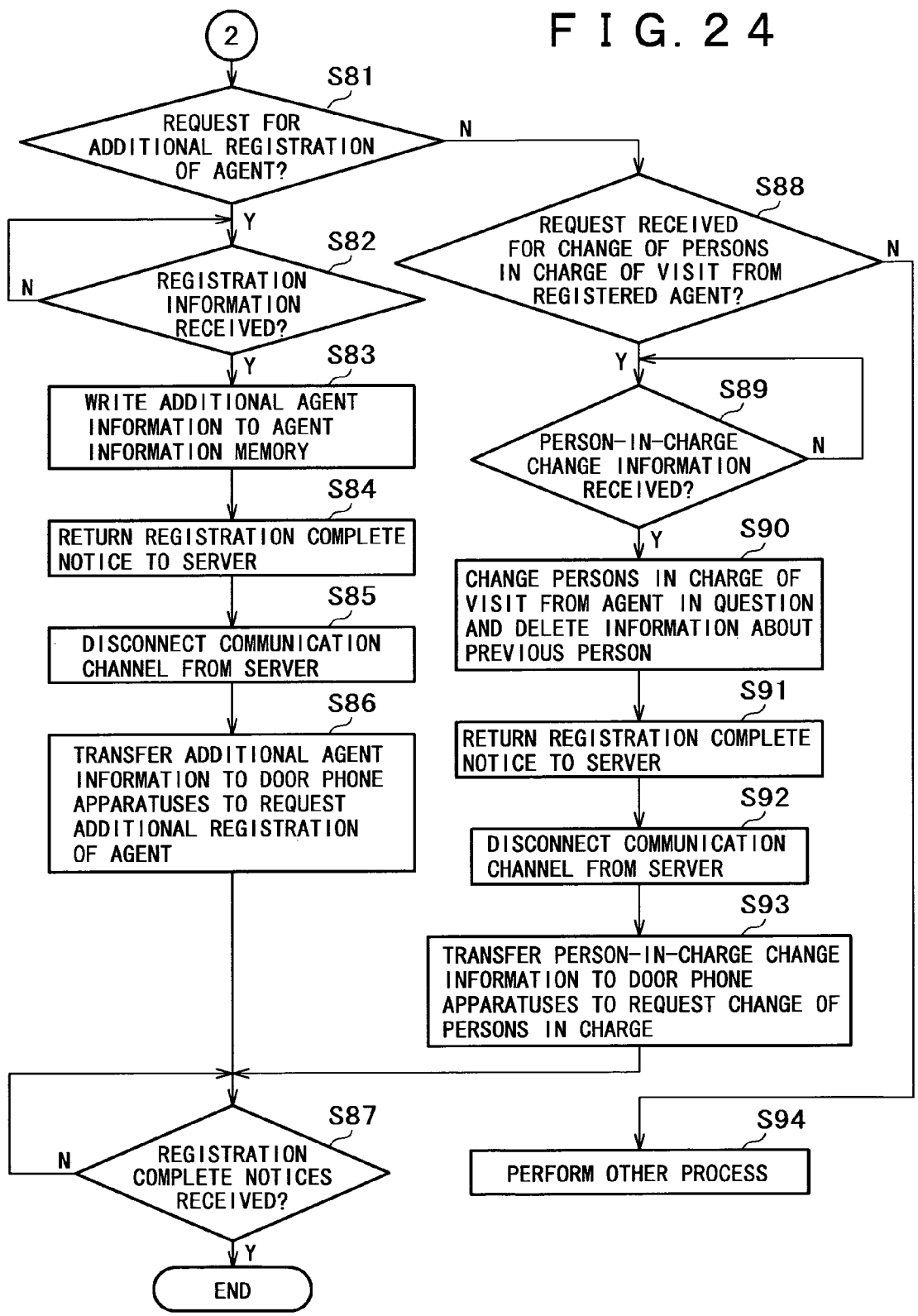
FIG. 24 is another flowchart of steps for registering more information with the shared entrance apparatus following receipt of the information from the management server.

If in step S64 the received request is not found to be an initial registration request, the CPU 201 determines whether the request is an additional agent registration request (step S81 in FIG. 24). If the request is found to be an additional agent registration request, the CPU 201 waits for the arrival of agent information to be additionally registered (step S82). On receiving the registered agent information to be added, the CPU 201 writes the received agent information to the agent information memory 206 for additional registration (step S83).

After writing all additional registered agent information to the agent information memory 206, the CPU 201 returns a registration complete notice to the management server 10 (step S84). The CPU 201 then disconnects the communication channel with the management server 10 (step S85). Thereafter, the CPU 201 transfers the added agent information to the controller 400 of the door phone apparatus 4 in each dwelling unit to request addition of another registered agent (step S86).

The controller 400 of the door phone apparatus 4 additionally writes the received agent information to the agent information memory 406. Upon completion of the additional agent information registration, the controller 400 returns a registration complete notice to the shared entrance apparatus 2. The CPU 201 of the shared entrance apparatus 2 waits for a registration complete notice to arrive from the controller 400 of the door phone apparatus 4 in each dwelling unit (step S87). Upon receipt of the registration complete notice, the CPU 201 terminates this registration processing routine.

If in step S81 the received request is not found to be an additional agent registration request, a check is made to see if the request is for change of persons in charge of visits from a registered agent (step S88). If the request is not found to be a request for change of persons in charge, the CPU 201 performs some other process such as backup key registration or key registration erasure (step S94).

If in step S88 the received request is found to be a request for change of persons in charge of visits from a registered agent, the CPU 201 waits for changed person-in-charge information to arrive from the management server 10 (step S89). When the changed person-in-charge information is received, the CPU 201 accordingly changes the persons in charge within the corresponding agent information. More specifically, the CPU 201 deletes the information about the previous person in charge stored in the agent information memory 206 and writes information about the new person in its place (step S90).

After completing the changed person-in-charge registration, the CPU 201 returns a registration complete notice to the management server 10 (step S91). The CPU 201 then disconnects the communication channel with the management server 10 (step S92), transfers the changed person-in-charge information to the controller 400 of the door phone apparatus 4 in each dwelling unit, and requests the controller 400 to change the applicable persons in charge (step S93).

Using the changed person-in-charge information received, the controller 400 of the door phone apparatus 4 in each dwelling unit accordingly changes the person-in-charge registration in the agent information memory 406. The registration changing steps are the same as those performed by the shared entrance apparatus 2 with regard to the agent information memory 206 as discussed above. Upon completion of the changed person-in-charge registration, the controller 400 returns a registration complete notice to the shared entrance apparatus 2. The CPU 201 of the shared entrance apparatus 2 waits for a registration complete notice to arrive from the controller 400 (step S87). On receiving the registration complete notice, the CPU 201 terminates this registration processing routine.

How the shared entrance apparatus 2 operates will now be described with reference to the flowcharts of FIGS. 25 and 26. The steps S in the flowcharts described below are carried out primarily by the CPU 201 of the shared entrance apparatus 2.

[Operation of the Shared Entrance Apparatus 2]

The shared entrance door 1 under control of the shared entrance apparatus 2 is placed in the so-called auto lock mode and remains usually locked. The CPU 201 of the shared entrance apparatus 2 checks continuously to see whether the IC card serving as the electronic key apparatus or agent information communication apparatus is held manually over the reader/writer 21 so that the reader/writer 21 has retrieved from the IC card such necessary information as identification information and card type information (step S101). When the IC card 70 is not found to be held over the reader/writer 21, the CPU 201 checks to see whether the calling button 26 of the button operation unit is pushed (step S102).

If in step S101 the necessary information is found to be read from the IC card 70, the CPU 201 determines based on the retrieved information whether the IC card 70 held over the reader/writer 21 is an agent card or a personal card owned by a resident of the multiple dwelling house where this shared entrance apparatus 2 is installed (step S103).

If in step S103 the IC card 70 is found to be a personal card, the CPU 201 of the shared entrance apparatus 2 determines whether the card owner is a resident of this multiple dwelling house by referencing the identification information held in the resident information memory 205 on the basis of the identification information retrieved from the IC card (step S104).

If in step S103 the IC card 70 is found to be an agent card, the CPU 201 of the shared entrance apparatus 2 determines whether the card owner is an agent authorized to visit this multiple dwelling house by referencing the identification information held in the agent information memory 206 based on the agent identification information retrieved from the IC card (step S105).

Following the check in step S104 or S105, the CPU 201 of the shared entrance apparatus 2 determines whether the received information is authenticated (step S106). If in step S106 the received information is not found to be authenticated, the CPU 201 of the shared entrance apparatus 2 causes the LED drive unit 211 to blink the LED 22 (red) and has the voice output interface 212 output a warning sound from the speaker 23 (step S107). Thereafter, step S101 is reached again and subsequent steps are repeated.

If in step S106 the received information is found authenticated, the CPU 201 of the shared entrance apparatus 2 causes the LED drive unit 211 to light the LED 22 (green) (step S108). The CPU 201 then causes the electronic locking mechanism drive unit 217 to control the electronic locking mechanism 130 so as to unlock the shared entrance door 1 (step S109).

The CPU 201 of the shared entrance apparatus 2 causes the voice output interface 212 to output a voice message such as "The door is unlocked" from the speaker 23. The message announces that the card owner is allowed to visit this multiple dwelling house (step S110). The person who held the IC card 70 manually over the reader/writer 21 of the shared entrance apparatus 2 is now allowed to move past the shared entrance door 1.

After that, the CPU 201 of the shared entrance apparatus 2 monitors the door open-close sensor 13 through the interface 216 to see whether the shared entrance door 1 is opened (step S111). If in step S111 the shared entrance apparatus 1 is not found opened, the CPU 201 determines based on information from the clock circuit 218 whether 10 seconds have elapsed since the shared entrance door 1 was unlocked (step S112).

If in step S112 the period of 10 seconds is not found to have elapsed yet, the CPU 201 repeats step S111 and subsequent steps. If 10 seconds are found to have passed in step S112, the CPU 201 determines that nobody is calling at the multiple dwelling house for the moment and proceeds to lock the shared entrance door 1 (step S113). The CPU 201 then repeats step S101 and subsequent steps.

If in step S111 the shared entrance door 1 is found to be opened, the CPU 201 waits for the opened door 1 to close again (step S114). When the shared entrance door 1 is found closed in step S114, the CPU 201 goes to step S113. The CPU 201 locks the shared entrance door 1 in step S113, and repeats step S101 and subsequent steps.

Illustratively, if the shared entrance door 1 stays open longer than a predetermined period after getting unlocked, the shared entrance apparatus 2 may emit a warning sound and/or take appropriate steps such as contacting the security company or the superintendent of this multiple dwelling house for further action.

If no information is found retrieved from the IC card 70 in step S101, the CPU 201 of the shared entrance apparatus 2 proceeds to determine whether the calling button 26 is being pushed in the manner described above (step S102).

If in step S102 the calling button 26 is not found to be pushed, the CPU 201 repeats step S101 and subsequent steps. If in step S102 the calling button 26 is found being pushed, the CPU 201 goes to the processing shown in FIG. 26. A check is then made to determine whether any room number has been input by use of the numeric keys 25 (step S115).

Figure 25:
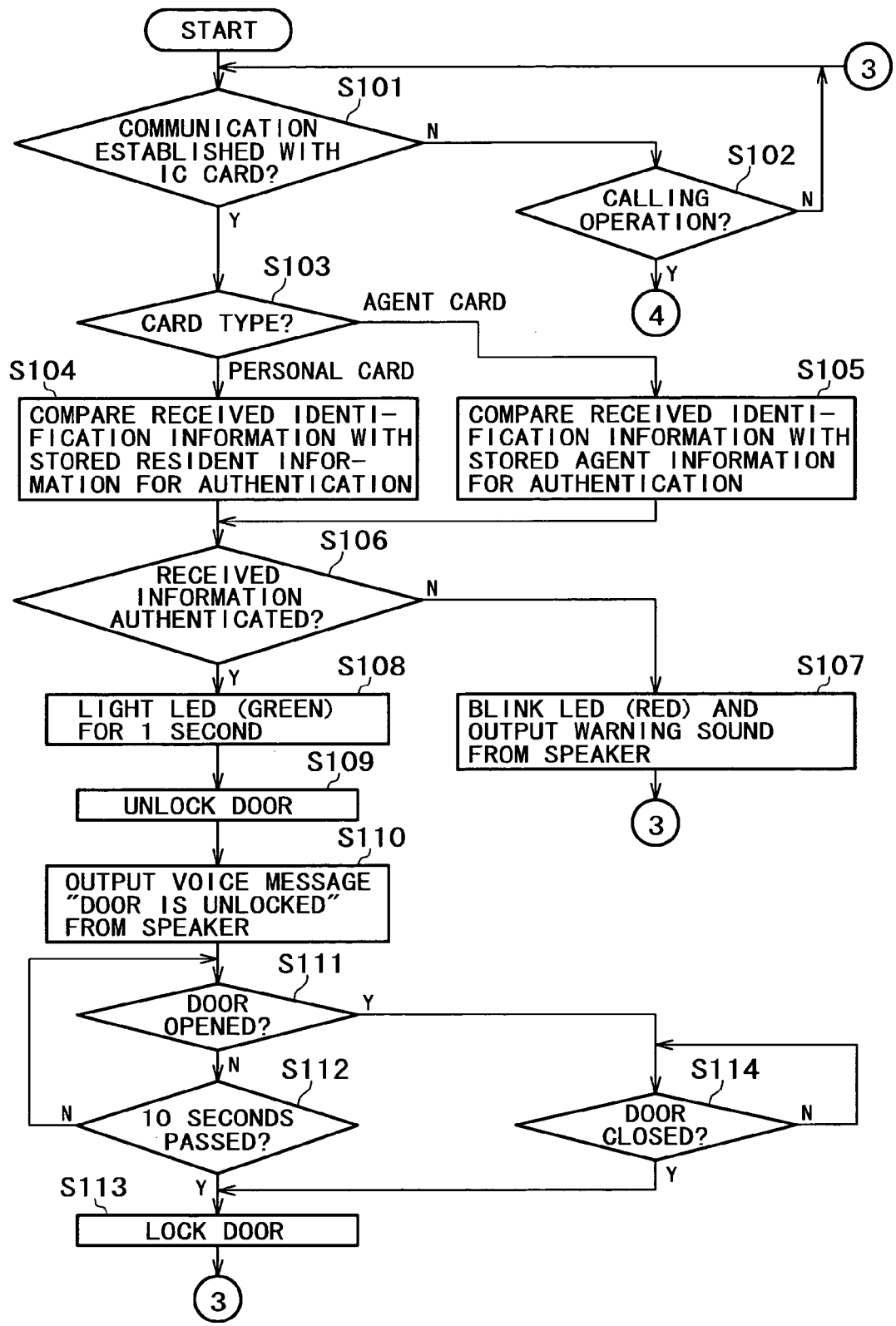
FIG. 25 is a flowchart of steps performed by the shared entrance apparatus.
Figure 26:
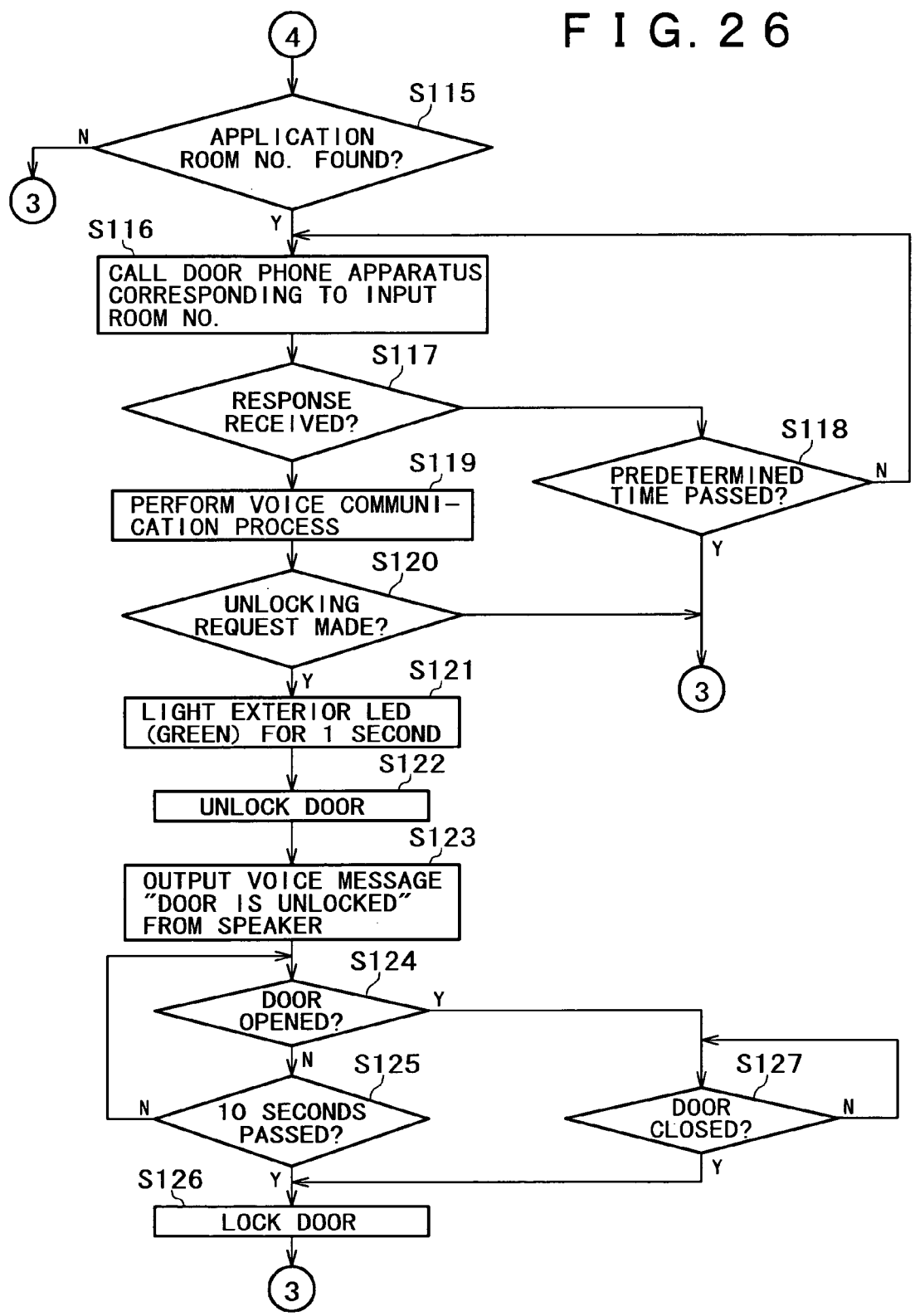
FIG. 26 is another flowchart of steps performed by the shared entrance apparatus.

If in step S115 no room number is found input or the input room number is not found corresponding to any dwelling unit in the house, the CPU 201 regards the operation as an error and repeats step S101 in FIG. 25 and subsequent steps. If in step S115 the input room number is found to correspond to a dwelling unit in the house, the CPU 201 of the shared entrance apparatus 2 controls the selector 209 so that a calling sound is emitted by the interior unit 4B of the door phone apparatus 4 in the dwelling unit whose room number is being designated (step S116). The emitted calling sound alerts the resident inside to the presence of the visitor.

Through the interior unit 4B of the door phone apparatus 4 in the dwelling unit being called, the CPU 201 determines whether any response is given by the resident (step S117). If in step S117 no response is found to be made, the CPU 201 of the shared entrance apparatus 2 determines whether a predetermined time period has elapsed since emission of the calling sound started (step S118).

If in step S118 the predetermined time period is not found to have passed yet, step S116 is reached again and subsequent steps are repeated. If the predetermined time period is found to have elapsed in step S118, step S101 in FIG. 25 is reached again and subsequent steps are repeated.

If in step S117 the resident of the dwelling unit being called is found to have responded to the call, the CPU 201 establishes connection between the door phone control unit 4B of the dwelling unit and the shared entrance apparatus 2 to permit voice communication therebetween (step S119).

The visitor and the resident of the dwelling unit are then able to communicate by voice with each other. If the resident judges it appropriate to let the visitor in, the resident pushes the shared entrance door unlocking key 49 on the interior unit 4B of the door phone apparatus 4. Pushing the key 40 transmits a request to unlock the shared entrance door 1 to the shared entrance apparatus 2.

The CPU 201 of the shared entrance apparatus 2 determines whether an unlocking request is sent from the dwelling unit being connected (step S120). If in step S120 the CPU 201 detects not the unlocking request but a disconnection order from the interior unit 4B, then the CPU 201 repeats step S101 in FIG. 25 and subsequent steps.

If in step S120 the unlocking request is found to be transmitted, the CPU 201 of the shared entrance apparatus 2 causes the LED drive unit 211 to light the LED 22 (green) (step S121), unlocks the shared entrance door 1 (step S122), and causes the voice output interface 212 to output a voice message "The door is unlocked" from the speaker 23 (step S123).

The visitor with no IC card 70 is then allowed by the resident of the dwelling unit to enter the multiple dwelling house and visit the desired dwelling unit.

The CPU 201 of the shared entrance apparatus 2 monitors the door open-close sensor 13 by way of the interface 216 to see whether the shared entrance door 1 is opened (step S124). If in step S124 the shared entrance door 1 is not found opened, the CPU 201 determines based on information from the clock circuit 218 whether 10 seconds have elapsed since the shared entrance door was unlocked (step S125).

If in step S125 the period of 10 seconds is not found to have elapsed yet, the CPU 201 repeats step S124 and subsequent steps. If 10 seconds are found to have passed in step S125, the CPU 201 determines that nobody is calling at the multiple dwelling house for the moment and proceeds to lock the shared entrance door 1 (step S126). The CPU 201 then repeats step S101 in FIG. 25 and subsequent steps.

If in step S124 the shared entrance door 1 is found to be opened, the CPU 201 waits for the opened door 1 to close again (step S127). When the shared entrance door 1 is found closed in step S127, the CPU 201 goes to step S126. The CPU 201 locks the shared entrance door 1 in step S126, and repeats step S101 and subsequent steps.

If in step S127 the shared entrance door 1 is found to remain opened longer than a predetermined period after getting unlocked, the shared entrance apparatus 2 may emit a warning sound and/or take appropriate steps such as contacting the security company or the superintendent of this multiple dwelling house for further action.

[Operation of the Door Phone Apparatus 4 in Each Dwelling Unit; FIGS. 27 through 32]

Described below with reference to the flowcharts of FIGS. 27 through 32 is how the door phone apparatus 4 operates in each dwelling unit of the multiple dwelling house where the shared entrance apparatus 2 embodying this invention is installed.

With this embodiment, the door phone apparatus 4 in each dwelling unit has both auto lock mode and successive lock mode as mentioned above. For purpose of simplification and illustration, the door phone apparatus 4 is assumed here to operate in the auto lock mode.

Where the auto lock mode is in effect, the entrance door 3 of each dwelling unit is usually locked. When the IC card 70 serving illustratively as the electronic key apparatus is held manually over the interior reader/writer 41in or exterior reader/writer 41ex, communication takes place between the two for authentication of electronic key information. When the electronic key information read from the card is authenticated, the entrance door 3 is unlocked for a predetermined time period and then locked again automatically under control of the controller 400 of the door phone apparatus 4.

The CPU 401 monitors the interior reader/writer 41in and exterior reader/writer 41ex through the interfaces 410 and 411. More specifically, during the monitoring, the CPU 401 waits for communication to take place between the interior reader/writer 41in or exterior reader/writer 41ex on the one hand, and the IC card 70 being held manually over the device on the other hand (step S131).

If in step S131 no communication is found to take place, with no IC card 70 held over the interior reader/writer 41in or exterior reader/writer 41ex, the CPU 401 checks to see if the door phone button 45 is being pushed (step S132). If the door phone button 45 is not found to be pushed, step S131 is reached again.

Figure 28:
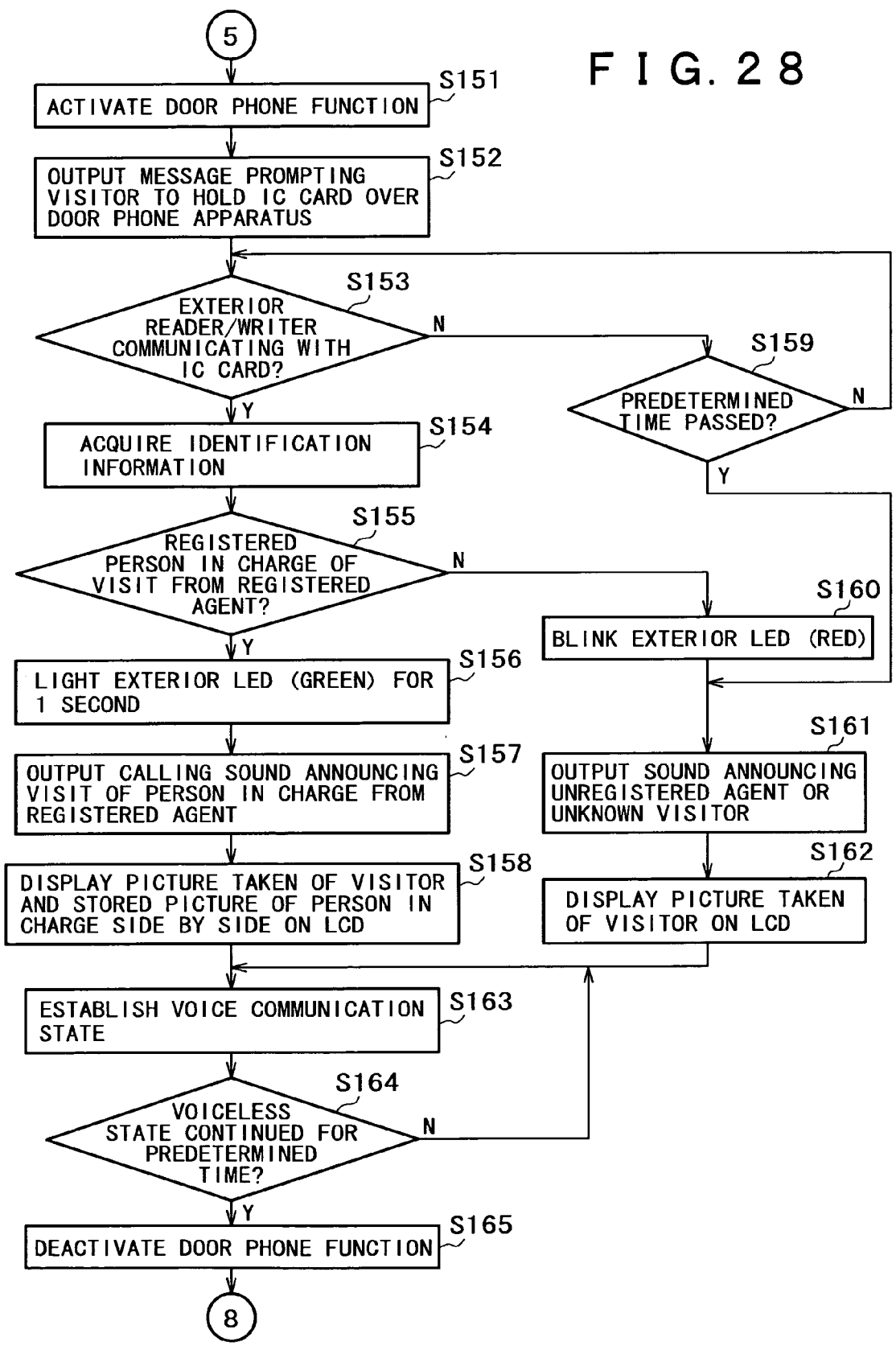
FIG. 28 is another flowchart of steps performed by the door phone apparatus.

[Pushing of the Door Phone Button; FIG. 28]

If in step S132 the door phone button 45 is found being pushed, the CPU 401 activates the door phone function (step S151 in FIG. 28). The CPU 401 outputs from the speaker 43ex a voice message prompting the visitor to hold the IC card 70 over the exterior unit 4A of the door phone apparatus 4 (step S152).

If the visitor is a person in charge of visits from a registered agent and is in possession of a legitimate agent IC card, the visitor upon hearing the voice message proceeds to hold the IC card over the exterior reader/writer 41ex for communication.

The CPU 401 determines whether the visitor is holding the IC card over the exterior reader/writer 41ex for communication in response to the voice message (step S153).

If no communication is found to take place with the exterior reader/writer 41ex, the CPU 401 determines whether a predetermined time period has elapsed since the emission of the voice message on the basis of time information from the clock circuit 423 (step S159). If the predetermined time period is found to have elapsed, the CPU 401 determines that the visitor is an unregistered agent or someone else unknown. The CPU 401 then causes the interior speaker 43in of the door phone control unit 4B and the exterior speaker 43ex of the exterior unit 4A to emit a calling sound announcing the visit of an unregistered agent or an unknown visitor (step S161).

The CPU 401 causes the LCD 47 of the door phone control unit 4B to display a picture of the visitor taken by the camera 46 of the exterior unit 4A (step S162). At the same time, the CPU 401 enables voice communication (talk) between the exterior unit 4A and the door phone control unit 4B (step S163).

More specifically, the CPU 401 picks up the visitor's voice using the microphone 44ex of the exterior unit 4A, and supplies the interior speaker 43in of the door phone control unit 4B with the acquired voice for audible output through the voice input interface 415 and voice output interface 412. The CPU 401 also picks up the resident's voice using the interior microphone 44in of the door phone control unit 4B, and supplies the speaker 43ex of the exterior unit 4A with the resident's voice for audible output through the voice input interface 414 and voice output interface 413.

The CPU 401 then checks to see if the voice communication has ended between the visitor and the resident. The check is made by determining whether a voiceless state (on the part of both the visitor and the resident) has lasted longer than a predetermined time period (step S164). If in step S164 the voice communication is found to have ended between the visitor and the resident, the CPU 401 deactivates the door phone function (step S165) and returns to step S131. If in step S164 the voice communication is not found to be terminated, step S163 is reached again and subsequent steps are repeated.

If in step S153 communication is found to take place between the exterior reader/writer 41ex and the IC card 70 held over the latter in response to the voice message, the CPU 401 receives identification information (agent identification information) from the IC card 70 and places the information temporarily in, say, RAM 404 (step S154). The time information output by the clock circuit 423 in the controller 400 at the time of the communication is written to the RAM 404 along with the identification information (agent identification information); the time information is also sent to the IC card 70 to be written to a memory in its control IC 72.

The CPU 401 compares the agent identification information in the agent information memory 406 with the agent identification information received from the IC card 70 for a match therebetween. The matching agent identification information detected in the agent information in the agent information memory 406 indicates that this IC card 70 belongs to a registered agent. The CPU 401 proceeds to determine whether the visitor is a registered person in charge of visits from the registered agent (step S155).

If the visitor is not found to be the registered person in charge, the CPU 401 causes the exterior LED drive unit 417 to blink the exterior LED 42ex in red (step S160), and carries out step S161.

If in step S155 the visitor is found to be the registered person in charge of visits from the registered agent, the CPU 401 causes the exterior LED drive unit 417 to light the exterior LED 42ex for one second in green, thereby informing the user of the IC card 70 that authentication of the card has been successfully completed (step S156). At this point, the CPU 401 may illustratively cause the exterior speaker 43ex to output a voice message such as "Your card is authenticated."

The CPU 401 now assumes that the visitor is the registered person in charge of visits from the registered agent, and the CPU 401 accordingly causes the interior speaker 43in to output a calling sound making an announcement to that effect (step S157). The CPU 401 displays both the picture of the person in charge stored in the agent information memory 406 of the controller 400 and the picture of that person taken by the camera 46 of the exterior unit 4A, on the LCD 47 of the door phone control unit 4B (step S158). As mentioned above, the CPU 401 also enables voice communication (talk) between the exterior unit 4A and the door phone control unit 4B (step S163).

The CPU 401 checks to see if the voice communication has ended between the visitor and the resident, by determining whether a voiceless state (on the part of both the visitor and the resident) has lasted longer than a predetermined time period (step S164). If in step S164 the voice communication is found to have ended between the visitor and the resident, the CPU 401 deactivates the door phone function (step S165) and returns to step S131. If in step S164 the voice communication is not found to be terminated, step S163 is reached again and subsequent steps are repeated.

The process of step S158 allows the resident of the dwelling unit being visited to determine visually whether the visitor is a legitimate person in charge of visits from a duly registered agent. If the IC card 70 as the agent information communication apparatus is used fraudulently by an unscrupulous person, the resident is able to know the unauthorized use.

In the processing above, it is also possible to write to the agent information memory 406 or some other suitable memory a visit history including the agent identification information retrieved from the IC card 70 and the visit time information acquired from the clock circuit 423 (i.e., the time at which the door phone button 45 was pushed or the communication with the IC card 70 took place in this example).

Figure 27:
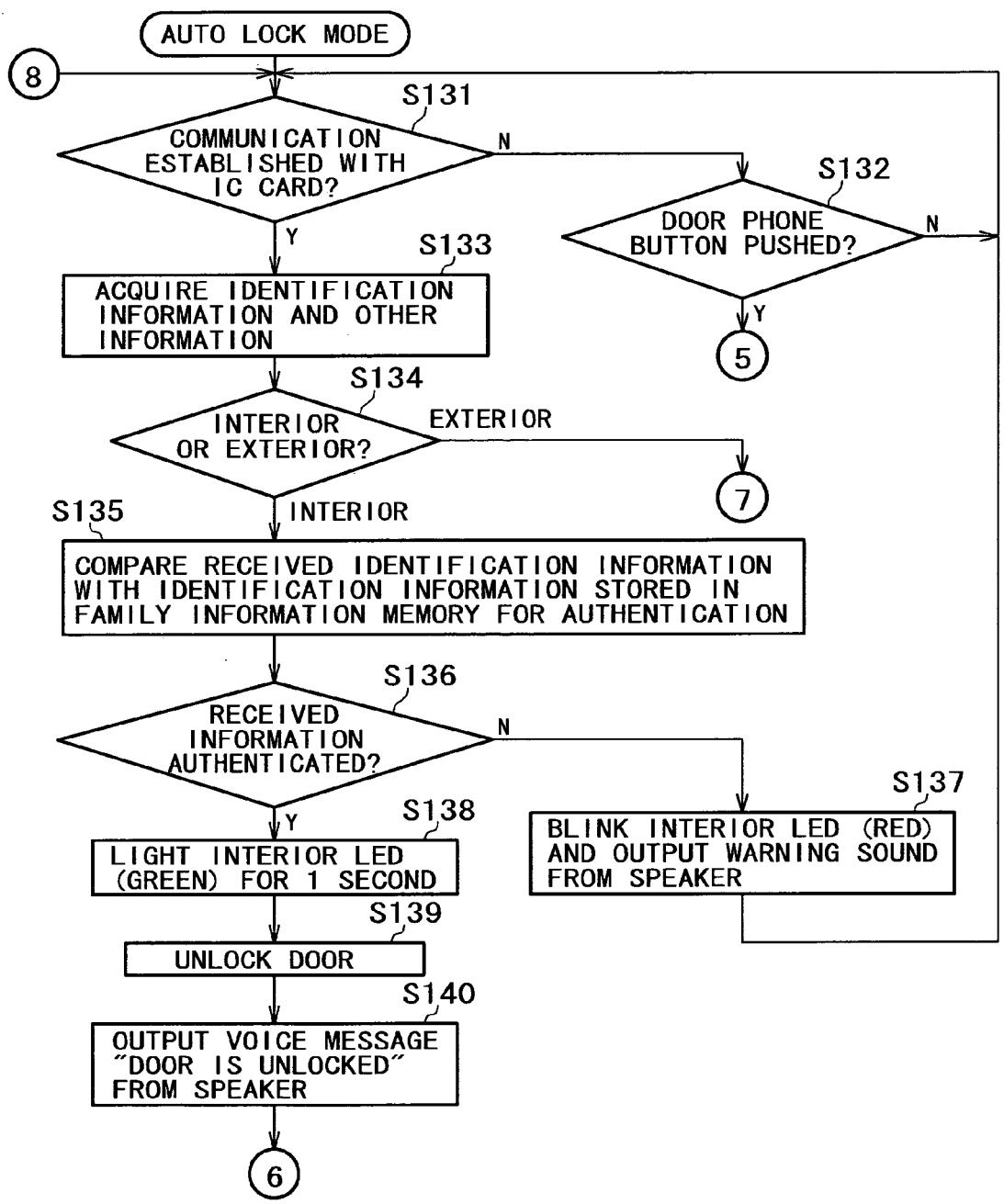
FIG. 27 is a flowchart of steps performed by the door phone apparatus.

If in step S131 of FIG. 27 the CPU 401 finds out that communication has taken place between the reader/writer 41in or 41ex on the one hand and the IC card 70 held over it on the other hand, the CPU 401 receives identification information from the IC card 70 and places the information temporarily in, say, RAM 404 (step S133). The time information output by the clock circuit 423 in the controller 400 at the time of the communication is written to the RAM 404 along with the identification information; the time information is also sent to the IC card 70 to be written to the memory in its control IC 72.

In the IC card 70, an ID of the opposite device with which the card came into contact is written to the memory of the control IC 42 as information indicating which of the interior reader/writer 41in and exterior reader/writer 41ex communicated with the card.

The CPU 401 checks to see which of the interior reader/writer 41in and exterior reader/writer 41ex communicated with the IC card 70 (step S134). The result of the check, the time information in effect at the time of the communication, and the identification information acquired from the IC card 70 are stored into a communication history memory, not shown, of the controller 400.

Figure 29:
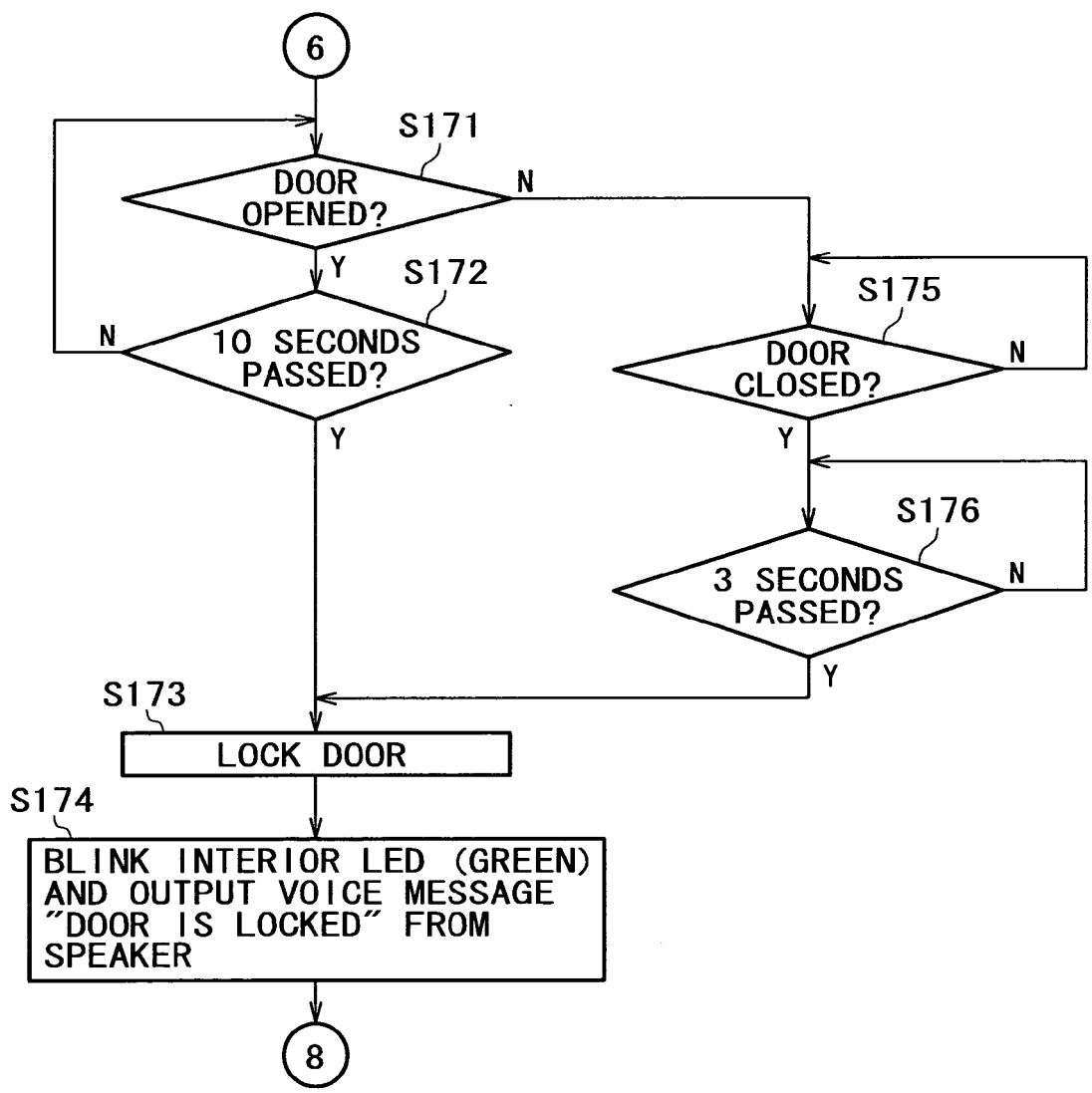
FIG. 29 is another flowchart of steps performed by the door phone apparatus.

[Communication with the Interior Reader/writer 21in; FIGS. 27 and 29]

If in step S134 the CPU 401 finds out that the IC card 70 has communicated with the interior reader/writer 21in, the CPU 401 performs the following steps on the assumption that the IC card 70 is an electronic key apparatus and that the resident holding the card is leaving the dwelling unit:

The CPU 401 first compares the identification information in the family information memory 405 with the identification information received from the IC card 70 for a match therebetween. The matching identification information found in the electronic key information in the family information memory 405 indicates that this IC card 70 is an electronic key apparatus registered with the door phone apparatus 4. The CPU 401 thus checks to see if the IC card 70 is authenticated (step S135).

The CPU 401 determines whether the IC card 70 is authenticated (step S136). If the IC card 70 is not authenticated, with none of the identification information items in the family information memory 405 coinciding with the identification information received from the card (authentication denied), the CPU 401 causes the interior LED 42in to blink in red and has the interior speaker 43in emit a warning sound informing the card user that authentication of the IC card 70 has failed (step S137). The electronic locking mechanism 330 remains locked, and step S131 is reached again.

If in step S136 the IC card 70 is found authenticated because the identification information from the card coincided with one of the identification information items held in the family information memory 405, the CPU 401 causes the interior LED 42in to light for one second in green, informing the card user that authentication of the IC card 70 has been successfully completed (step S138). At this point, the CPU 401 may illustratively cause the interior speaker 43in to output a voice message such as "Your card is authenticated."

When the IC card 70 is authenticated, communication history information including the communication time information and a record of either the exterior or the interior reader/writer having communicated with the card is written to a family member recording area which is located in the family information memory 405 and which corresponds to the identification information in question.

With the IC card 70 authenticated, the CPU 401 controls the electronic locking mechanism drive unit 422 to have the electronic locking mechanism 330 unlock the entrance door 1 (step S139) and to output a voice message "The door is unlocked" from the interior speaker 43in (step S140). At this point, the CPU 401 may illustratively blink the interior LED 42in in green, informing the user of the IC card 70 that the door has been unlocked.

The CPU 401 acquires a sensor output from the door open-close sensor 33 through the interface 421 to see whether the entrance door 3 is opened (step S171). The CPU 401 determines whether a predetermined time period of, say, 10 seconds has elapsed without the entrance door 3 being opened (step S172). If 10 seconds are found to have passed, the entrance door 3 is automatically locked again (step S173). The CPU 401 then causes the interior LED 42in to blink in green, informing that the entrance door 3 is locked (step S174). Step S131 is then reached again and subsequent steps are repeated.

When the entrance door 3 is found opened within 10 seconds of its unlocking in step S171, the CPU 401 assumes that the resident whose identification information was acquired in step S133 has left the dwelling unit. On that assumption, the CPU 401 may regard the resident in question as absent for the moment and act accordingly in its subsequent managing operations, with the resident's personal information retained together with his or her identification information and the time information in effect at that point.

Thereafter, the CPU 401 references the sensor output from the door open-close sensor 33 to confirm that the entrance door 3 is closed (step S175). After verifying that a predetermined time period of, say, 3 seconds has elapsed since the closing of the entrance door 3 (step S176), the CPU 401 controls the electronic locking mechanism drive unit 422 to have the electronic locking mechanism 330 lock the entrance door 3 again (step S173).

The CPU 401 causes the exterior LED 42ex to blink in green, informing the user of the IC card 70 that the entrance door 3 is locked again (step S174). The blinking of the exterior LED 42ex in green continues for a predetermined period (e.g., 10 seconds). Step S131 is then reached again and subsequent steps are repeated.

Figure 30:
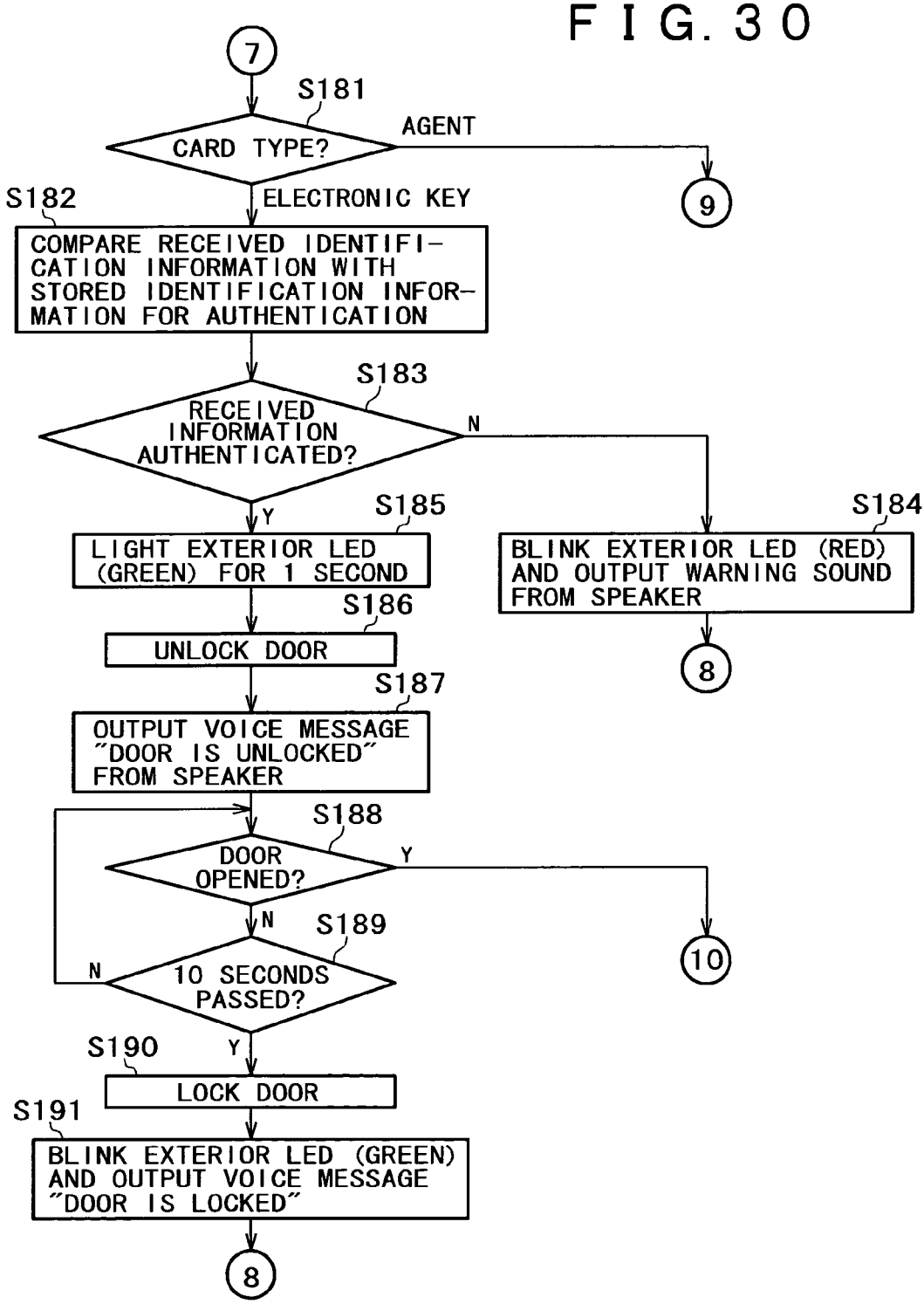
FIG. 30 is another flowchart of steps performed by the door phone apparatus.
Figure 31:
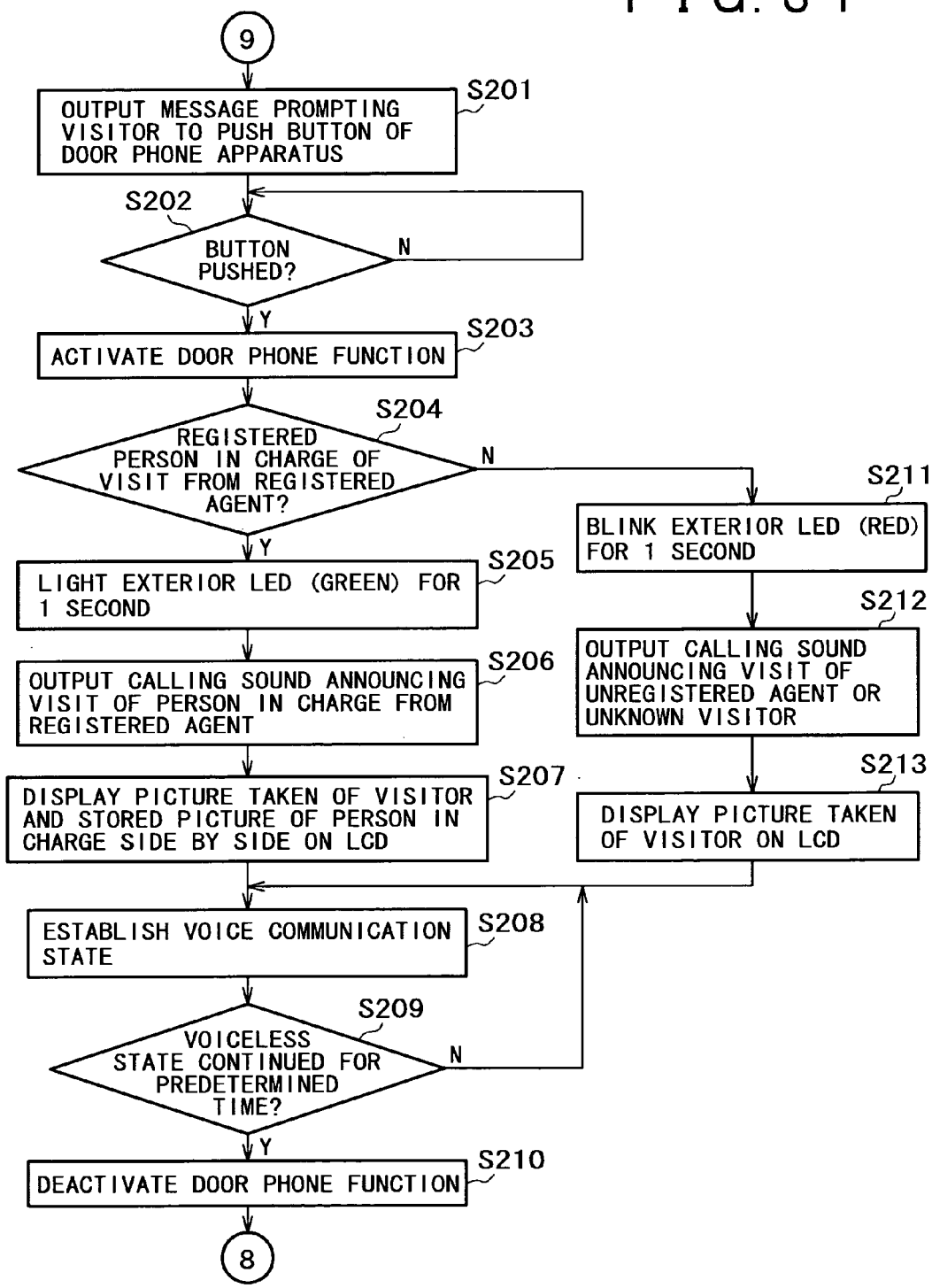
FIG. 31 is another flowchart of steps performed by the door phone apparatus.
Figure 32:
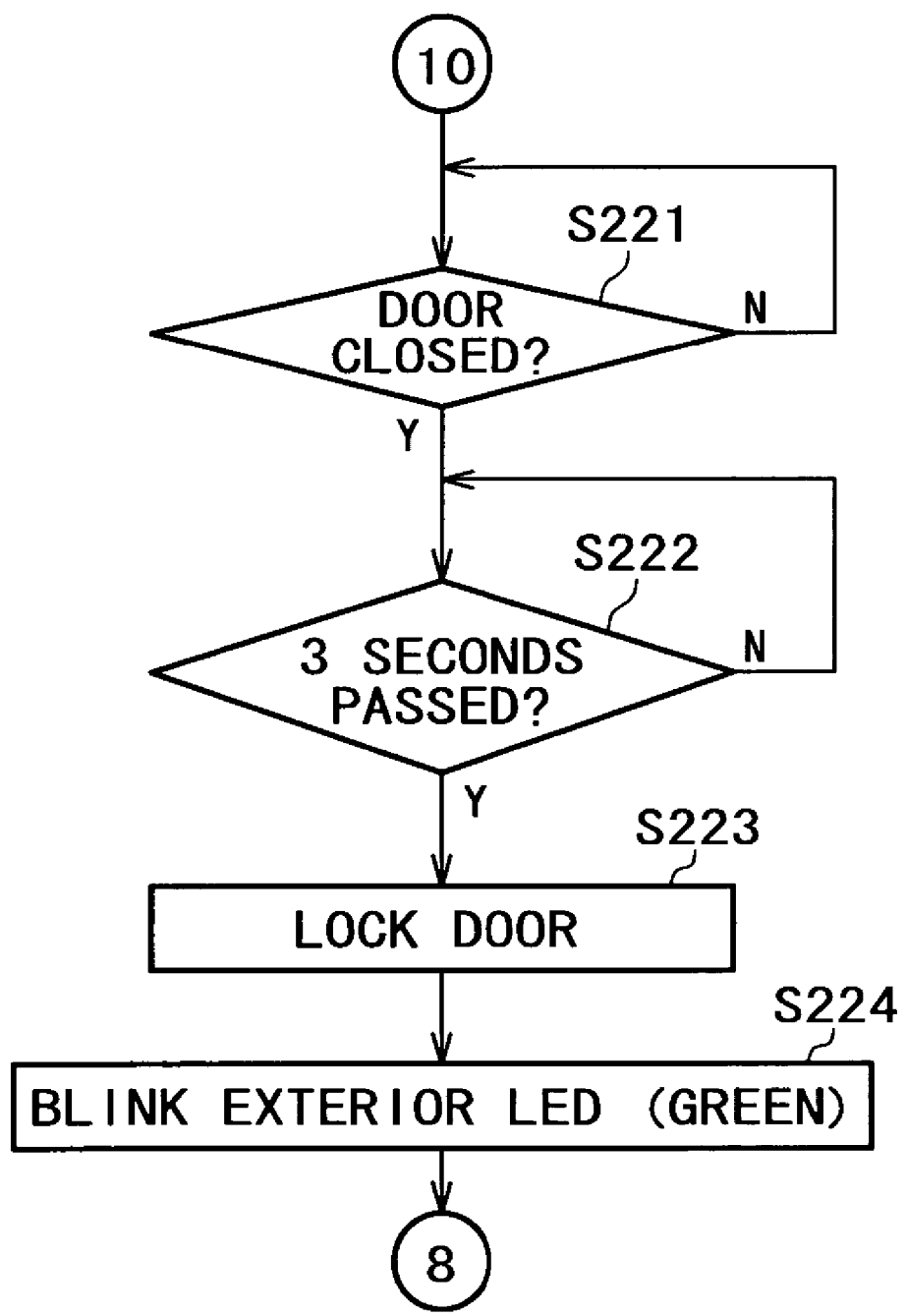
FIG. 32 is another flowchart of steps performed by the door phone apparatus.

[Communication with the Exterior Reader/writer 21ex; FIGS. 30 through 32]

If in step S134 the IC card 70 is found communicating with the exterior reader/writer 41ex, the CPU 401 assumes that either the resident has come home or a visitor is calling at the dwelling unit. In such a case, the CPU 401 performs the following steps:

The CPU 401 first acquires card type information from the IC card 70 to determine whether the card is an electronic key apparatus or an agent information communication apparatus (step S181). In the foregoing description, when the IC card 70 was found communicating with the interior reader/writer 41in in step S134, the card type information was not checked. The omission of the card type check was based on the assumption that only the IC cards owned by family members as electronic key devices are supposed to communicate with the interior reader/writer 21in.

If in step S181 the IC card 70 is found to be an electronic key apparatus, the CPU 401 compares the identification information in the family information memory 405 with the identification information received from the IC card 70 in step S133 for a match therebetween. The matching identification information found in the electronic key information in the family information memory 405 indicates that this IC card 70 is an electronic key apparatus registered with the door phone apparatus 4. The CPU 401 proceeds to determine whether the IC card 70 is an authentic card (step S182).

The CPU 401 checks to see if the IC card 70 is authenticated (step S183). If the IC card 70 is not authenticated, with none of the identification information items in the family information memory 405 coinciding with the identification information received from the card (authentication denied), the CPU 401 causes the exterior LED drive unit 417 to blink the exterior LED 42ex in red and the exterior speaker 43ex to emit a warning sound informing the card user that authentication of the IC card 70 has failed (step S184). The electronic locking mechanism 330 remains locked, and step S131 is reached again.

If in step S183 the IC card 70 is found authenticated because the identification information from the card coincides with one of the identification information items held in the family information memory 405, the CPU 401 causes the exterior LED drive unit 417 to light the exterior LED 42ex for one second in green, informing the card user that authentication of the IC card 70 has been successfully completed (step S185). At this point, the CPU 401 may illustratively cause the exterior speaker 43ex to output a voice message such as "Your card is authenticated."

When the IC card 70 is authenticated, the CPU 401 controls the electronic locking mechanism drive unit 422 to have the electronic locking mechanism 330 unlock the entrance door 3 (step S186) and causes the exterior speaker 43ex to output a voice message "The door is unlocked" (step S187). At this point, the CPU 401 may cause the exterior LED 42ex to blink in green to inform the user of the IC card 70 that the door is now unlocked.

The CPU 401 acquires the sensor output from the door open-close sensor 33 through the interface 421 to see whether the entrance door 3 is opened (step S188). The CPU 401 determines whether a predetermined time period of, say, 10 seconds has elapsed without the entrance door 3 being opened (step S189). If 10 seconds are found to have passed, the entrance door 3 is automatically locked again (step S190). The CPU 401 then causes the exterior LED 42ex to blink in green, informing that the entrance door 3 is locked (step S191). Step S131 is then reached again and subsequent steps are repeated.

If in step S188 the entrance door 3 is found to be opened, the CPU 401 goes to the processing in FIG. 32. The CPU 401 references the sensor output from the door open-close sensor 33 to confirm that the entrance door 3 is closed (step S221). After verifying that a predetermined time period (e.g., 3 seconds) has elapsed since the closing of the entrance door 3 (step S222), the CPU 401 controls the electronic locking mechanism drive unit 422 to have the electronic locking mechanism 330 lock the entrance door 3 again (step S223).

The CPU 401 causes the exterior LED 42ex to blink in green, informing the user of the IC card 70 that the entrance door 3 is locked again (step S224). The blinking of the exterior LED 42ex in green continues for a predetermined time period (e.g., 10 seconds). Step S131 is then reached again and subsequent steps are repeated.

[Where the Exterior Reader/writer 41ex Communicates with the Agent Information Communication Apparatus]

If in step S181 of FIG. 30 the check on the card type shows the IC card 70 communicating with the exterior reader/writer 41ex to be an agent information communication apparatus, the CPU 401 causes the exterior speaker 43ex to output a voice message prompting the visitor to push the door phone button 45 (step S201 in FIG. 31).

The CPU 401 waits for the visitor to push the door phone button 45 in response to the voice message (step S202). When the door phone button 45 is found to be pushed, the CPU 401 activates the door phone function (step S203). The CPU 401 then compares the agent identification information included in the agent information held in the agent information memory 406 with the agent identification information received from the IC card 70 for a match therebetween. The matching agent identification information detected in the agent information in the agent information memory 406 indicates that this IC card 70 belongs to a registered agent. The CPU 401 proceeds to determine whether the visitor is a registered person in charge of visits from the registered agent (step S204).

If the visitor is not found to be the registered person in charge, the CPU 401 causes the exterior LED drive unit 417 to blink the exterior LED 42ex in red (step S211) and the interior speaker 43in to emit a calling sound announcing the visit of an unregistered agent or an unknown visitor (step S212).

The CPU 401 causes the LCD 47 of the door phone control unit 4B to display a picture of the visitor taken by the camera 46 of the exterior unit 4A (step S213). At the same time, the CPU 401 enables voice communication (talk) between the exterior unit 4A and the door phone control unit 4B (step S208).

More specifically, the CPU 401 picks up the visitor's voice using the microphone 44ex of the exterior unit 4A, and supplies the interior speaker 43in of the door phone control unit 4B with the acquired voice for audible output through the voice input interface 415 and voice output interface 412. The CPU 401 also picks up the resident's voice using the interior microphone 44in of the door phone control unit 4B, and supplies the speaker 43ex of the exterior unit 4A with the resident's voice for audible output through the voice input interface 414 and voice output interface 413.

The CPU 401 then checks to see if the voice communication has ended between the visitor and the resident, by determining whether a voiceless state (on the part of both the visitor and the resident) has lasted longer than a predetermined time period (step S209). If in step S209 the voice communication is found to have ended between the visitor and the resident, the CPU 401 deactivates the door phone function (step S210) and returns to step S131. If in step S209 the voice communication is not found to be terminated, step S208 is reached again and subsequent steps are repeated.

If in step S204 the visitor is found to be the registered person in charge of visits from the registered agent, the CPU 401 causes the exterior LED drive unit 417 to light the exterior LED 42ex for one second in green, thereby informing the user of the IC card 70 that authentication of the card has been successfully completed (step S205). At this point, the CPU 401 may illustratively cause the exterior speaker 43ex to output a voice message such as "Your card is authenticated."

The CPU 401 now assumes that the visitor is the registered person in charge of visits from the registered agent, and the CPU 401 accordingly causes the interior speaker 43in to output a calling sound making an announcement to that effect (step S206). The CPU 401 displays both the picture of the person in charge retrieved from the agent information memory 406 of the controller 400 and the picture of that person taken by the camera 46 of the exterior unit 4A, on the LCD 47 of the door phone control unit 4B (step S207). As mentioned above, the CPU 401 also enables voice communication (talk) between the exterior unit 4A and the door phone control unit 4B (step S209).

The CPU 401 checks to see if the voice communication has ended between the visitor and the resident, by determining whether a voiceless state (on the part of both the visitor and the resident) has lasted longer than a predetermined time period (step S209). If in step S209 the voice communication is found to have ended between the visitor and the resident, the CPU 401 deactivates the door phone function (step S210) and returns to step S131. If in step S209 the voice communication is not found to be terminated, step S208 is reached again and subsequent steps are repeated.

As described with regard to steps S157 and S161 of FIG. 28 as well as step S206 and S212 of FIG. 31, the inventive door phone apparatus 4 operating in conjunction with the shared entrance apparatus 2 embodying the invention and installed in a multiple dwelling house emits different calling sounds from the interior speaker 43in of the door phone control unit 4B to distinguish a registered agent from an unregistered agent; the registered agent is an agent authorized to visit the multiple dwelling house in question and is granted an IC card (agent card) serving as an agent information communication apparatus.

The varied calling sounds allow the residents (those at home) of the dwelling units constituting the multiple dwelling house to know audibly whether the visitor is a previously scrutinized, clearly identified and authorized agent, or someone else unknown. The residents can deal with the visitor accordingly.

Figure 33A:
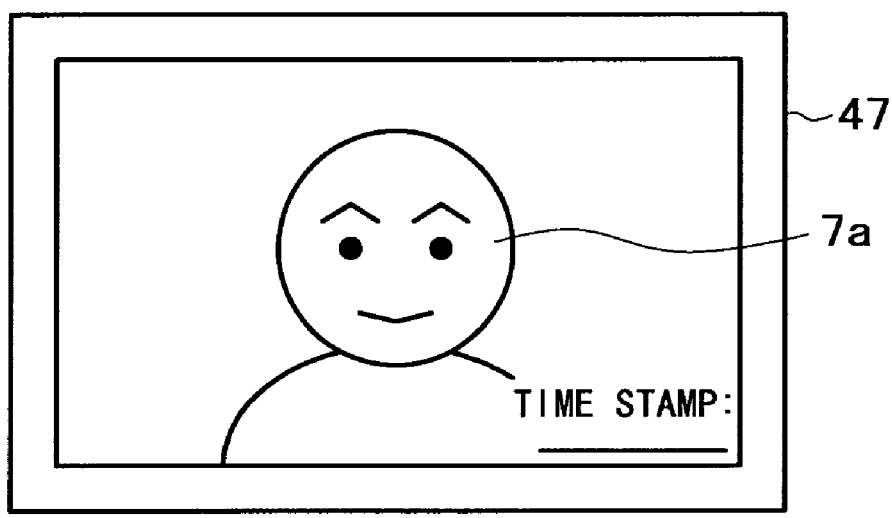
FIGS. 33A and 33B are explanatory views of display examples appearing on an LCD when a visitor is calling.

As described with respect to step S162 of FIG. 28 and step S213 of FIG. 31, the door phone apparatus 4 operating in conjunction with the shared entrance apparatus 2 of this embodiment installed in the multiple dwelling house may display a picture 7a of the visitor (taken by the camera 46 of the exterior unit 4A) on the entire screen of the LCD 47 of the door phone control unit 4B, as shown in FIG. 33A, if the visitor is an agent who is allowed to visit this house but who does not have the IC card (agent card) serving as the agent information communication apparatus. The picture 7a should let the residents find out visually whether the visitor is someone known to them.

Figure 33B:
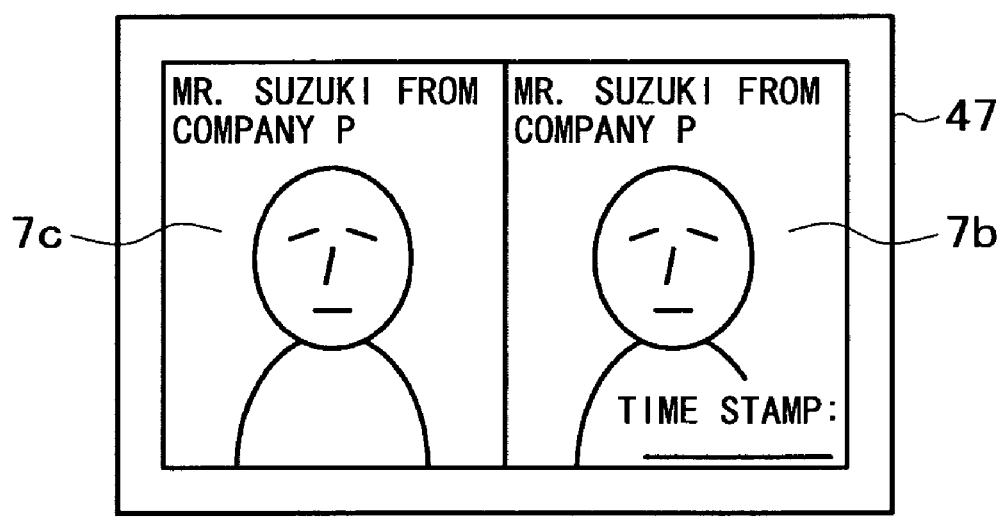

As described with regard to step S158 of FIG. 28 and step S207 of FIG. 31, the inventive door phone apparatus 4 operating in conjunction with the shared entrance apparatus 2 embodying the invention and installed in the multiple dwelling house may display two pictures 7b and 7c of the visitor, side by side, on the screen of the LCD 47 of the door phone control unit 4B as shown in FIG. 33B, if the visitor is a registered agent who is authorized to visit this house from a registered agent and who has an IC card (agent card) used as the agent information communication apparatus. The picture 7c of the visitor is being taken by the camera 46 of the exterior unit 4A, while the picture 7b is a retrieved picture (face photo) of the registered person in charge. The side-by-side picture screen should let the residents determine whether or not the visitor is a duly registered person in charge of visits from the registered agent. If the visitor turns out to be someone else, the residents can take appropriate measures such as refusing to open the entrance door.

Whereas the workings of the door phone apparatus 4 discussed above apply to the auto lock mode, they also apply to the successive lock mode. Specifically, visiting agents are subjected to similar authentication processes based on the IC card 70 whereby the registered agents may be distinguished from unregistered agents audibly using different calling sounds. It is also possible in the successive lock mode to display the stored picture of a registered person in charge and a visitor's picture taken by the camera 46 side by side for comparison, or to display only the picture from the camera 46.

Although it was explained above that the registered content of the agent information memory 206 in the shared entrance apparatus 2 is the same as that of the agent information memory 406 in the door phone apparatus 4 of each dwelling unit, this is not limitative of the invention.

Alternatively, the resident of a given dwelling unit may reject the visit of a particular registered agent who nevertheless has been authorized to visit the multiple dwelling house. This can be done by deleting the information about the agent of interest from the agent information memory 406 in the door phone apparatus 4 of the dwelling unit in question or by setting a delete flag to the agent's information in the memory 406 so that this particular agent is treated as an unregistered agent when calling at the dwelling unit.

[Other Embodiments of the Door Phone Apparatus]

The door phone apparatus as embodied above is arranged to emit different calling sounds to distinguish the registered agents from those unregistered. This embodiment may be modified in such a manner as to indicate a particular business category of a visiting registered agent. This can be accomplished when the business category information included in the agent information is used to trigger emission of a particular calling sound representing a specific business category of the visiting registered agent whose person in charge is to hold the agent IC card manually over the reader/writer 41ex of the exterior unit 4A. Simply hearing the calling sound allows the resident to know which business category the visiting agent belongs to.

In the case above, the business category information may be either acquired from the IC card 70 by the controller 400 or retrieved from the agent information memory 406 on the basis of the agent identification information obtained from the controller 400.

A different calling sound may be used to identify each different person in charge of visits from registered agents, given that the agent information about each registered agent differs from one person in charge to another. For example, as in the case of ringing sounds of mobile phones, various ringing melodies may be downloaded from web sites and assigned to different persons in charge for audible identification. The calling sounds of the door phone may be set by the user as desired so as to distinguish not only the registered agents from those unregistered, but also different agents, different persons in charge, and different business categories of the agents.

It is also possible to activate the calling sound of the door phone only for the registered agents and to suppress the sound for all other visitors. This arrangement, intended to limit receivable visitors to a minimum, is convenient for the resident of a dwelling unit who wants to be left undisturbed for the moment for some reason.

If a particular registered agent is expected to call at a specific dwelling unit, the resident of that dwelling unit might find it convenient to make advance arrangements to activate the door phone calling sound only when the agent in question is calling at the dwelling unit.

As shown in FIG. 11, the door phone control unit 4B of the inventive door phone apparatus 4 above includes an LCD 47 with a relatively large display screen, and an operation key group 48 including numeric keys and some function keys. A menu may be displayed on the LCD 47 allowing the user to start programs corresponding to desired items being displayed. Specifically, the operation key group 48 may be used by the resident to make diverse settings on the door phone apparatus 4 at each dwelling unit.

Figure 34:
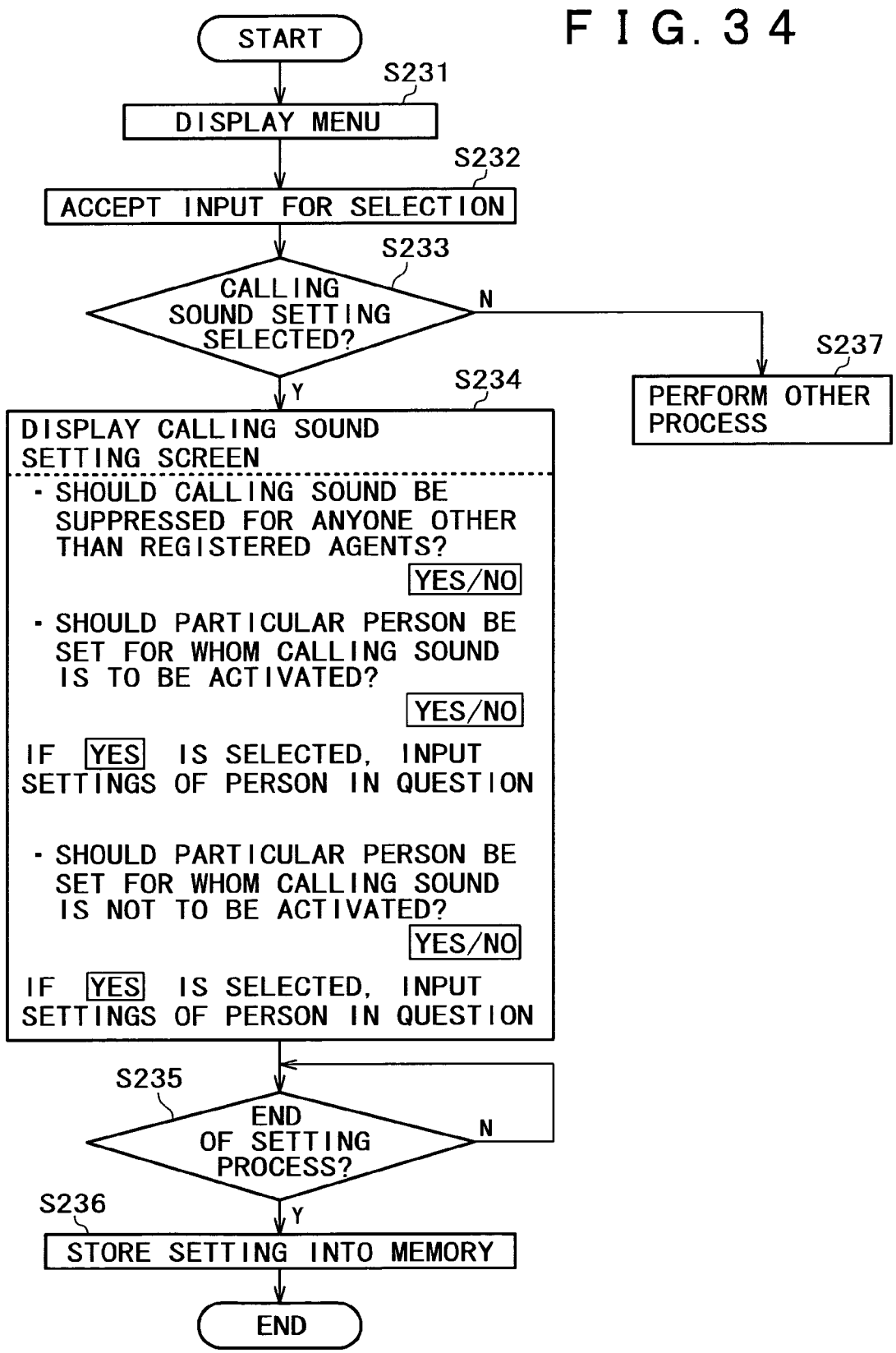
FIG. 34 is a flowchart of steps performed by the door phone apparatus in making settings for calling sound control.

FIG. 34 is a flowchart of steps performed by the controller 400 of the inventive door phone apparatus 4 using a setting program to set the calling sound in a desired manner. Pushing the menu key among the group of operation keys on the door phone control unit 4B causes the CPU 401 to read and execute the program whose steps are shown in FIG. 34.

A menu screen showing the items of available processes first appears on the LCD 47 (step S231).

The CPU 401 accepts selective input of the desired process through the menu screen on the LCD 47 (step S232). The input in step S232 is executed illustratively by use of numeric keys. The CPU 401 then determines whether the selective input made in step S232 designates the calling sound setting (step S233).

If in step S233 the calling sound setting is found to be designated, the CPU 401 displays a calling sound setting screen where various settings about the calling sound are accepted (step S234).

For example, as shown in step S234, there are two options (YES, NO) for the first setting (1) of whether or not to suppress the calling sound for anyone other than the registered agents.

Likewise, there are two options (YES, NO) for the second setting (2) of whether or not to set a particular agent for whom the calling sound is to be activated. If the "YES" is selected, the LCD 47 of the door phone control unit 4B displays a list of agents retrieved from the agent information memory 406. The user is prompted by the menu to select from the list a specific agent for whom the calling sound is to be activated. After this setting is made, the door phone calling sound is activated only if the registered person in charge of visits from the agent in question holds the IC card manually over the exterior reader/writer 41ex of the exterior unit 4A; the calling sound remains silent regarding any other visitor.

There are also two options (YES, NO) for the third setting (3) of whether or not to set a particular agent for whom the calling sound is not to be activated. If the "YES" is selected, the LCD 47 of the door phone control unit 4B displays the list of agents retrieved from the agent information memory 406. Viewing the displayed list, the user selects a specific agent for whom the calling sound is not to be activated. After this setting is made, the door phone calling sound remains silent when the registered person in charge of visits from the agent in question holds the IC card over the exterior reader/writer 41ex of the exterior unit 4A; the calling sound is activated with regard to any other visitor calling at the dwelling unit.

As described, the controller 400 of the door phone apparatus 4 accepts diverse input options through the operation key group 48 on the door phone control unit 4B with respect to the calling sound, such as whether or not to suppress the sound for visitors other than the registered agents, whether or not to set an agent for whom the sound is to be activated, and whether or not to set an agent for whom the sound is not to be activated.

The CPU 401 accepts necessary input options (instructions) until the user terminates the setting process (step S235). If the setting process is found to be terminated, the CPU 401 places the diverse selective information accepted in step S234 into relevant areas of the agent information memory 406 or into a nonvolatile memory, not shown, of the controller 400 (step S236) as definitive settings.

In the manner described, the door phone apparatus 4 of each dwelling unit has various settings made about the calling sound by the resident of the dwelling unit in question. Illustratively, in step S155 of FIG. 28 or in step S204 of FIG. 31, the door phone apparatus 4 of a particular dwelling unit may reference its internal settings about the calling sound so as to treat a specific registered agent as an unregistered agent for the dwelling unit in question. As another example, in step S157 of FIG. 28 or in step S206 of FIG. 31, the door phone apparatus 4 of a specific dwelling unit may refer to its settings about the calling sound in order to suppress or change the sound for a particular registered agent.

The above-described setting information about the visiting agents is transferred from the door phone apparatus 4 of each dwelling unit to the shared entrance apparatus 2. The shared entrance apparatus 2 thus manages both shared agent information and dwelling unit-specified agent information including the settings from individual dwelling units.

Under the scheme above, an agent authorized to visit the multiple dwelling house could be barred from visiting that house when the residents of all dwelling units of the house have made settings to deactivate the calling sound for that particular agent, even if the shared agent information is not deleted from the shared entrance apparatus 2. Obviously, every time a registered agent calls at the multiple dwelling house, the shared entrance apparatus 2 may be arranged to reference the information in the agent information memory of each dwelling unit so as to determine whether or not to let the visitor in.

When a room number is input through the numeric keys 25 of the shared entrance apparatus 2, with the IC card 70 (as an agent information communication apparatus) held over the reader/writer 21 of the shared entrance apparatus 2, the shared entrance apparatus 2 may read the agent information from the card and send it to the door phone apparatus 4 of the dwelling unit designated by the input room number. This allows the resident of the dwelling unit to know the visit of the registered agent at the earliest possible moment so that the resident may receive the visit in a well-prepared manner. The transfer of the agent information from the shared entrance apparatus 2 to the door phone apparatus 4 of a given dwelling unit also notifies its resident beforehand of the visit of an agent who may be specifically allowed or not allowed to call at the dwelling unit in question.

The agent information managed by the shared entrance apparatus 2 is regarded as shared agent information, while the agent information controlled by the door phone apparatus 4 of each dwelling unit is treated as dwelling unit-specific agent information. The two sets of agent information may be taken into account when the shared entrance door 1 is locked or unlocked or when the calling sound of each dwelling unit is controlled as described above.

[Dwelling Unit Storage Box and Dwelling Unit Storage Box Management Apparatus]

At the multiple dwelling house incorporating this invention, as shown in FIG. 1, a dwelling unit storage box 5 equipped with an electronic locking mechanism is installed near the entrance door 3 of each dwelling unit. A registered agent authorized to visit this multiple dwelling house is allowed to visit a given dwelling unit inside and, if the resident of that dwelling unit is not at home, use the storage box of the dwelling unit to deliver or pick up goods.

For example, an employee of a laundry as a registered agent may pick up the washing from the storage box 5 of a dwelling unit whose resident is not at home. As another example, a deliveryman from a delivery service may deposit an article in the storage box 5 of a dwelling unit whose resident is absent. There will be many other instances in which the storage box 5 of each dwelling unit may be used by various registered agents for delivery or pickup of goods and articles.

However, problems will arise if any registered agent authorized for entry into the multiple dwelling house is allowed to unlock the dwelling unit storage box without any restriction. Illustratively, the washing placed in the storage box for pickup by a laundry A might be picked up mistakenly by another laundry B. An article properly delivered by a delivery service might be picked up inadvertently by another registered agent allowed to unlock the storage box. Such potential problems are circumvented by the invention as follows:

According to the invention, an agent allowed to pick up goods from the storage box 5 and an agent permitted to deposit goods in the storage box 5 are to be set beforehand for each dwelling unit. The delivery and pickup of goods by way of the storage box 5 specific to each dwelling unit in the multiple dwelling house are controlled by the dwelling unit storage box management apparatus 6 controlling the electronic locking mechanisms of the storage boxes. What follows is a detailed description of how the electronic locking mechanism of the storage box at each dwelling unit is controlled by the dwelling unit storage box management apparatus 6.

Figure 35:
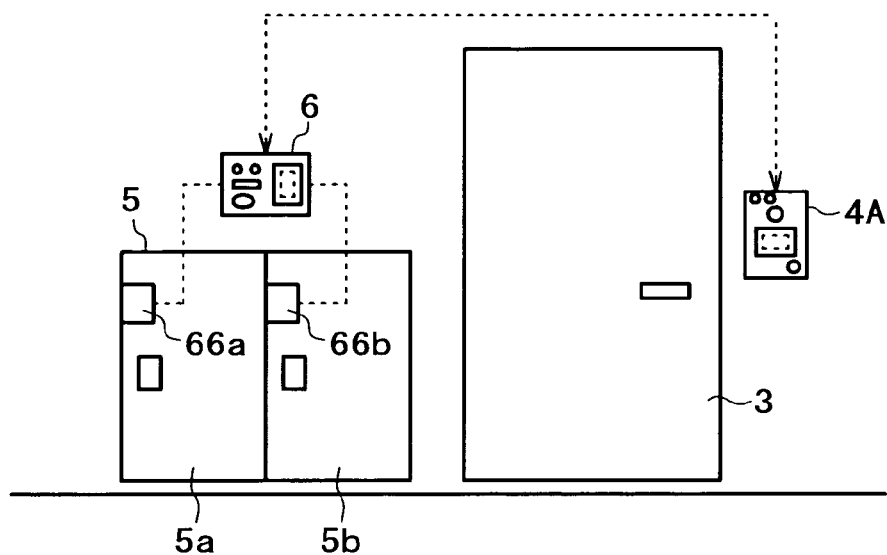
FIG. 35 is an explanatory view of a dwelling unit storage box and a dwelling unit storage box management apparatus according to the invention.

As shown in FIG. 35, the dwelling unit storage box 5 is set up near the entrance door 3 of each dwelling unit. The storage box 5 as embodied here is made up of two storage box elements 5a and 5b, one destined for delivery of goods from a registered agent, the other for pickup of deposited articles by another registered agent.

The dwelling unit storage box elements 5a and 5b are equipped with electronic locking mechanisms 66a and 66b respectively. The electronic locking mechanisms 66a and 66b are constituted by door latches 66a1 and 66b1, locking parts 66a2 and 66b2, and door open-close sensors 66a3 and 66b3, as in the case of the electronic locking mechanism for the dwelling unit entrance door 3 discussed earlier with reference to FIGS. 12A and 12B.

Figure 36:
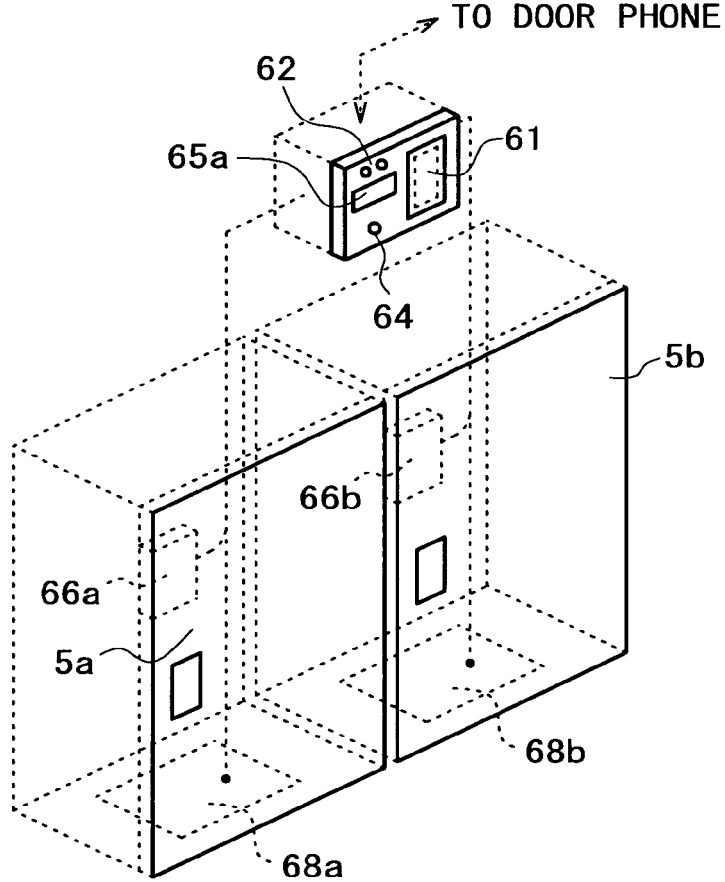
FIG. 36 is another explanatory view of the dwelling unit storage box and dwelling unit storage box management apparatus of the invention.

The storage box elements 5a and 5b are locked and unlocked by controlling the penetration and retraction of the locking parts 66a2 and 66b2 into and away from the door interior. It is the dwelling unit storage box management apparatus 6 that controls the electronic locking mechanisms 66a and 66b of the storage box elements 5a and 5b at each dwelling unit. In this embodiment, the storage box management apparatus 6 is positioned above the dwelling unit storage box 5 as depicted in FIGS. 35 and 36.

The multiple dwelling unit storage box management apparatus 6 has its front panel furnished with a reader/writer 61, LED's 62, a printer sheet output slot 65a, and an operation button 64. The reader/writer 61 communicates with the IC card 70 serving as the electronic key apparatus or agent information communication apparatus, and the printer sheet output slot 65a outputs paper sheets printed and output by a small printer 65.

In this embodiment, the storage box management apparatus 6 of each dwelling unit is connected in wired or wireless fashion to the door phone apparatus 4 of the dwelling unit in question. The connection allows the management apparatus 6 illustratively to reference the information in the agent information memory 406 of the controller 400 in the door phone apparatus 4.

With this embodiment, agents authorized to visit the multiple dwelling house may have their representatives registered in the agent information memory 406 of each target dwelling unit as pickup agents. These representatives may unlock an occupied storage box of the target dwelling unit to pick up deposited goods from inside. Other agents authorized to visit the multiple dwelling house may have their representatives registered in the agent information memory 406 of each target dwelling unit as delivery agents.

These representative may unlock an unoccupied storage box of the target dwelling unit to deposit articles therein for delivery.

The multiple dwelling unit box management apparatus 6 is also connected to storage box status sensors 68a and 68b in the storage box 5 of each dwelling unit. The connection allows the management apparatus 6 to determine whether each of the storage box elements 5a and 5b is occupied or unoccupied.

The dwelling unit storage box 5 also operates in what is known as the auto lock mode. That is, when the unlocked box door is closed, it is automatically locked. The storage boxes 5 attached to the dwelling units can be freely unlocked and locked by the residents using their IC cards 70 to put things in and take things out of the storage boxes 5.

[Internal Structure of the Dwelling Unit Storage Box Management Apparatus]

Figure 37:
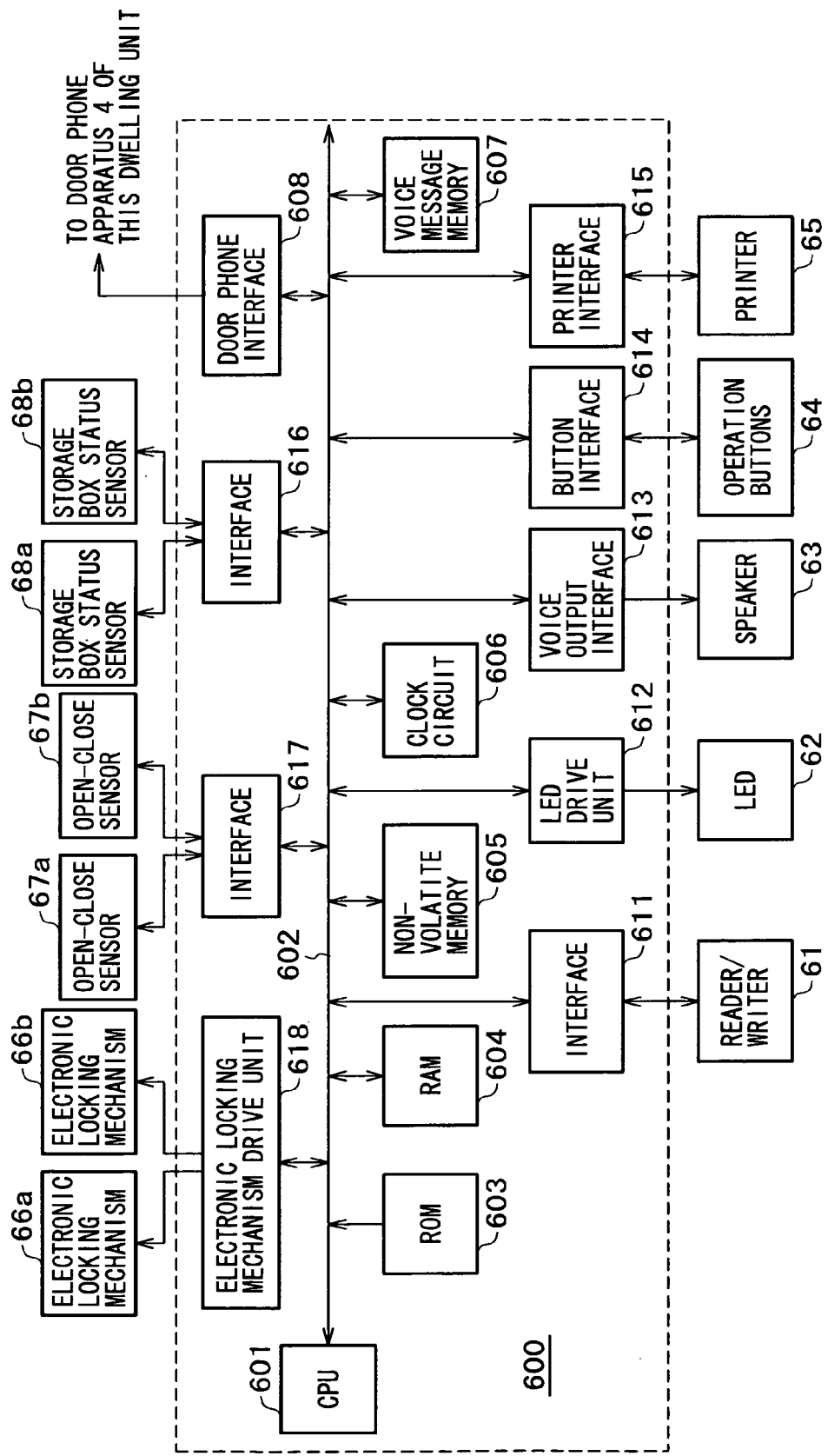
FIG. 37 is a block diagram showing a typical structure of the dwelling unit storage box management apparatus.

As in the case of the above-described shared entrance apparatus 2 and door phone apparatus 4, the dwelling unit storage box management apparatus 6 incorporates a controller 600 for controlling the authentication of electronic key information and agent identification information as well as the locking and unlocking of the dwelling unit storage box elements 5a and 5b. FIG. 37 shows a typical structure of the dwelling unit storage box management apparatus 6 embodying this invention.

The controller 600 incorporated in the storage box management apparatus 6 at each dwelling unit is structured as a microcomputer with its CPU 601 connected via a system bus 602 to: a ROM 603 that stores programs and data, a work area RAM 604, a nonvolatile memory 605 such as an EEPROM, a clock circuit 606 that offers clock and calendar information, a voice message memory 607 that contains various voice messages, and a door phone interface 608 that communicates data with the door phone apparatus 4 of the dwelling unit.

The system bus 602 is connected to the reader/writer 61 via an interface 611, to the LED's 62 via an LED drive unit 612, to the speaker 63 via a voice output interface 613, to the operation button 64 via a button interface 614, and to the printer 65 via a printer interface 615.

The system bus 602 is connected via an interface 616 to the storage box status sensors 68a and 68b attached to the dwelling unit storage box elements 5a and 5b respectively. The system bus 602 is also connected via an interface 617 to the door open-close sensors 67a and 67b furnished to the dwelling unit storage box elements 5a and 5b respectively. Furthermore, the system bus 602 is connected via an electronic locking mechanism drive unit 618 to the electronic locking mechanisms 66a and 66b which drive slidingly the locking parts 66a2 and 66b2 and which are attached to the storage box elements 5a and 5b respectively.

With this embodiment, as mentioned above, the agents authorized to use the storage boxes 5 of the dwelling units are to be registered beforehand in the agent information memory of the door phone apparatus 4 at each dwelling unit. Only these registered agents are allowed to use the storage boxes 5.

More specifically, the agents for whom the pickup permission flag and/or the delivery permission flag (held illustratively in the agent information memory 406) (see FIG. 16) is turned on are allowed to use the dwelling unit storage boxes 5. Where the pickup permission flag is turned on regarding a given agent in the door phone apparatus of a dwelling unit, that agent is allowed to unlock the dwelling unit storage box element which contains an article to be picked up and which was locked by the resident of that dwelling unit. Where the delivery permission flag is turned on with regard to another agent in the door phone apparatus of the dwelling unit, that agent is allowed to unlock the unoccupied storage box element for delivery of goods.

In the storage box management apparatus 6 of each dwelling unit, the nonvolatile memory 605 holds dwelling unit storage box management data shown in FIGS. 38A and 38B. The information thus retained distinguishes three states of storage box element: a box element which is unlocked by the resident of the dwelling unit who places an article therein for subsequent pickup and which will later be unlocked by a registered agent authorized for the pickup; a box element which remains unoccupied and which may be unlocked by a registered agent authorized for delivery of goods using the box; and a box element occupied with an article deposited earlier by the agent authorized for delivery.

Suppose that the resident of a given dwelling unit unlocks the storage box elements 5a and 5b using his or her own IC card 70, places goods inside, and locks the box elements again. This causes both a pickup flag and a use flag to be turned on (i.e., set to "1") in a "Storage box" row 5a of a table of dwelling unit storage box management data shown in FIG. 38A. In this case, the storage box element 5a can be unlocked only by the resident of the dwelling unit using his or her IC card 70 or by the registered agent authorized to pick up what is placed inside.

Suppose now that the dwelling unit storage box occupied for pickup is unlocked by the resident or by the authorized agent using their IC card and that what is placed inside is collected before the box is locked again. In that case, the pickup flag and use flag are both turned off (set to "0") so that the storage box element is regarded as unoccupied, as shown in the "Storage box" row 5a in FIG. 38B.

If the occupied storage box element is unlocked by the agent authorized for pickup and any article placed inside is picked up by the agent, then the agent identification information read from the agent's IC card is used to update information in a "Pickup agent identification information" column of the table, as shown in the "Storage box" row 5a in FIG. 38B. At the same time, the time information in a "Pickup time" column of the table is updated using the time information acquired from the clock circuit 606 when the box element unlocked for pickup was locked again.

If the agent authorized for delivery unlocks the storage box element of a given dwelling unit and places goods inside, then the use flag is turned on (set to "1") in the table of dwelling unit storage box management data in the nonvolatile memory 605, as shown the "Storage box" row 5b in FIG. 38B. Concurrently, the information in a "Delivery agent identification information" column of the table is updated using the agent identification information read from the agent's IC card, and the time information in a "Delivery time" column of the table is updated using the time information acquired from the clock circuit 606 when the box element unlocked for delivery was locked again.

When the delivery is normally completed, i.e., when the agent authorized for delivery unlocks the unoccupied storage box element of a given dwelling unit, places an article inside and locks the storage box element again, the controller 600 causes the printer 65 to issue a printed receipt bearing the delivery time, delivery place (address of the dwelling unit), room number, resident's name, delivery agent's name, and name of the person in charge. The delivery agent collects the receipt. The receipt allows the delivery agent to prove to a third party that a given article has been duly delivered to a designated dwelling unit.

The storage box status sensors 68a and 68b attached to the dwelling unit storage box elements 5a and 5b may be checked to determine whether any article has been placed inside for delivery or whether what was deposited inside has been picked up.

The storage box status sensors 68a and 68b may illustratively be infrared sensors. An article placed in the storage box cuts off an infrared beam while the absence of goods inside leaves the infrared beam of the sensors intact, whereby the occupied state and unoccupied state of the storage box are distinguished. Alternatively, weight sensors may be used to detect the presence or absence of goods in the storage box.

If an agent authorized for pickup were assigned specifically to each of the two storage box elements, it would be possible to designate two pickup agents at the same time. With this embodiment, however, one of the storage box elements needs to be allocated for receipt of goods, so that in practice only one agent may be designated as the pickup agent at a given point in time.

The arrangement above prevents potential troubles arising from having a plurality of agents authorized to collect goods from the dwelling unit storage box—troubles such as an article getting picked up mistakenly by the wrong agent.

Agents authorized for delivery do not pick up goods; they leave them behind instead. In that sense, a plurality of delivery agents can be designed to deliver their goods using the storage box as long as the box is unoccupied. A specific agent such as a laundryman may be designated as both a pickup and a delivery agent because the agent is supposed to collect the washing and deliver what has been cleaned using the storage box.

Below is a description of how to designate pickup and delivery agents by use of the operation key group 48 on the door phone control unit 4B of the door phone apparatus 4 installed in each dwelling unit, along with a description of how the dwelling unit storage box management apparatus 6 typically operates.

[Designation of Pickup and Delivery Agents]

Agents for pickup and delivery are designated or canceled by execution of the setting program that makes the necessary settings in the agent information memory 406 of the door phone apparatus 4 at each dwelling unit. Part of the workings of the setting program, performed by the controller 400 of the door phone apparatus 4, were outlined in FIG. 34.

Figure 39:
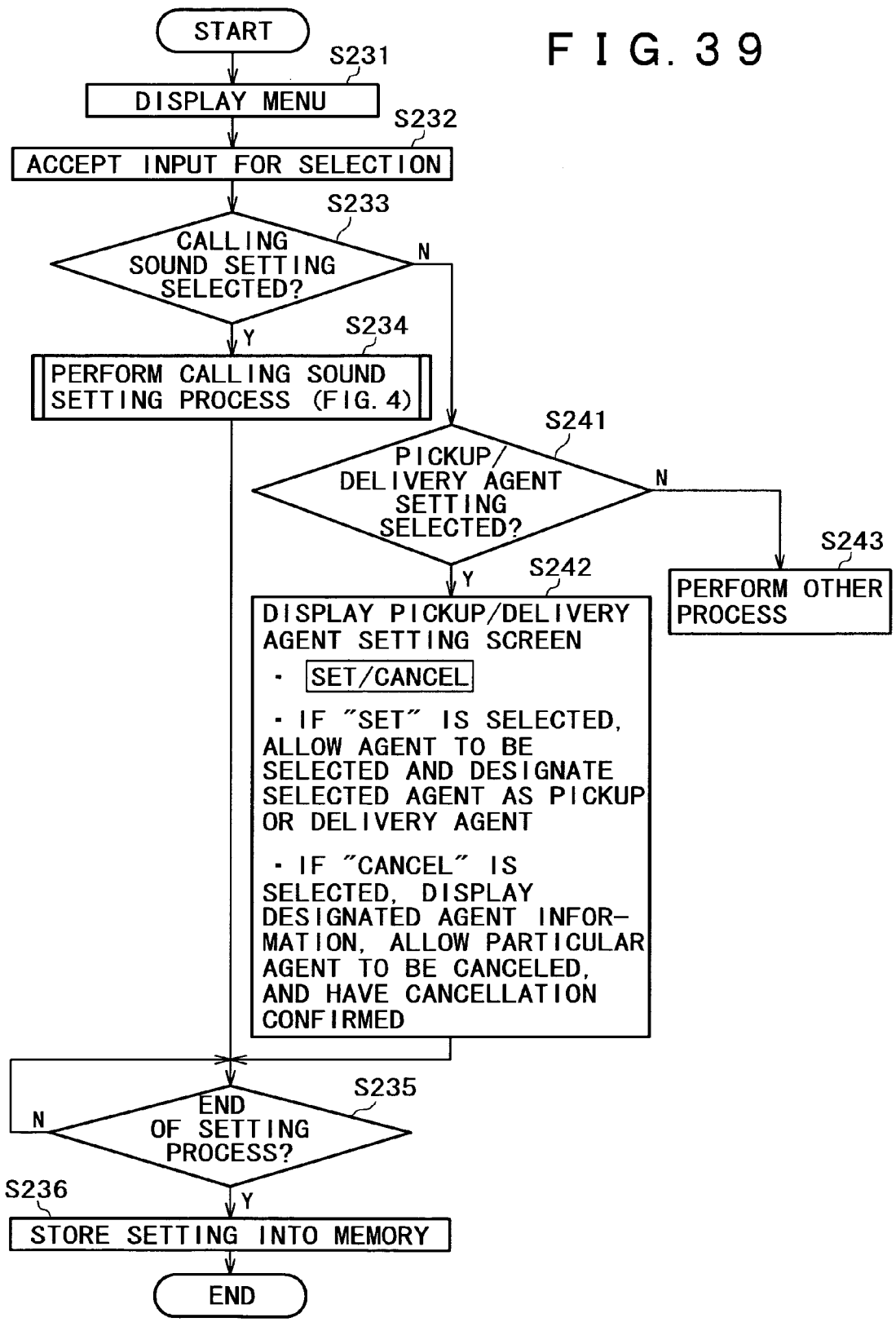
FIG. 39 is a flowchart of steps performed by the door phone apparatus in making settings with regard to delivery and pickup of goods by agents.

Pushing the menu key in the operation key group 48 on the door phone control unit 4B causes the CPU 401 to read and execute the setting program shown in FIG. 39 (i.e., the same program as that shown in FIG. 34). A menu screen showing the items of available processes first appears on the LCD 47 (step S231).

The CPU 401 accepts selective input of the desired process through the menu screen on the LCD 47 (step S232). The input in step S232 is made illustratively by use of numeric keys. The CPU 401 then determines whether the selective input made in step S232 designates the calling sound setting (step S233).

If in step S233 the calling sound setting is found to be designated, the CPU 401 displays a calling sound setting screen where various settings about the calling sound are accepted (step S234). If the calling sound setting is not found to be designated in step S233, the CPU 401 determines whether the selective input made in step S232 is for designating a pickup/delivery agent (step S241).

If in step S241 the pickup/delivery agent setting is found to be selected, the CPU 401 displays a pickup/delivery agent setting screen where various settings about pickup/delivery agents are accepted (step S242).

In step S242, the CPU 401 first determines whether the setting or the cancellation of pickup/delivery agents is selected. If the setting of agents is found to be selected, the CPU 401 displays the information about the currently registered agents, allows the user to select a desired agent from among the displayed agent information, and accepts instructions to turn on a pickup agent flag or a delivery agent flag for the selected agent.

If the cancellation of agents is found to be selected, the CPU 401 displays the information about the currently designated pickup and delivery agents, accepts selection of a desired agent from among the displayed agent information, confirms the selected agent information, and cancels (turns off) the pickup agent flag or delivery agent flag for the selected agent. It is possible to turn off automatically both the pickup agent flag and the deliver agent flag for a given agent, or to turn of one of the two flags regarding the agent in question as instructed.

The CPU 401 accepts necessary input options (instructions) until the user terminates the setting process (step S235). If the setting process is found to have ended, the CPU 401 updates the pickup agent flag and/or the delivery agent flag in relevant areas of the agent information memory 406 (step S236) in accordance with the diverse selective information accepted in step S242, before terminating the setting program of FIG. 39.

In the manner described, the door phone apparatus 4 of each dwelling unit has the necessary settings made by the resident of the dwelling unit about pickup and delivery agents. Such settings permit, among others, designating different pickup agents on different dates or designating pickup and/or delivery agents only when necessary.

[Workings of the Dwelling Unit Storage Box Management Apparatus]

Described below with reference to the flowcharts of FIGS. 40 through 43 is how the dwelling unit storage box management apparatus 6 operates when the dwelling unit storage box 5 is used. The doors of the storage box elements 5a and 5b are usually locked while operating in what is known as the auto lock mode.

In the controller 600 of the dwelling unit storage box management apparatus 6 at each dwelling unit, the CPU 601 checks continuously to see whether the reader/writer 61 has read such relevant information as identification information and card type information from the IC card 7 which, acting the electronic key apparatus or agent information communication apparatus, is held manually over the reader/writer 61 (step S301).

If in step S301 the relevant information is found to be read from the IC card 70, the CPU 601 determines whether the IC card 70 held over the reader/writer 61 of the storage box management apparatus 6 is a personal card or an agent card, on the basis of the information (card type) retrieved from the IC card 70 (step S302).

If in step S302 the IC card 70 is found to be a personal card, the CPU 601 of the dwelling unit storage box management apparatus 6 checks to see whether the card holder is a legitimate resident (family member) of this dwelling unit, based on the identification information read from the IC card 70 and in reference to the identification information in the family information memory 405 of the door phone apparatus 4 connected via the door phone interface 608 (step S303).

Following the authentication check in step S303, the CPU 601 of the storage box management apparatus 6 for this dwelling unit determines whether the information received from the card is authenticated (step S304). If the received information is not authenticated in step S304, the CPU 601 of the storage box management apparatus 6 causes the LED drive unit 612 to blink the LED's 62 in red and the speaker 63 to emit a warning sound through the voice output interface 613 (step S305). Thereafter, step S301 is reached again and the subsequent steps are repeated.

If in step S304 the received information is found authenticated, the CPU 601 of the dwelling unit storage box management apparatus 6 causes the LED drive unit 612 to light the LED's 62 in green (step S306). The CPU 601 then controls the electronic locking mechanisms 66a and 66b through the electronic locking mechanism drive unit 618 so as to unlock the storage box elements 5a and 5b (step S307).

The CPU 601 of the storage box management apparatus 6 causes the voice output interface 613 to have the speaker 63 emit a voice message such as "The storage box is unlocked," thereby announcing that the storage box element 5a or 5b of this dwelling unit has now been unlocked (step S308).

Figure 41:
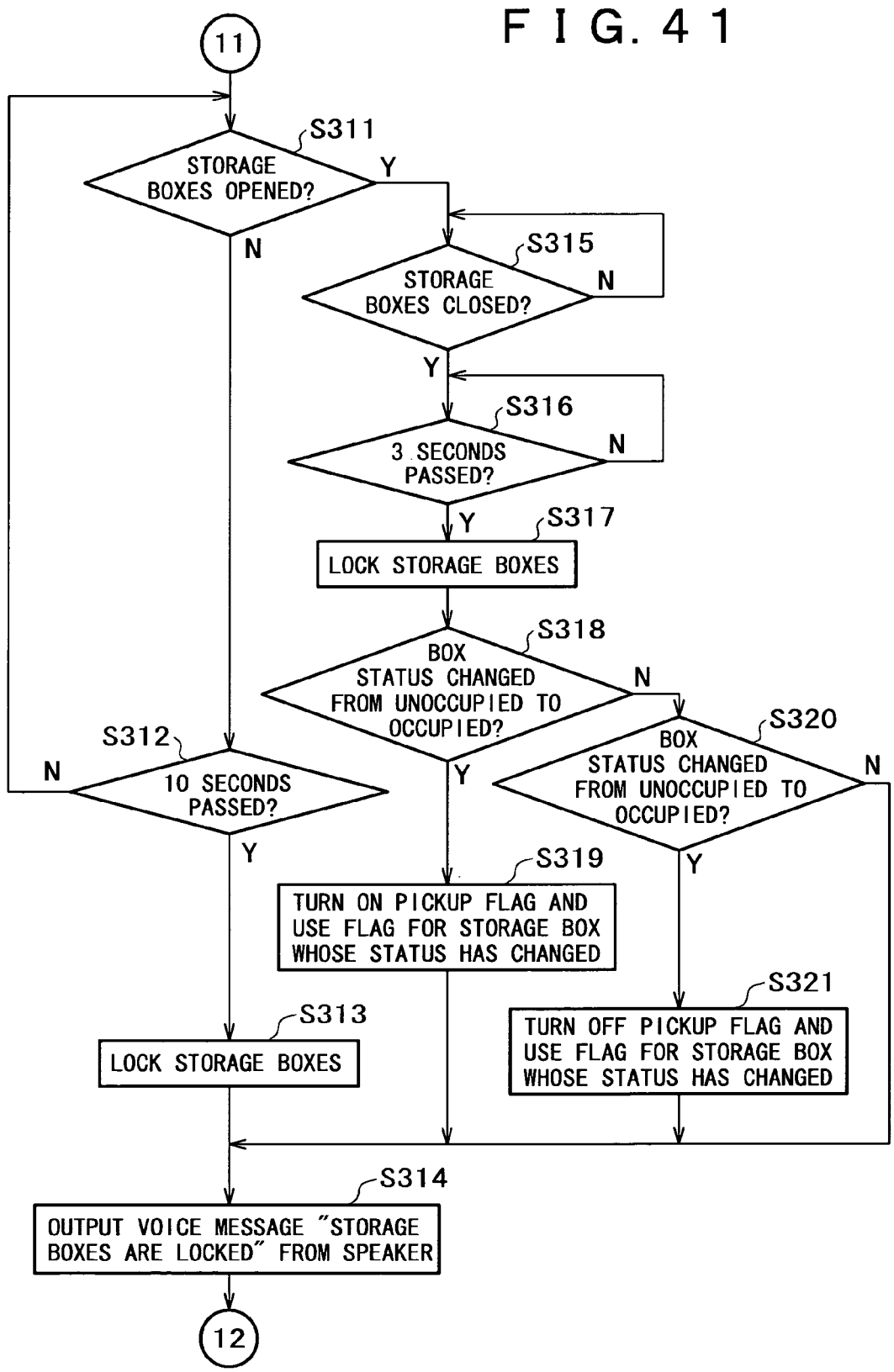
FIG. 41 is another flowchart of steps performed by the dwelling unit storage box management apparatus.

After that, the CPU 601 of the dwelling unit storage box management apparatus 6 goes to step S311 in FIG. 41. The CPU 601 checks the door open-close sensors 67a and 67b through the interface 617 to see if any one of the storage box elements 5a and 5b of the dwelling unit has been opened (step S311).

If in step S311 none of the storage box elements 5a and 5b of this dwelling unit is found to be opened, the CPU 401 determines whether a predetermined time period (e.g., 10 seconds) has elapsed since the unlocking of the storage box (step S312). If 10 seconds are not found to have passed in step S312, the CPU 601 returns to step S311 for another round of check.

If in step S312 the predetermined time period of 10 seconds is found to have elapsed, the CPU 601 of the dwelling unit storage box management apparatus 6 controls the electronic locking mechanisms 66a and 66b through the electronic locking mechanism drive unit 618 to lock the storage box elements 5a and 5b (step S313). The CPU 601 then causes the voice output interface 613 to have the speaker 63 emit a voice message such as "The storage box is locked" (step S314). Thereafter, step S301 of FIG. 40 is reached again and the subsequent steps are repeated.

If in step S311 any one of the storage box elements 5a and 5b is found to be opened, the CPU 601 of the storage box management apparatus 6 at this dwelling unit waits for the two storage box elements 5a and 5b to be closed, on the basis of the output from the door open-close sensors 67a and 67b (step S315).

If in step S315 the storage box elements 5a and 5b are both found to be closed, the CPU 601 waits for a predetermined time period (e.g., 3 seconds) to elapse. At the end of the predetermined time period, the CPU 601 of the storage box management apparatus 6 causes the electronic locking mechanism drive unit 618 to control the electronic locking mechanisms 66a and 66b so as to lock the storage box elements 5a and 5b (step S317).

The CPU 601 checks to see if any one of the storage box elements 5a and 5b has changed from unoccupied to occupied status, on the basis of the output coming from the storage box status sensors 68a and 68b through the interface 616 (step S318).

If in step S318 there is found a storage box element that has changed from unoccupied to occupied status, the CPU 601 turns on both the pickup flag and the use flag for that storage box in the dwelling unit storage box management data held in the nonvolatile memory 605 (step S319).

If in step S318 there is found no storage box element that has changed from unoccupied to occupied status, the CPU 601 proceeds to determine whether there is a storage box element that has changed from occupied to unoccupied status (step S320). If in step S320 there is found a storage box element that has changed from occupied to unoccupied status, the CPU 601 turns off both the pickup flag and the use flag for that storage box in the dwelling unit storage box management data in the nonvolatile memory 605 (step S321).

Step S314 is reached following step S319 or S321, or if in step S320 there is found no storage box element that has changed from unoccupied to occupied status. In step S314, the user is notified that the storage box elements 5a and 5b have been locked by the locking mechanisms 66a and 66b under control of the CPU 601. Step S301 of FIG. 40 is then reached again and the subsequent steps are repeated.

If in step S302 the card type is found to be the agent card, the CPU 601 of the dwelling unit storage box management apparatus 6 checks to see whether the card holder is a registered agent, based on the agent identification information retrieved from the IC card 70 and with reference to the agent identification information held in the agent information memory 406 of the door phone apparatus 4 for this dwelling unit (step S309).

Following the check in step S309, the CPU 601 of the storage box management apparatus 6 for this dwelling unit determines whether the information received from the card is authenticated (step S310). If the received information is not authenticated in step S310, the CPU 601 of the storage box management apparatus 6 causes the LED drive unit 612 to blink the LED's 62 (in red) and the speaker 63 to emit a warning sound through the voice output interface 613 (step S305). Thereafter, step S301 and the subsequent steps are repeated.

Figure 42:
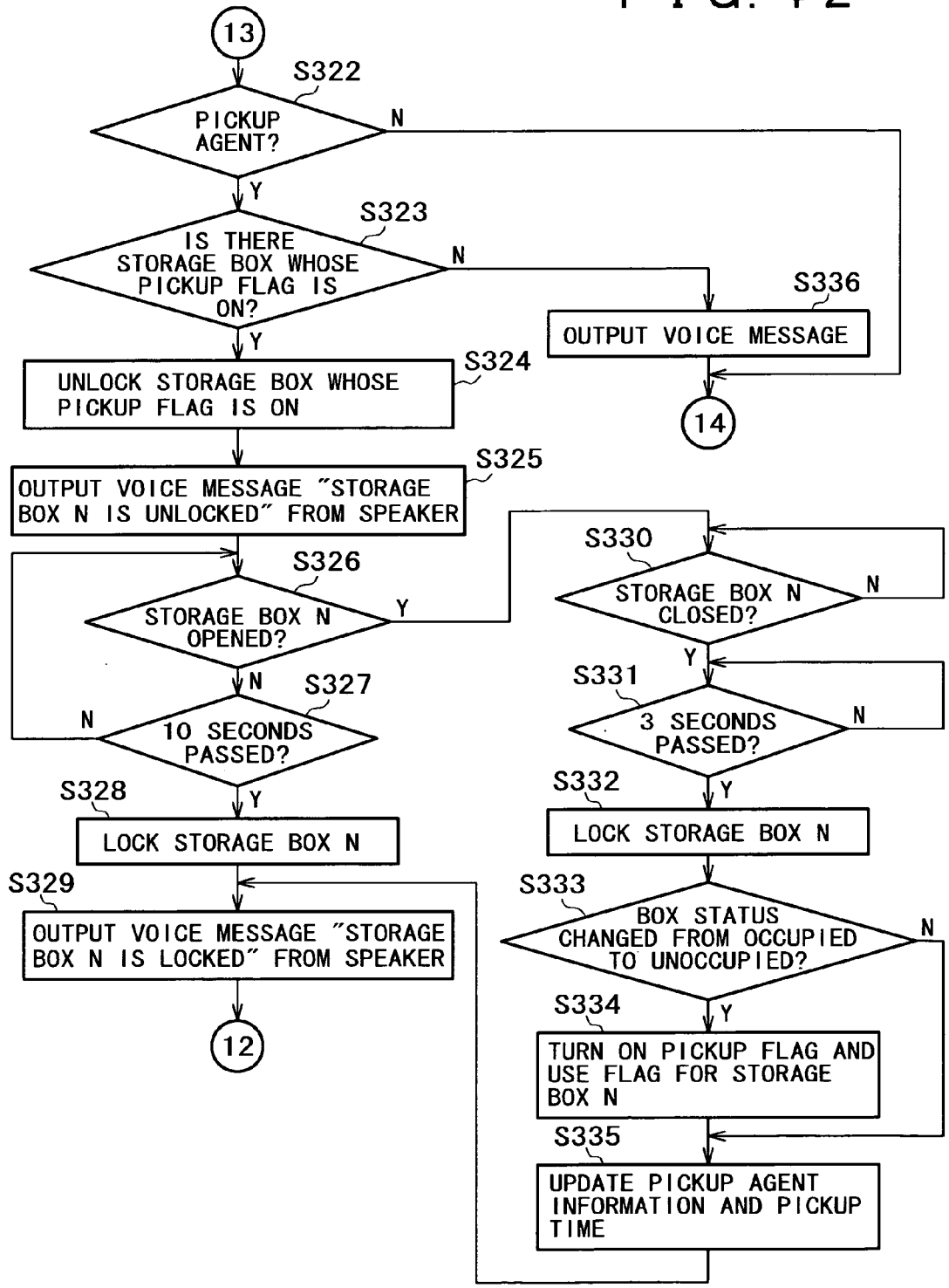
FIG. 42 is another flowchart of steps performed by the dwelling unit storage box management apparatus.
Figure 43:
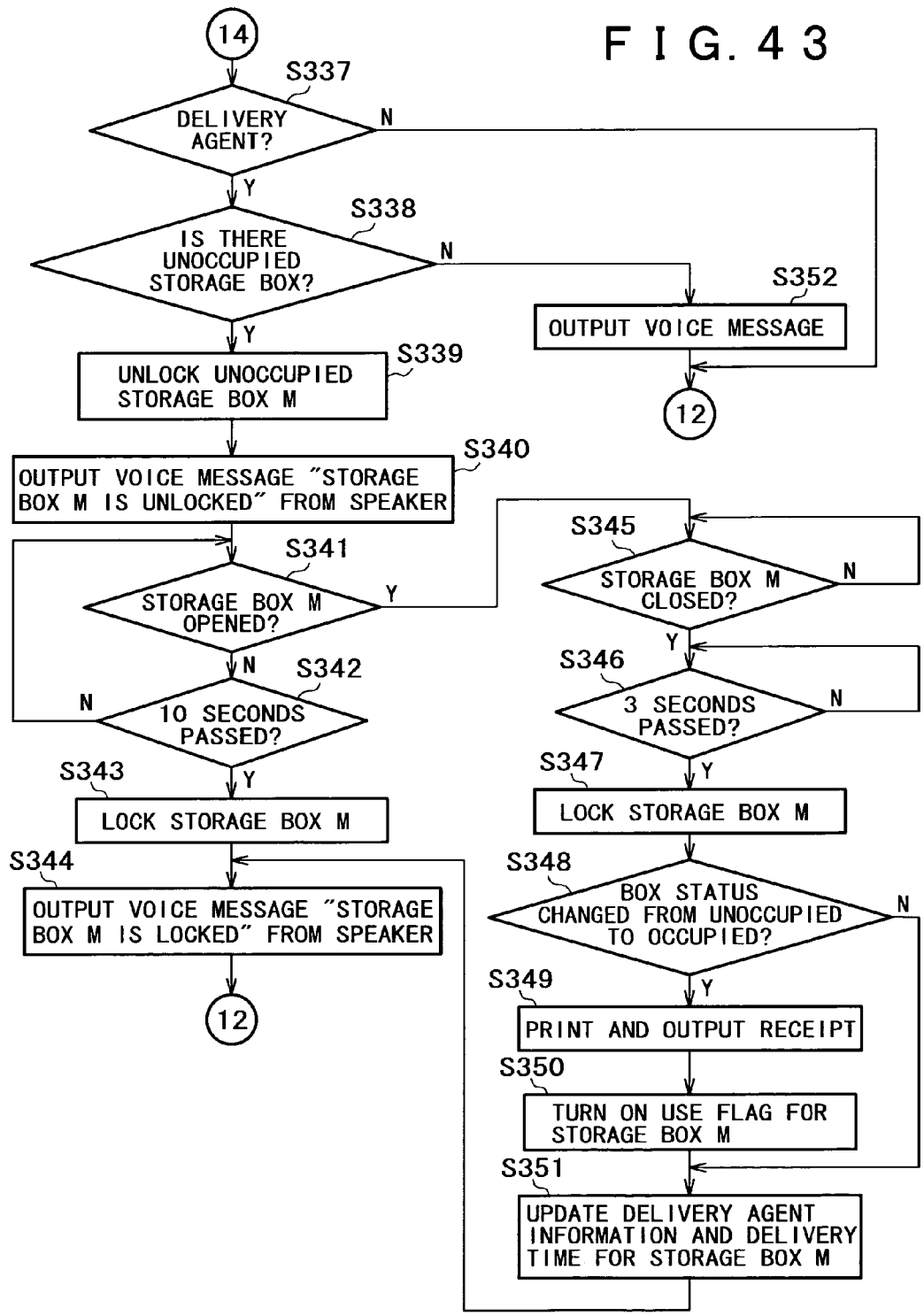
FIG. 43 is another flowchart of steps performed by the dwelling unit storage box management apparatus.

If in step S310 the received information is not found authenticated, the CPU 601 of the dwelling unit storage box management apparatus 6 goes to step S322 of FIG. 42. The CPU 601 checks to see whether the agent holding the IC card 70 is an agent authorized to pick up goods from the storage box (step S322). The check in step S322 is carried out by verifying whether the pickup agent flag in the agent information held in the agent information memory is turned on or off, the agent information having been referenced earlier in step S309.

If in step S322 the agent is found to be an authorized pickup agent, the CPU 601 of the storage box management apparatus 6 determines whether there is a storage box element for which the pickup flag is turned on, by referencing the dwelling unit storage box management data in the nonvolatile memory 605 (step S323).

If in step S323 there is found a storage box for which the pickup flag is turned on, the CPU 601 controls the electronic locking mechanism 66a or 66b through the electronic locking mechanism drive unit 618 in such a manner as to unlock the storage box N for which the pickup flag is turned on (step S324). At this point, the CPU 601 may cause the LED drive unit 612 to light the LED's 62 (in green) for a predetermined time period.

The CPU 601 causes the voice output interface 613 and speaker 63 to emit a voice message such as "The storage box N is unlocked" (step S325). Based on the detection output from the door open-close sensors 67a and 67b, the CPU 601 determines whether the door of the unlocked storage box N is opened (step S326).

If in step S326 the door of the storage box N is not found to be opened, step S601 checks to see whether a predetermined time period (e.g., 10 seconds) has elapsed since the unlocking of the storage box N (step S327). If in step S327 the predetermined time period is not found to have elapsed, the process from step S326 on is repeated. If the predetermined time period is found to have elapsed, the CPU 601 unlocks the storage box N (step S328) and causes the speaker to emit a voice message such as "The storage box N is locked" (step S329). Step S301 of FIG. 40 is then reached again and the subsequent steps are repeated.

Suppose that in step S326 the CPU 601 finds the door of the storage box N to be opened on the basis of the detection output from the door open-close sensors 67a and 67b, the storage box N being a box which is used as a pickup box containing the resident's goods to be picked up and for which the pickup flag is turned on. In that case, the CPU 601 waits for the door of the storage box N to be closed (step S330).

When the door of the storage box N is closed, the CPU 601 waits for three seconds to pass (step S331), before locking that storage box (step S332). The CPU 601 then determines whether the storage box N has changed from occupied to unoccupied status, on the basis of the detection output from the storage box status sensors 68a and 68b (step S333).

If in step S333 the storage box N is found to have changed from occupied to unoccupied status, the CPU 601 turns off the pickup flag and use flag for that storage box in order to establish its unoccupied status (step S334).

Step S335 is reached following step S334, or if in step S333 the storage box N is not found to have changed from occupied to unoccupied status. The CPU 601 updates the pickup agent identification information and pickup time regarding the storage box N in the nonvolatile memory 605 (step S335). Step S335 is followed by step S329 in which the user is notified that the storage box N has been locked. Step S301 of FIG. 40 is then reached again and the subsequent steps are repeated.

If in step S323 there is found no storage box for which the pickup flag is turned on, the CPU 601 causes a voice message such as "There is nothing inside to pick up" to be emitted (step S336). The CPU goes to step S337 in FIG. 43 following step S336 or if in step S322 the agent holding the IC card 70 is not found to be an authorized pickup agent.

The CPU 601 of the dwelling unit storage box management apparatus 6 then checks to see whether the agent holding the IC card 70 is an authorized delivery agent (step S337). The check in step S337 is carried out by verifying whether the delivery agent flag is turned on or off in the agent information in the agent information memory referenced earlier in step S309.

It should be noted that when in step S322 the card holder is found to be an authorized pickup agent and when in step S323 there is found no storage box for which the pickup flag is turned on, step S337 is reached for the verification of whether the card holder is a delivery agent. That is because some agents such as the laundryman are registered as both a pickup agent (who picks up illustratively the washing) and a delivery agent (who delivers illustratively the washed clothes).

If in step S337 the card holder is found to be a delivery agent, the CPU 601 of the dwelling unit storage box management apparatus 6 determines whether there is an unoccupied storage box for which both the pickup flag and the use flag are turned off, by referencing the dwelling unit storage box management data in the nonvolatile memory 605 (step S338).

If in step S338 there is found an unoccupied storage box, the CPU 601 causes the electronic locking mechanism drive unit 618 to control the electronic locking mechanism 66*a* or 66*b* in such a manner as to unlock the unoccupied storage box M (step S339). At this point, the CPU 601 may cause the LED drive unit 612 to light the LED's 62 (in green) for a predetermined time period.

The CPU 601 then causes the voice output interface 613 and speaker 63 to output a voice message such as "The storage box M is unlocked" (step S340). On the basis of the detection output from the door open-close sensors 67*a* and 67*b*, the CPU 601 determines whether the door of the unlocked storage box M is opened (step S341).

If in step S341 the door of the storage box M is not found to be opened, the CPU 601 determines whether a predetermined time period (e.g., 10 seconds) has elapsed since the unlocking of that storage box (step S342). If in step S342 the predetermined time period is not found to have elapsed, the process from step S341 on is repeated. When the predetermined time period is found to have elapsed, the CPU 601 locks the door of the storage box M (step S343) and causes a voice message such as "The storage box M is locked" to be emitted from the speaker (step S344). Thereafter, step S301 of FIG. 40 is reached again and the subsequent steps are repeated.

If in step S341 the CPU 601 finds the door of the unoccupied storage box M to be opened on the basis of the detection output from the door open-close sensors 67*a* and 67*b*, the CPU 601 waits for that storage box M to be closed (step S345).

When the door of the storage box M is found closed, the CPU 601 waits for 3 seconds to pass (step S346), before locking that storage box (step S347). Based on the detection output from the storage box status sensor 68*a* or 68*b*, the CPU 601 determines whether the storage box M has changed from unoccupied to occupied status (step S348).

If in step S348 the storage box N is found to have changed from unoccupied to occupied status, the CPU 601 causes the printer interface 615 to control the printer 65 in such a manner as to output a printed receipt (step S349) and turns on the use flag for the storage box M (step S350).

Step S351 is reached following step S350, or if in step S348 the storage box M is not found to have changed from unoccupied to occupied status. The CPU 601 updates the delivery agent identification information and pickup time regarding the storage box M in the nonvolatile memory 605 (step S351). Step S351 is followed by step S344 in which the user is notified that the storage box M has been locked. Step S301 of FIG. 40 is then reached again and the subsequent steps are repeated.

If in step S338 there is found no unoccupied storage box, the CPU 601 causes a voice message such as "There is no unoccupied storage box" to be emitted (step S352). The CPU 601 returns to step S301 of FIG. 40 and repeats the subsequent steps after step S352, or if in step S337 the agent holding the IC card 70 is not found to be an authorized delivery agent.

As described, the storage box 5 attached to each dwelling unit in the multiple dwelling house practicing this invention can be opened and closed as desired by the residents of the dwelling unit in question using their IC cards 70. The agents registered as authorized pickup and/or delivery agents are allowed to use the storage box of each dwelling unit to pick up goods therefrom and/or deposit articles therein for delivery.

The storage box attached to each dwelling unit is locked and unlocked in the so-called auto lock mode. That means there is little possibility of the goods in the storage box being lost or stolen. The inventive storage box thus makes it possible for the residents of the dwelling units to have goods picked up or delivered reliably without having to stay at home.

Although the dwelling unit storage box management apparatus 6 was described above as separate from the door phone apparatus 4, this is not limitative of the invention. Alternatively, the storage box management apparatus 6 of each dwelling unit may be formed integral with the door phone apparatus 4. With this structure, arrangements can be made suitably to manage the presence or absence of residents at each dwelling unit. If an agent is calling at a dwelling unit and no resident is at home, checks may be carried out based on these arrangements to see if the visiting agent is an authorized pickup or delivery agent for the pickup or delivery of goods. By using the dwelling unit storage box 5, the pickup or delivery can be done as discussed above with reference to the flowcharts in FIGS. 40 through 43.

In the foregoing description, the dwelling unit storage box 5 was shown opened and closed only from outside the dwelling unit in question. However, this is not limitative of the invention. Alternatively, additional doors may be attached to the storage box in such a manner that they may be opened and closed from inside the dwelling unit. Such an internally operable door structure allows the residents staying inside the dwelling unit to deposit and collect goods in and out of the storage box before pickup or after delivery by authorized agents; there is no need for the residents to go out of the dwelling unit to deposit or collect articles in or out of the storage box 5.

In the alternative case above, it is necessary to prevent someone's unlawful entry into the dwelling unit or criminal introduction of harmful objects into it through the internal doors of the storage box 5. That can be achieved illustratively by providing the auto lock function to the internal doors, by allowing these doors to be opened only with the residents' IC cards, or by having the doors opened solely with a dedicated key.

With the above-described embodiment, the dwelling unit storage box 5 was shown consisting of two storage box elements 5*a* and 5*b* that may be managed separately for pickup and delivery purposes. This, however, is not limitative of the invention. The storage box 5 may be a single box having a single door, or may be composed of a plurality of box elements with a plurality of doors that may be managed collectively.

The internal volume (size) of the dwelling unit storage box 5 may be varied as needed. For example, the box volume may be determined by taking into account such factors as the floor area of the dwelling unit, the layout of the dwelling unit made up of an entrance and rooms, and the average size of goods to be picked up or delivered through the use of the storage box.

Obviously, the dwelling unit storage box may be utilized not only when the residents are absent from the dwelling unit but also when they are at home.

[Other Typical Structures of the Electronic Key Apparatus and Agent Information Communication Apparatus]

Further examples of the electronic key apparatus and agent information communication apparatus, to be described below, are designed for use only by their legitimate owners based on their biometric information. As discussed earlier, the electronic key apparatus and agent information communication apparatus may be implemented not only in the form of IC cards but also as mobile phone terminals and PDA terminals. What is common to these embodiments is the fact that they have a control IC chip, communicating means, and a biometric information acquiring unit each. What follows is a description of an alternatively structured IC card serving as the electronic key apparatus.

<First Example>

Figure 44A:
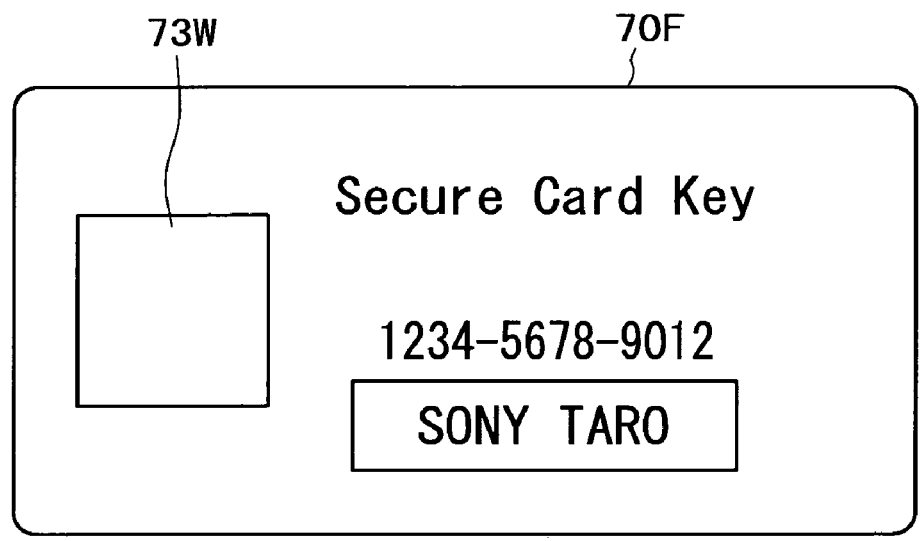
FIGS. 44A and 44B are schematic views of another electronic key apparatus and another agent information communication apparatus according to the invention.

This example is an IC card that uses fingerprints as biometric information when serving as the electronic key apparatus or agent information communication apparatus. FIG. 44A shows the surface of an IC card 70F which bears a name and an ID number of the card owner and which includes a fingerprint reading window 73W of a fingerprint reader 73.

Figure 44B:
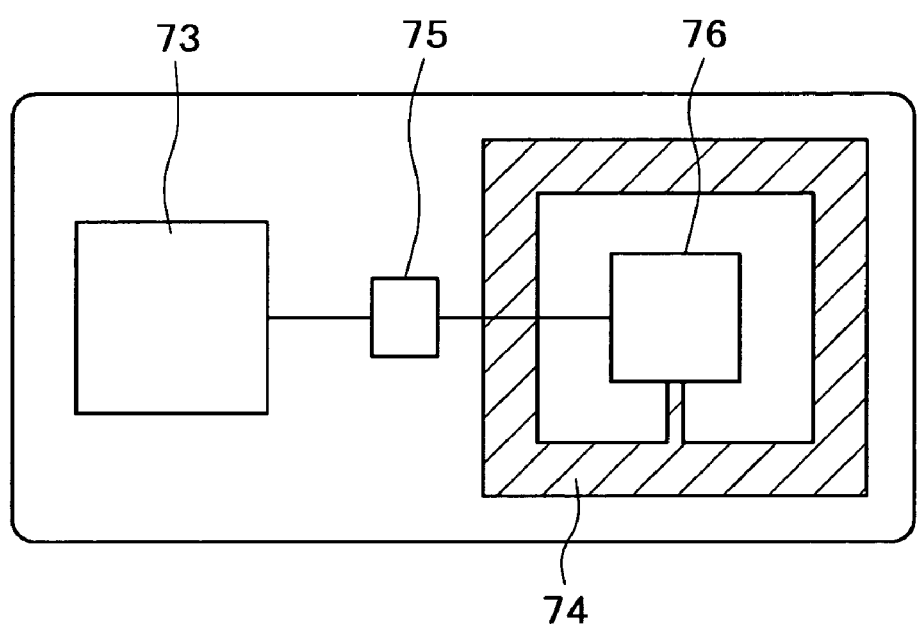

FIG. 44B shows a typical internal structure of the IC card 70F. As illustrated, the IC card 70F contains the fingerprint reader 73, an electromagnetic induction antenna 74 for communicating with a reader/writer, a control IC 75, and an information transmit/receive circuit unit 76.

The fingerprint reader 73 reads a fingerprint of a finger placed on the fingerprint reading window 73W and sends the fingerprint information thus read to the control IC 75. The control IC 75 compares the read-out fingerprint information with the previously recorded fingerprint information about the owner of the card, to determine whether there is a match therebetween.

In the event of a match, the electronic key information kept beforehand in a memory of the control IC 75 is retrieved and transmitted to the outside through the information transmit/receive circuit unit 76 and electromagnetic induction antenna 74. If a mismatch is detected upon comparison between the stored fingerprint information and the currently-read fingerprint information, the output of the electronic key information is inhibited.

Figure 45:
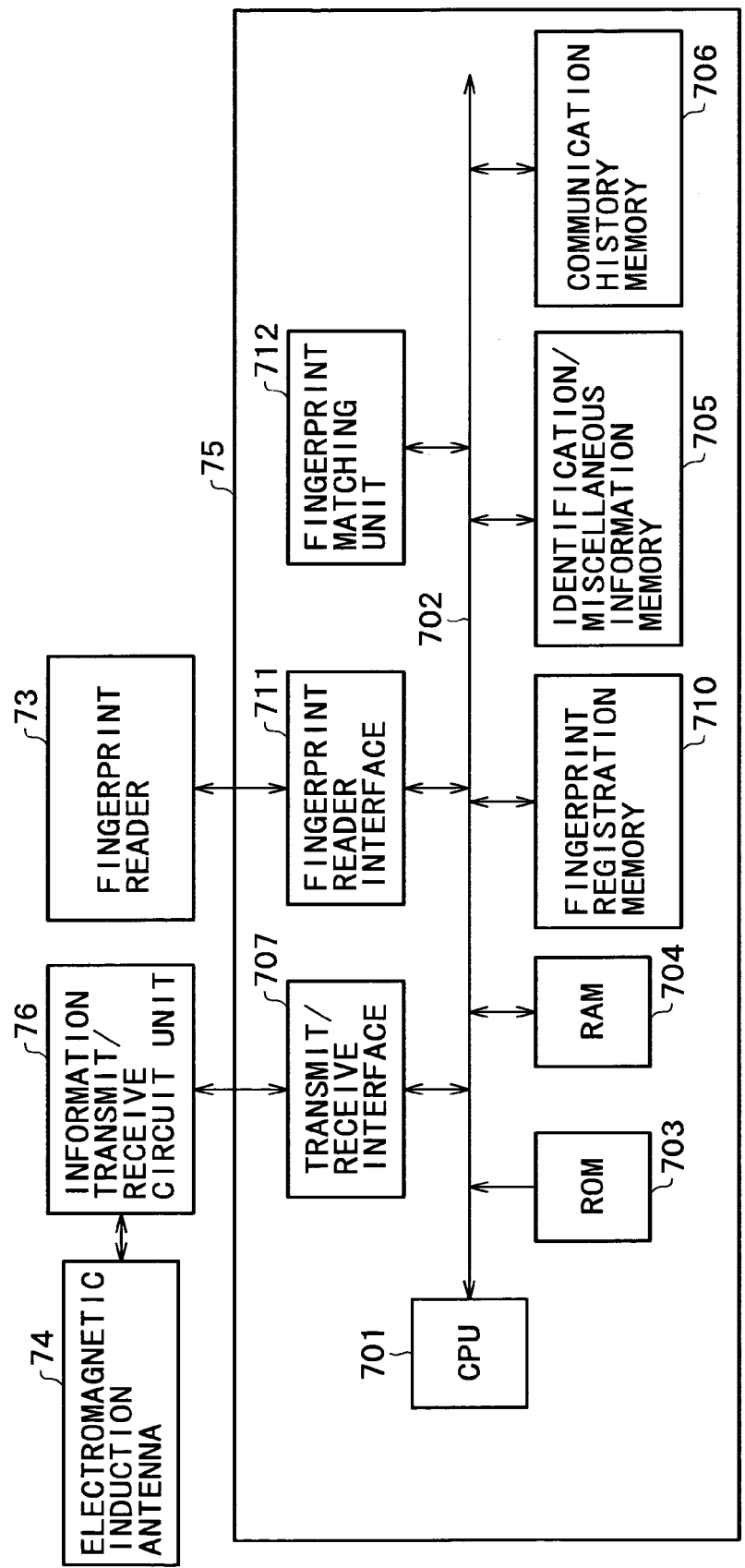
FIG. 45 is a block diagram showing a typical structure of the electronic key apparatus and agent information communication apparatus in FIGS. 44A and 44B.

FIG. 45 shows an internal block structure in the IC card 70F of the first example above. In the IC card 70F, as illustrated, a CPU 701 is connected via a system bus 702 to: a ROM 703 that stores programs and data, a work area RAM 704, an identification/miscellaneous information memory 705 that retains identification information serving as electronic key information or agent identification information, a communication history memory 706, a transmit/receive interface 707, a fingerprint registration memory 710, a fingerprint reader interface 711, and a fingerprint matching unit 712.

The identification/miscellaneous information memory 705 holds the identification information composed of the above-described IC chip production number. As discussed above in connection with other examples of the invention, the information/miscellaneous information memory 705 may also store personal profile information or agent information.

The communication history memory 706 retains the times of day at which communications were made by the owner of the IC card 70F with the reader/writer, communication-related historical records (including the distinction of the reader/writer being an exterior or an interior unit with which each communication was made), and the times of day at which the card owner left and returned to the dwelling unit. The transmit/receive interface 707 is connected to the information transmit/receive circuit unit 76 which in turn is connected to the electromagnetic induction antenna 74.

The fingerprint registration memory 710 contains the previously recorded fingerprint information about the owner of this IC card 70F. If the IC card is owned by a family member, the card holds the fingerprints of all family members of the dwelling unit in question. If the IC card is owned by an agent, the card contains the fingerprint information about the person in charge of visits from that agent. These fingerprints are submitted to the management company when the electronic key information or agent information is registered with the management server 10. The management company places the relevant fingerprint information thus submitted into the fingerprint registration memory 710 of each IC card 70F before issuing the card.

The fingerprint reader interface 711 is designed to acquire fingerprint information read by the fingerprint reader 73. The fingerprint matching unit 712 compares the fingerprint information obtained through the fingerprint reader interface 711, with the fingerprint information about the card owner retrieved from the fingerprint registration memory 710, so as to determine whether there is a match therebetween. The result of the comparison is output onto the system bus 702. The fingerprint matching unit 712 may be implemented alternatively not as a hardware device but as a software program executed by the CPU 701.

If the result of the comparison by the fingerprint matching unit 712 is a match (i.e., fingerprints are found to coincide), the CPU 701 transmits, as mentioned above, the electronic key information or agent identification information (or agent information) made up of the identification information retrieved from the identification/miscellaneous information memory 705 to the outside through the transmit/receive interface 707, information transmit/receive circuit unit 76, and electromagnetic induction antenna 74. If the result of the comparison by the fingerprint matching unit 712 is a mismatch (i.e., fingerprints fail to coincide), the CPU 701 inhibits the output of the electronic key information or agent identification information (or agent information).

Furthermore, the CPU 701 acquires information received by the electromagnetic induction antenna 74 through the information transmit/receive circuit unit 76 and the transmit/receive interface 707, and writes the acquired information to the communication history memory 706.

Figure 46:
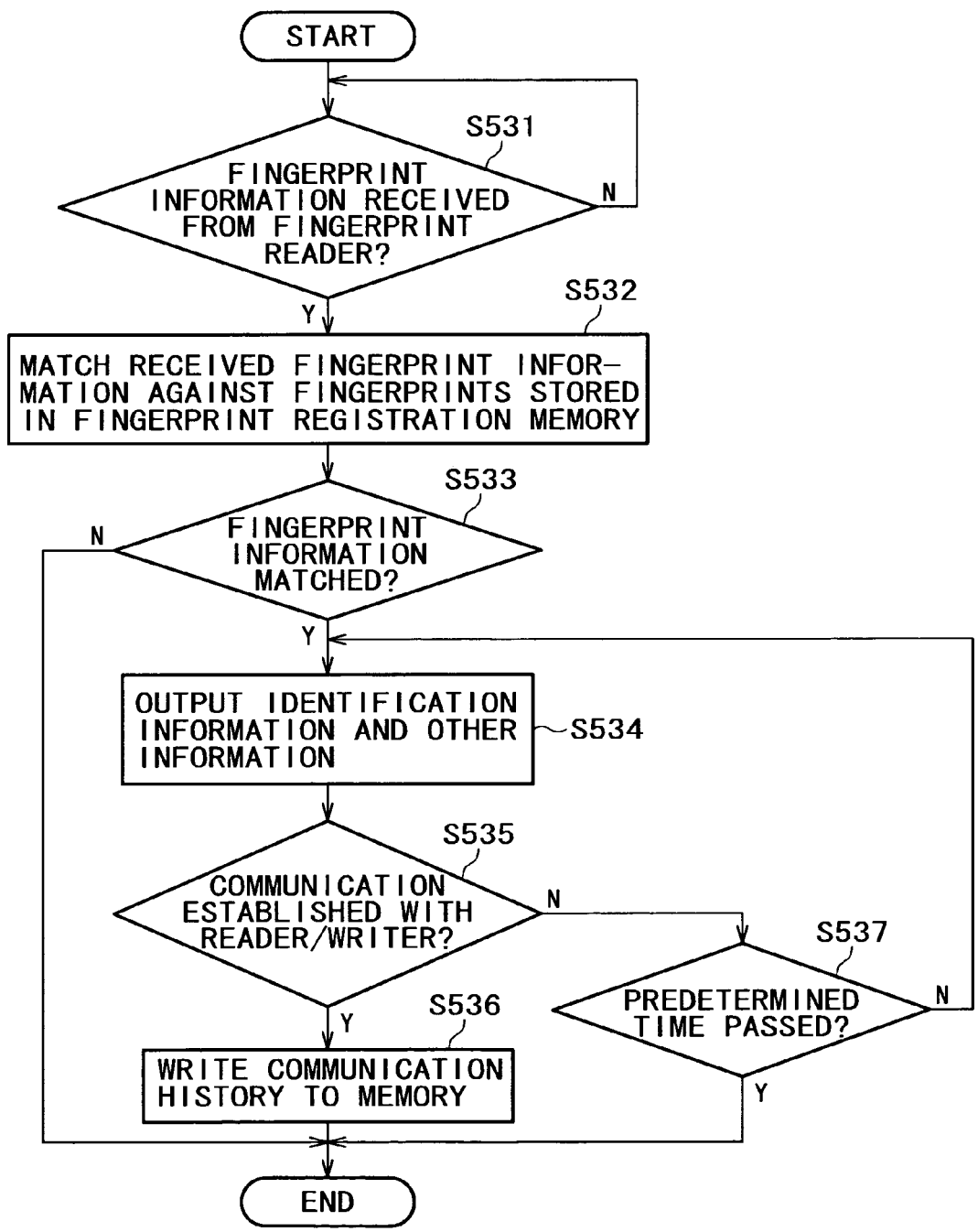
FIG. 46 is a flowchart of steps performed by the electronic key apparatus and agent information communication apparatus in FIGS. 44A and 44B.

FIG. 46 is a flowchart of steps performed by the CPU 701 of the IC card outlined above.

The CPU 701 waits for fingerprint information to be received from the fingerprint reader 73 through the fingerprint reader interface 711 (step S531). When fingerprint information is found to be received, the CPU 701 reads the card owner's previously recorded fingerprint information from the fingerprint registration memory 710 and causes the fingerprint matching unit 712 to compare the two sets of information for a match (step S532).

The CPU 701 determines whether the result of the comparison by the fingerprint matching unit 712 is a match (step S533). In case of a mismatch, the CPU 701 terminates its processing and does not transmit the electronic key information.

If the result of comparing the two sets of fingerprint information is a match, the CPU 701 reads the identification information and other information from the identification/miscellaneous information memory 705 and transmits the retrieved information to the outside through the information transmit/receive circuit unit 76 and electromagnetic induction antenna 74 (step S534).

The CPU 701 then determines whether communication has taken place between the card and the reader/writer (step S535). If relevant information is found to be received from the reader/writer through the electromagnetic induction antenna 74, information transmit/receive circuit unit 76, and transmit/receive interface 707, the CPU 701 writes a historical record of this communication with the reader/writer to the communication history memory 706 (step S536), before terminating this processing routine.

If in step S535 no information is found to be received from the reader/writer, the absence of communication prompts the CPU 701 to determine whether a predetermined time period has elapsed since the transmission of the identification information and other information (step S537). If the predetermined time period is not found to have passed yet, the CPU 701 returns to step S534, transmits the identification information and other information again, and waits for a response from the reader/writer. If the predetermined time period is found to have elapsed in step S537, the CPU 701 terminates this processing routine.

The electronic key apparatus or agent information communication apparatus structured in the form of the IC card 70F as the first example above compares the card owner's previously recorded fingerprint information with the current card user's fingerprint. Only in the case of a match upon comparison does the IC card 70F output the electronic key information or the agent information including the agent identification information. It follows that only the previously registered user can use the IC card 70F, and even if the IC card 70F is lost or misplaced, an unscrupulous person who happens to recover the card cannot abuse it.

<Second Example>

Figure 47A:
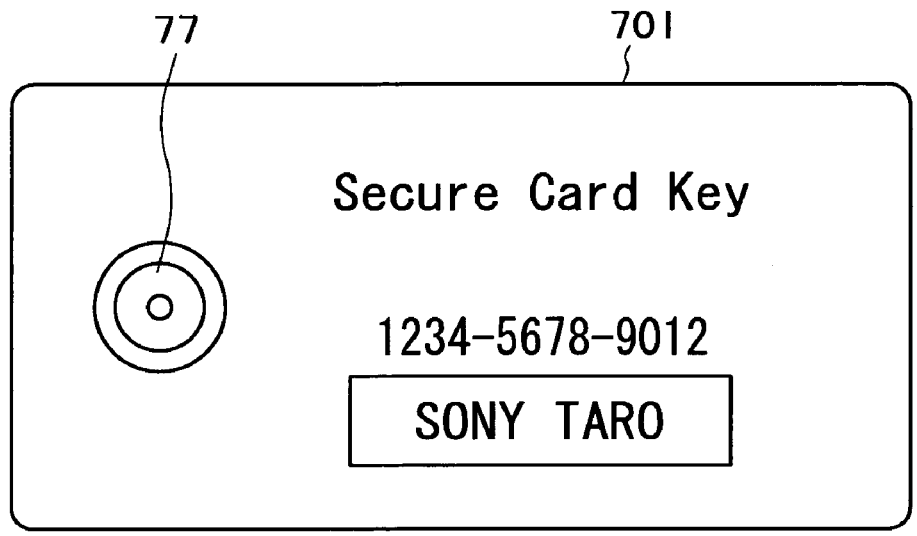
FIGS. 47A and 47B are schematic views of yet another electronic key apparatus and yet another agent information communication apparatus according to the invention.

This example is an IC card 70I that uses iris patterns as biometric information when serving as the electronic key apparatus or agent information communication apparatus. FIG. 47A shows the surface of the IC card 70I which bears a name and an ID number of the card owner and which includes a CCD (charge coupled device) camera 77.

Figure 47B:
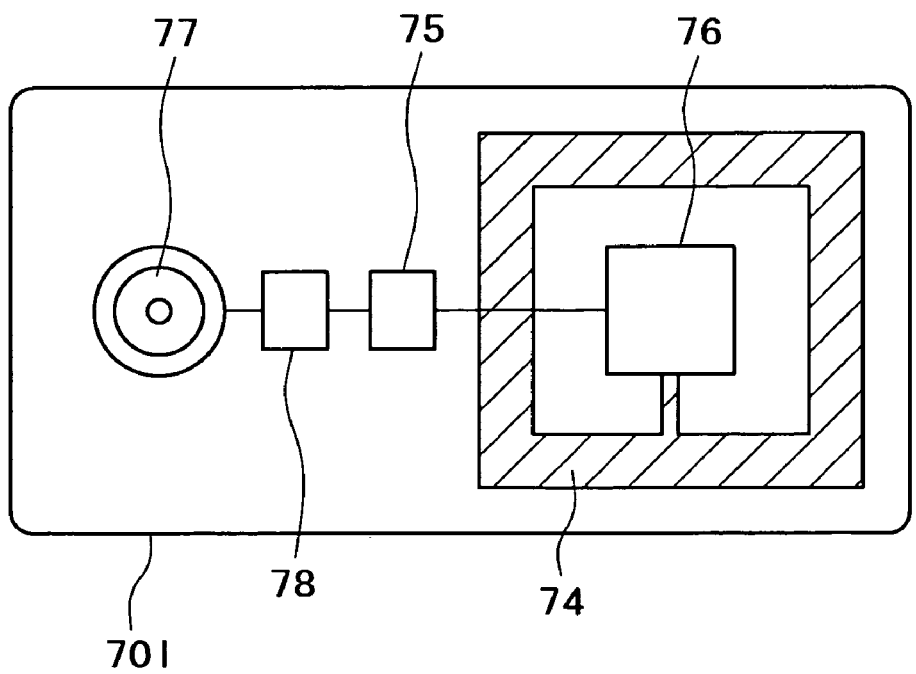

FIG. 47B shows a typical internal structure of the IC card 70I. As with the IC card 70F of the first example, the IC card 70I contains an electromagnetic induction antenna 74, a control IC 75 and an information transmit/receive circuit unit 76, as well as a picture signal processing circuit unit 78 which processes picture signals from the CCD camera 77 and supplies the processed signals to the control IC 75.

The user gets the CCD camera 77 to take a picture of his or her eye (i.e., iris pattern). The CCD camera 77 acquires the user's iris information through the picture signal processing circuit unit 78 and forwards the acquired information to the control IC 75. In turn, the control IC 75 compares the card owner's previously recorded iris information with the acquired iris information for a match.

If the result of the comparison is a match, the control IC 75 reads the identification information and other information from an internal memory and transmits the retrieved information to the outside via the information transmit/receive circuit unit 76 and electromagnetic induction antenna 74. If the result of comparing the stored iris information with the acquired iris information turns out to be a mismatch, the output of any information from the card to the outside is inhibited.

Figure 48:
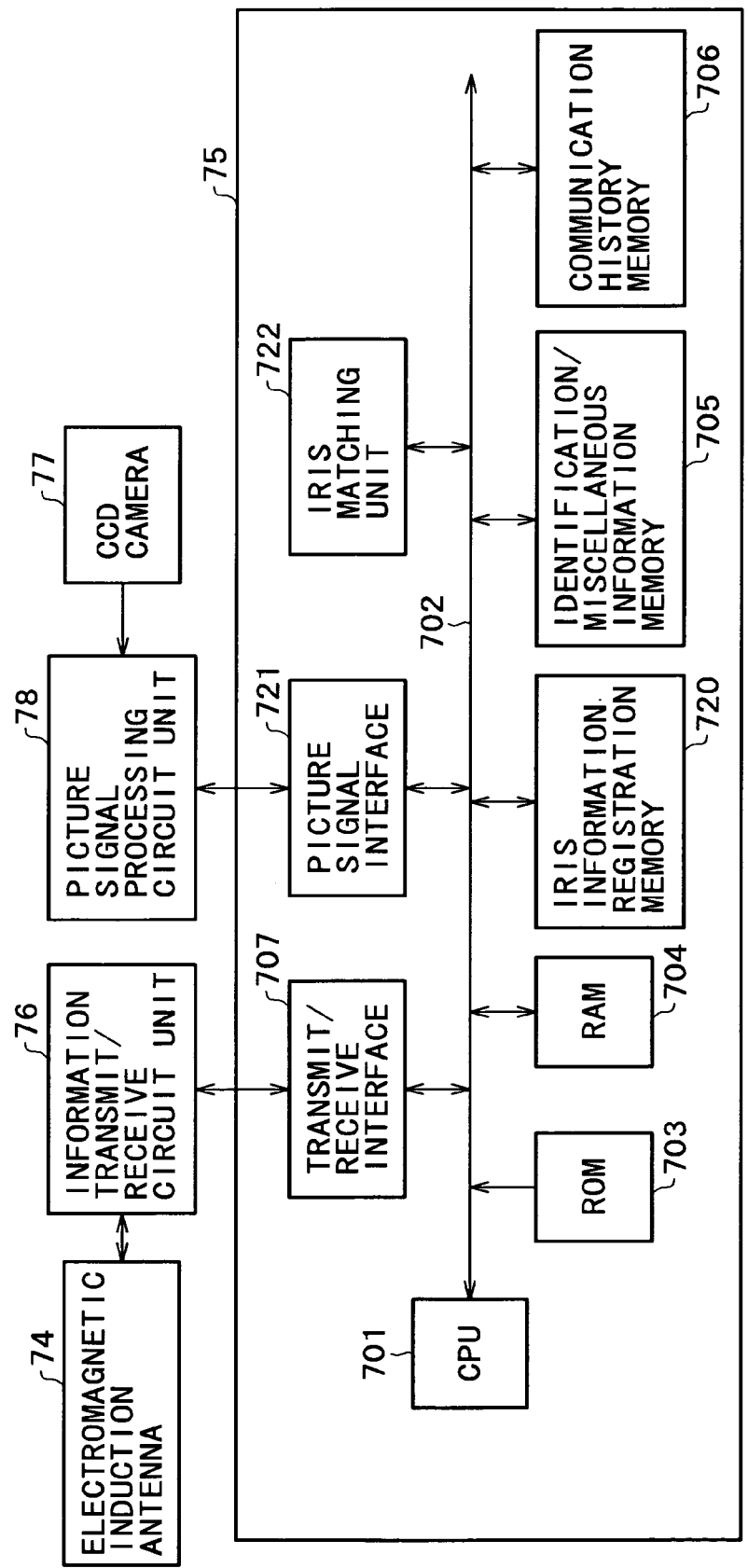
FIG. 48 is a block diagram showing a typical structure of the electronic key apparatus and agent information communication apparatus in FIGS. 47A and 47B.

FIG. 48 shows an internal block structure in the IC card 70I of the second example. In this example, the fingerprint registration memory 710, fingerprint reader interface 711, and fingerprint matching unit 712 of the first example above are replaced by an iris information registration memory 720, a picture signal interface 721, and an iris matching unit 722 respectively. The picture signal interface 721 is connected to the CCD camera 77. The other components are the same as those of the first example in FIG. 45.

The iris information registration memory 720 holds the previously recorded iris information about the owner of this IC card 70I. As in the case of fingerprint information, the management company that runs the management server 10 writes relevant iris information to the IC card 70I before issuing that card.

The picture signal interface 721 acquires iris information from the picture signal processing circuit unit 78. The iris matching unit 722 compares the iris information obtained through the picture signal interface 721, with the card owner's iris information retrieved from the iris information registration memory 720 for a match. The result of the comparison is output onto the system bus 702. The iris matching unit 722 may be implemented alternatively not as a hardware device but as a software program executed by the CPU 701.

If the result of the comparison by the iris matching unit 722 is a match (i.e., iris patterns are found to coincide), the CPU 701 transmits the identification information and other information retrieved from the identification/miscellaneous information memory 705 to the outside through the transmit/receive interface 707, information transmit/receive circuit unit 76, and electromagnetic induction antenna 74. If the result of the comparison by the iris matching unit 722 is a mismatch (i.e., iris patterns fail to coincide), the CPU 701 inhibits the output of the identification information and other information from the card.

Figure 49:
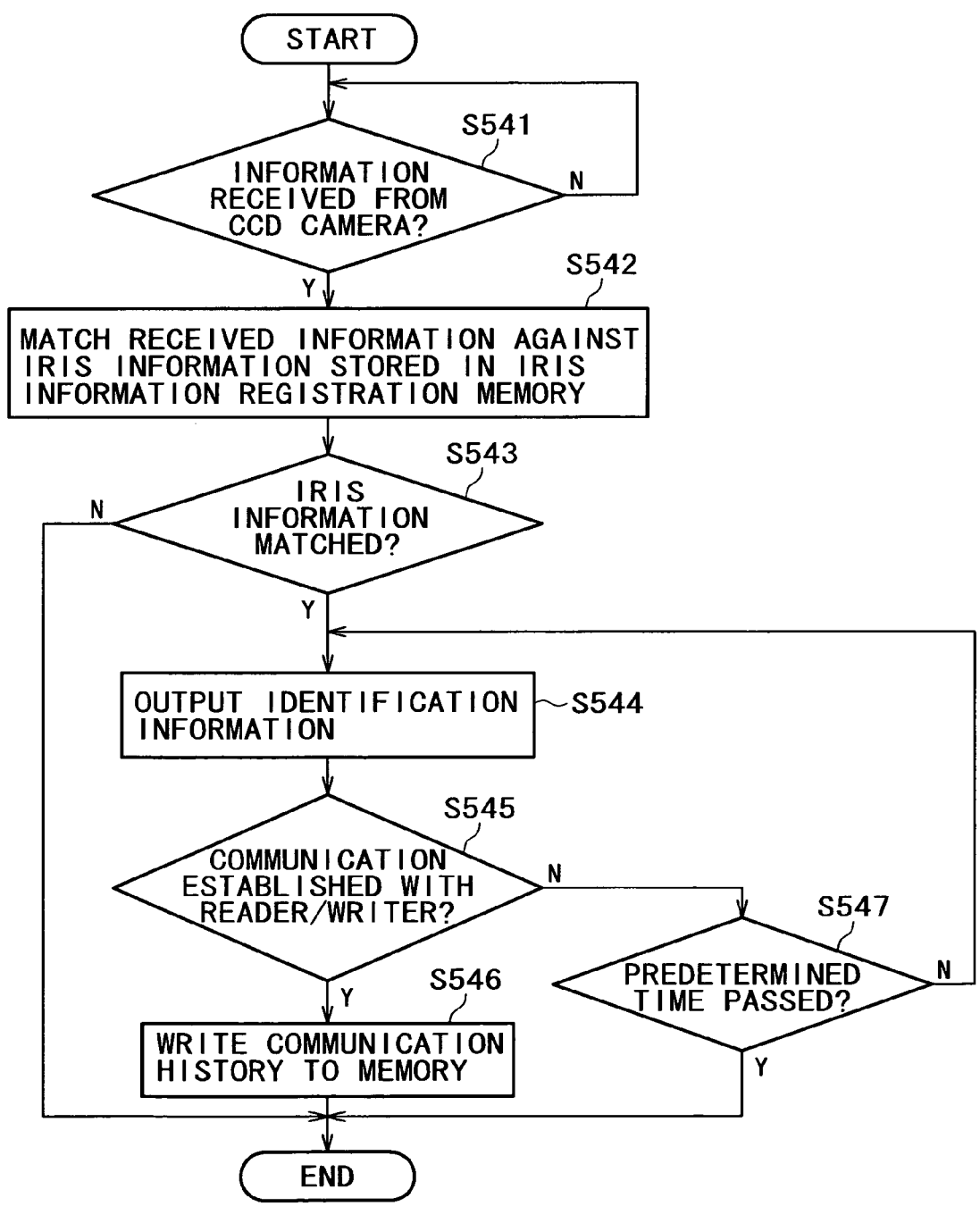
FIG. 49 is a flowchart of steps performed by the electronic key apparatus and agent information communication apparatus in FIGS. 47A and 47B.

FIG. 49 is a flowchart of steps performed by the CPU 701 of the second example above.

The CPU 701 waits for iris information to be received from the picture signal processing circuit unit 78 through the picture signal interface 721 (step S541). When iris information is found to be received, the CPU 701 reads the card owner's previously recorded iris information from the iris information registration memory 720 and causes the iris matching unit 722 to compare the two sets of information for a match (step S542).

The CPU 701 determines whether the result of the comparison by the iris matching unit 722 is a match (step S543). In case of a mismatch, the CPU 701 terminates its processing and does not output the identification information and other information from the card.

If the result of comparing the two sets of iris information is a match, the CPU 701 reads the identification information and other information from the identification/miscellaneous information memory 705 and transmits the retrieved information to the outside through the information transmit/receive circuit unit 76 and electromagnetic induction antenna 74 (step S544).

The CPU 701 then determines whether communication has taken place between the card and the reader/writer (step S545). If relevant information is found to be received from the reader/writer through the electromagnetic induction antenna 74, information transmit/receive circuit unit 76, and transmit/receive interface 707, the CPU 701 writes a historical record of this communication with the reader/writer to the communication history memory 706 (step S546), before terminating this processing routine.

If in step S545 no information is found to be received from the reader/writer, the absence of communication prompts the CPU 701 to determine whether a predetermined time period has elapsed since the transmission of the identification information and other information (step S547). If the predetermined time period is not found to have passed yet, the CPU 701 returns to step S544, transmits the identification information and other information again, and waits for a response from the reader/writer. If the predetermined time period is found to have elapsed in step S547, the CPU 701 terminates this processing routine.

The electronic key apparatus or agent information communication apparatus structured in the form of the IC card 70F as the second example above compares the card owner's previously recorded iris information with the current card user's iris pattern. Only in the case of a match upon comparison does the IC card 70I output the electronic key information or the agent information including the agent identification information. It follows that even when the IC card 70I is lost or misplaced, an unscrupulous person who may happen to recover the card cannot abuse it.

[Other Examples that Use Biometric Information]

Although the preceding examples were shown using fingerprints and iris patterns as biometric information, they are not limitative of the invention. Alternatively, the biometric information may be derived from vein prints on the back of the card owner's hand. If the iris information is replaced by the vein print of the card owner as the biometric information, the structure of the IC card 70I in the second example above may be utilized unmodified, with the CCD camera 77 taking pictures of the vein print on the back of the current card user's hand.

Obviously, any other biometric information may be used for personal identification purposes as long as the information can be obtained using suitable means.

The IC card examples described above allow identification information and other relevant information to be transmitted to the outside only when the current card user's biometric information is found to match the card owner's previously recorded biometric information. Even if the IC card is lost or misplaced, anyone who happens to recover the card is barred from abusing it because of the predictable mismatch between the previously recorded biometric information in the card and the biometric information from that unscrupulous person. The scheme ensures a very high level of security in personal identification.

[Other Embodiments]

In the embodiments discussed above, the face photo information about the person in charge of visits from the registered agent is illustratively stored in the agent information memory 406 of the door phone apparatus 4 for each dwelling unit. When a visitor from a registered agent calls at a dwelling unit, the stored face photo is retrieved from the memory and displayed with a picture taken of the visitor for comparison. In another embodiment, the IC card serving as the agent information communication apparatus may retain the face photo information about the person in charge. When the IC card holder visits the dwelling unit, the controller 400 may receive the face photo information from the presented IC card and display the photo along with a picture taken of the visitor by the camera 46 on the screen of the LCD 47 attached to the door phone apparatus 4, as illustrated in FIG. 33B.

In the above-described embodiments, the agent information was shown registered and the IC card issued for each person in charge. Alternatively, the agent information may be registered and the IC card issued per agent.

In the embodiments discussed above, the electronic key information was shown represented by an IC chip production number in correspondence with personal information about each of the family members, so that the electronic key information identifies each family member. Alternatively, personal identification information may be defined apart from the electronic key information and recorded separately in the electronic key apparatus or in the controller 400 of the door phone apparatus. During communication between the electronic key apparatus and the reader/writer, the electronic identification information may be exchanged therebetween along with the electronic key information. In such a case, the electronic key information is supplemented with the identification information regarding each of the family members. The identification information is stored in the memory of the electronic key apparatus as well as in the memory of the controller 400 of the door phone apparatus as part of personal profile information.

Where personal identification information is separated from electronic key information, a single piece of electronic key information may be assigned to each door phone apparatus. That is, all family members living in one dwelling unit may share the same electronic key information and each family member may carry an electronic key apparatus holding the common electronic key information.

In the foregoing description, the electronic key information and the initial registration information as part of agent information were shown transferred for registration from the management server 10 to the family information memory and agent information memory in the shared entrance apparatus 2 and in the controller 400 of the door phone apparatus at each dwelling unit. Alternatively, these sets of information may be registered with the shared entrance apparatus 2 and door phone apparatuses 4 before these apparatuses are installed. In that case, the management server 10 should also be capable of accessing the family information memory and agent information memory in the shared entrance apparatus 2 and in the controller 400 of the door phone apparatus 4 at each dwelling unit for data transfers aimed at changing electronic key information, registering backup key information, registering lost keys, recording additional agent information, or deleting specific agent information, as in the above-described embodiments.

The IC chip memory was described as holding beforehand the identification information which is managed in a unified manner. Alternatively, the identification information managed in unified fashion may be written to the IC chip memory later.

In the above-described embodiments, the identification information as key information was shown subject to authentication by the shared entrance apparatus 2 and by the controller 400 of the door phone apparatus at each dwelling unit. Alternatively, the shared entrance apparatus 2 and the controller 400 of each door phone apparatus 4 may transmit key information to the management server 10 over communication lines. In that case, the management server 10 may authenticate the received information and return the result of its authentication process to the shared entrance apparatus 2 and the controller 400 of each door phone apparatus. As another alternative, the identification information identifying the persons who lock and unlock the doors may also be sent to the management server 10 for security management purposes.

As mentioned above, the electronic key apparatus and agent information communication apparatus are not limited to IC cards. These apparatuses may be implemented as IC chips similar to the IC card, as suitable communicating means, or as other appropriate arrangements with a biometric information acquisition feature in the case of the biometric information-operated examples discussed above. Specifically, the invention may be practiced as mobile phone terminals or PDAs (personal digital assistants).

The electronic key apparatus and agent information communication apparatus are not limited to the above-described arrangements for noncontact communication of electronic key information. Alternatively, these apparatuses may be designed to communicate on a contacting basis.

Even if the agents are duly registered with the shared entrance apparatus 2 and door phone apparatuses 4, it is obviously possible to limit their comings and goings to and from the multiple dwelling house or its dwelling units by business category, by agent, or by person in charge of visits.

That is, particular business categories of agents, specifically designated agents, or individually designated persons in charge can be barred from access to the multiple dwelling house or to its dwelling units if they are so recorded beforehand to nonvolatile memories of the shared entrance apparatus 2 and door phone apparatuses 4. By comparing such records with the business category information, agent identification information and person-in-charge information from each agent IC card presented, it is possible to determine whether the card holder is allowed to visit the multiple dwelling house or any of its dwelling units. It is also possible to include "undesirable" agent settings in the agent information held in the agent information memories 206 and 406, so that the settings may be used as a basis for distinguishing the welcomed visitors from those rejected.

In the embodiments discussed above, the dwelling unit storage box management apparatus 6 was shown referencing the family information memory 405 and agent information memory 406 of the door phone apparatus 4 at each dwelling unit. Alternatively, the storage box management apparatus 6 of each dwelling unit may include its own family information memory and agent information memory, so that it may operate independently of the door phone apparatus 4.

In the above-described embodiments, the storage boxes of each dwelling unit were shown usable by a plurality of agents if, say, a pickup agent and a delivery agent are designated and changed as needed for selective use of the boxes. Alternatively, the dwelling unit storage boxes may be assigned their fixed uses from the beginning. For example, one storage box may be allocated as a pickup-dedicated box and another as a delivery-dedicated box, in association with predetermined agents authorized for pickup and delivery.

Surveillance cameras may be housed in the dwelling unit storage boxes. These cameras taking pictures of anyone who opened the box doors will store the picture data in a suitable memory of the door phone apparatus as a dissuasive measure against theft. The picture data captured by the cameras may also be referenced to resolve disputes involving articles being mistakenly picked up or delivered.

The electronic locking mechanisms for the shared entrance door 1, for the entrance door 3 of each dwelling unit, and for the doors of the dwelling unit storage box are not limited to those discussed earlier. Electronic locking mechanisms of diverse structures may be adopted instead.

In the embodiments discussed above, each dwelling unit in the multiple dwelling house was shown equipped with the dwelling unit storage box. As another example, detached houses may also be furnished with a dwelling unit storage box each. In such a case, the dwelling unit storage box management apparatus may include a family information memory and an agent information memory for management purposes.

In the detached house, its door phone apparatus may be arranged to contain a family information memory and an agent information memory. This arrangement makes it possible for the door phone apparatus in the detached house to be used as a storage box management apparatus. The door phone apparatus of the detached house may also be connected with the storage box management apparatus so as to control the door locks of the attached storage box, as in the case of the above-described embodiments.

As described and according to the invention, previously registered agents are authorized to enter the multiple dwelling house and directly visit its dwelling units. The residents of each dwelling unit need not personally receive all visits of the registered agents. This significantly reduces the burdens on the residents receiving visitors.

At each dwelling unit in the multiple dwelling house, the inventive arrangements generate different calling sounds or suppress the calling sound outright in order to distinguish the agents allowed to visit the dwelling unit from those not previously authorized to do so. The controlled generation of the calling sound allows the residents at home to recognize what kind of person is at the door before unlocking the door to meet that person. The residents are also given the choice of not responding to the visit depending on the agent identified by the calling sound. This also reduces the burdens on the residents at home receiving visitors.

When appropriate agents are previously registered as a pickup agent and/or a delivery agent for each dwelling unit, these registered agents may utilize the dwelling unit storage box for pickup or delivery of goods regardless of the residents being at home or absent. The residents need not stay at home personally to receive the visiting agents in order to have goods delivered or have some articles picked up.

The invention claimed is:

1. A communication system for controlling access to a shared entrance of a multiple dwelling house, the communication system comprising:

a communication network:

a management apparatus for managing agent information of an agent granted access to the multiple dwelling house; and a shared entrance apparatus for use with the multiple dwelling house, the shared entrance apparatus being connected to the management apparatus via the communication network;

wherein the management apparatus includes:

a storage unit;

agent information registering means, the agent information registering means being configured to receive registration of the agent granted access to the multiple dwelling house and to store at least agent identification information of the agent into the storage unit;

first communicating means for communicating with the shared entrance apparatus via the communication network; and first controlling means for causing the first communicating means to transmit at least the agent information of the registered agent to the shared entrance apparatus; and wherein the shared entrance apparatus includes:

second communicating means for communicating with the management apparatus via the communication network;

agent information storing means for storing at least the agent identification information of the registered agent, after receiving the agent identification information through the second communicating means;

third communicating means for receiving information from an agent information communication apparatus, the agent information communication apparatus storing at least the agent identification information and at least being capable of outputting the agent identification information; and lock controlling means for unlocking a door lock of the shared entrance to let a visitor in upon determining that the visitor is the registered agent based on the information acquired through the communicating means and based on the information stored in the agent information storing means.

2. A communication system according to claim 1, wherein the management apparatus further comprises information providing means for providing the agent identification information to the agent information communication apparatus for storing the agent identification information therein, after, retrieval of the agent identification information from the storage unit of the storage information registering means.

* * * * *